United States Patent
Yang et al.

(10) Patent No.: US 11,027,916 B2
(45) Date of Patent: Jun. 8, 2021

(54) CONTAINERS WITH MULTIPLE SENSORS

(71) Applicant: simplehuman, LLC, Torrance, CA (US)

(72) Inventors: Frank Yang, Rancho Palos Verdes, CA (US); David Wolbert, Manhattan Beach, CA (US); Guy Cohen, Marina Del Rey, CA (US); Bryce Wilkins, Los Angeles, CA (US)

(73) Assignee: simplehuman, LLC, Torrance, CA (US)

( * ) Notice: Subject to any disclaimer, the term of this patent is extended or adjusted under 35 U.S.C. 154(b) by 34 days.

(21) Appl. No.: 16/678,970

(22) Filed: Nov. 8, 2019

(65) Prior Publication Data

US 2020/0148467 A1   May 14, 2020

Related U.S. Application Data

(63) Continuation of application No. 15/850,162, filed on Dec. 21, 2017, now Pat. No. 10,472,170, which is a
(Continued)

(51) Int. Cl.
*G01L 15/00* (2006.01)
*B65F 1/16* (2006.01)
(Continued)

(52) U.S. Cl.
CPC .......... *B65F 1/1638* (2013.01); *B65F 1/1646* (2013.01); *E05F 15/73* (2015.01);
(Continued)

(58) Field of Classification Search
CPC .................................. G01L 15/22; B60F 1/06
See application file for complete search history.

(56) References Cited

U.S. PATENT DOCUMENTS

| 830,182 A | 9/1906 | Skov |
|---|---|---|
| 1,426,211 A | 8/1922 | Pausin |

(Continued)

FOREIGN PATENT DOCUMENTS

| AU | 622536 | 4/1992 |
|---|---|---|
| CA | 2519295 | 3/2007 |

(Continued)

OTHER PUBLICATIONS

U.S. Appl. No. 29/484,903, filed Mar. 13, 2014, Yang et al.
(Continued)

*Primary Examiner* — Bentsu Ro
(74) *Attorney, Agent, or Firm* — Knobbe Martens Olson & Bear LLP

(57) ABSTRACT

A trashcan assembly can include a body portion, a lid portion pivotably coupled with the body portion, and a sensor assembly configured to generate a signal when an object is detected within a sensing region. The sensor assembly can include a plurality of transmitters having a first subset of transmitters and a second subset of transmitters. A transmission axis of at least one transmitter in the first subset of transmitters can be different from a transmission axis of at least one of the transmitters in the second subset of transmitters. An electronic processor can generate an electronic signal to a power-operated drive mechanism for moving the lid portion from a closed position to an open position, such as in response to the sensor assembly detecting the object.

37 Claims, 36 Drawing Sheets

Related U.S. Application Data continuation of application No. 15/265,455, filed on Sep. 14, 2016, now Pat. No. 9,856,080, which is a continuation-in-part of application No. 14/856,309, filed on Sep. 16, 2015, now Pat. No. 9,586,755.

(60) Provisional application No. 62/304,076, filed on Mar. 4, 2016.

(51) Int. Cl.

| | | |
|---|---|---|
| *G10L 15/22* | (2006.01) | |
| *G10L 15/08* | (2006.01) | |
| *G10L 25/51* | (2013.01) | |
| *G01J 1/42* | (2006.01) | |
| *G01D 5/16* | (2006.01) | |
| *E05F 15/73* | (2015.01) | |
| *B65F 1/06* | (2006.01) | |
| *B65F 1/04* | (2006.01) | |

(52) U.S. Cl.
CPC .............. *G01D 5/16* (2013.01); *G01J 1/4204* (2013.01); *G10L 15/08* (2013.01); *G10L 15/22* (2013.01); *G10L 25/51* (2013.01); *B65F 1/04* (2013.01); *B65F 1/06* (2013.01); *B65F 1/062* (2013.01); *B65F 1/1607* (2013.01); *B65F 2210/108* (2013.01); *B65F 2210/128* (2013.01); *B65F 2210/168* (2013.01); *B65F 2210/181* (2013.01); *B65F 2210/1815* (2013.01); *B65F 2250/11* (2013.01); *B65F 2250/111* (2013.01); *B65F 2250/112* (2013.01); *B65F 2250/114* (2013.01); *E05F 2015/763* (2015.01); *E05F 2015/765* (2015.01); *E05Y 2900/602* (2013.01); *G10L 2015/088* (2013.01); *G10L 2015/223* (2013.01); *Y10T 29/49002* (2015.01)

(56) References Cited

U.S. PATENT DOCUMENTS

| | | |
|---|---|---|
| 1,461,253 A | 7/1923 | Owen |
| 1,754,802 A | 4/1930 | Raster |
| 1,820,555 A | 8/1931 | Buschman |
| 1,891,651 A | 12/1932 | Padelford et al. |
| 1,922,729 A | 8/1933 | Geibel |
| 1,980,938 A | 11/1934 | Geibel |
| 2,308,326 A | 1/1943 | Calcagno |
| D148,825 S | 2/1948 | Snider |
| 2,457,274 A | 12/1948 | Rifken |
| 2,759,625 A | 8/1956 | Ritter |
| 2,796,309 A | 6/1957 | Taylor |
| 2,888,307 A | 5/1959 | Graves et al. |
| 2,946,474 A | 7/1960 | Knapp |
| 3,008,604 A | 11/1961 | Garner |
| 3,023,922 A | 3/1962 | Arrington et al. |
| 3,137,408 A | 6/1964 | Taylor |
| 3,300,082 A | 1/1967 | Patterson |
| 3,392,825 A | 7/1968 | Gale et al. |
| 3,451,453 A | 6/1969 | Heck |
| 3,654,534 A | 4/1972 | Fischer |
| 3,800,503 A | 4/1974 | Maki |
| 3,820,200 A | 6/1974 | Myers |
| 3,825,150 A | 7/1974 | Taylor |
| 3,825,215 A | 7/1974 | Borglum |
| 3,886,425 A | 5/1975 | Weiss |
| 3,888,406 A | 6/1975 | Nippes |
| 3,891,115 A | 6/1975 | Ono |
| 4,014,457 A | 3/1977 | Hodge |
| 4,027,774 A | 6/1977 | Cote |
| 4,081,105 A | 3/1978 | Dagonnet et al. |
| 4,189,808 A | 2/1980 | Brown |
| 4,200,197 A | 4/1980 | Meyer et al. |
| 4,217,616 A | 8/1980 | Jessup |
| 4,303,174 A | 12/1981 | Anderson |
| 4,320,851 A | 3/1982 | Montoya |
| 4,349,123 A | 9/1982 | Yang |
| 4,357,740 A | 11/1982 | Brown |
| 4,416,197 A | 11/1983 | Kehl |
| 4,417,669 A | 11/1983 | Knowles et al. |
| 4,457,483 A | 7/1984 | Gagne |
| 4,535,911 A | 8/1985 | Goulter |
| 4,570,304 A | 2/1986 | Montreuil et al. |
| 4,576,310 A | 3/1986 | Isgar et al. |
| D284,320 S | 6/1986 | Kubic et al. |
| 4,609,117 A | 9/1986 | Pamment |
| 4,630,332 A | 12/1986 | Bisbing |
| 4,630,752 A | 12/1986 | DeMars |
| 4,664,347 A | 5/1987 | Brown et al. |
| 4,697,312 A | 10/1987 | Freyer |
| 4,711,161 A | 12/1987 | Swin et al. |
| 4,729,490 A | 3/1988 | Ziegenbein |
| 4,753,367 A | 6/1988 | Miller et al. |
| 4,763,808 A | 8/1988 | Guhl et al. |
| 4,765,548 A | 8/1988 | Sing |
| 4,765,579 A | 8/1988 | Robbins, III et al. |
| 4,785,964 A | 11/1988 | Miller et al. |
| 4,792,039 A | 12/1988 | Dayton |
| 4,794,973 A | 1/1989 | Perisic |
| 4,813,592 A | 3/1989 | Stolzman |
| 4,823,979 A | 4/1989 | Clark, Jr. |
| 4,834,260 A | 5/1989 | Auten |
| 4,863,053 A | 9/1989 | Oberg |
| 4,867,339 A | 9/1989 | Hahn |
| 4,869,391 A | 9/1989 | Farrington |
| 4,884,717 A | 12/1989 | Bussard et al. |
| 4,888,532 A | 12/1989 | Josson |
| 4,892,223 A | 1/1990 | DeMent |
| 4,892,224 A | 1/1990 | Graham |
| 4,913,308 A | 4/1990 | Culbertson |
| 4,915,347 A | 4/1990 | Iqbal et al. |
| 4,918,568 A | 4/1990 | Stone et al. |
| D308,272 S | 5/1990 | Koepsell |
| 4,923,087 A | 5/1990 | Burrows |
| 4,944,419 A | 7/1990 | Chandler |
| 4,948,004 A | 8/1990 | Chich |
| 4,964,523 A | 10/1990 | Bieltvedt et al. |
| 4,972,966 A | 11/1990 | Craft, Jr. |
| 4,996,467 A | 2/1991 | Day |
| 5,031,793 A | 7/1991 | Chen et al. |
| 5,048,903 A | 9/1991 | Loblein |
| 5,054,724 A | 10/1991 | Hutcheson |
| 5,065,272 A | 11/1991 | Owen et al. |
| 5,065,891 A | 11/1991 | Casey |
| 5,076,462 A | 12/1991 | Perrone |
| D323,573 S | 1/1992 | Schneider |
| 5,090,585 A | 2/1992 | Power |
| 5,090,785 A | 2/1992 | Stamp |
| 5,100,087 A | 3/1992 | Ashby |
| 5,111,958 A | 5/1992 | Witthoeft |
| D327,760 S | 7/1992 | Donnelly |
| D329,929 S | 9/1992 | Knoedler et al. |
| 5,147,055 A | 9/1992 | Samson et al. |
| 5,156,290 A | 10/1992 | Rodrigues |
| D331,097 S | 11/1992 | Sieren |
| 5,170,904 A | 12/1992 | Neuhaus |
| 5,174,462 A | 12/1992 | Hames |
| D335,562 S | 5/1993 | Evans |
| 5,213,272 A | 5/1993 | Gallagher et al. |
| 5,222,704 A | 6/1993 | Light |
| D337,181 S | 7/1993 | Warman |
| 5,226,558 A | 7/1993 | Whitney et al. |
| 5,230,525 A | 7/1993 | Delmerico et al. |
| 5,242,074 A | 9/1993 | Conaway et al. |
| D340,333 S | 10/1993 | Duran et al. |
| 5,249,693 A | 10/1993 | Gillispie et al. |
| 5,261,553 A | 11/1993 | Mueller et al. |
| 5,265,511 A | 11/1993 | Itzov |
| 5,295,607 A | 3/1994 | Chang |
| 5,305,916 A | 4/1994 | Suzuki et al. |
| 5,314,151 A | 5/1994 | Carter-Mann |
| 5,322,179 A | 6/1994 | Ting |
| 5,329,212 A | 7/1994 | Feigleson |

(56) References Cited

U.S. PATENT DOCUMENTS

| | | |
|---|---|---|
| 5,348,222 A | 9/1994 | Patey |
| 5,353,950 A | 10/1994 | Taylor et al. |
| 5,372,272 A | 12/1994 | Jennings |
| 5,381,588 A | 1/1995 | Nelson |
| 5,385,258 A | 1/1995 | Sutherlin |
| 5,390,818 A | 2/1995 | LaBuda |
| 5,404,621 A | 4/1995 | Heinke |
| 5,407,089 A | 4/1995 | Bird et al. |
| 5,419,452 A | 5/1995 | Mueller et al. |
| 5,471,708 A | 12/1995 | Lynch |
| 5,474,201 A | 12/1995 | Liu |
| 5,501,358 A | 3/1996 | Hobday |
| 5,520,067 A | 5/1996 | Gaba |
| 5,520,303 A | 5/1996 | Bernstein et al. |
| 5,531,348 A | 7/1996 | Baker et al. |
| 5,535,913 A | 7/1996 | Asbach et al. |
| 5,558,254 A | 9/1996 | Anderson et al. |
| 5,584,412 A | 12/1996 | Wang |
| D377,554 S | 1/1997 | Adriaansen |
| 5,611,507 A | 3/1997 | Smith |
| 5,628,424 A | 5/1997 | Gola |
| 5,632,401 A | 5/1997 | Hurd |
| 5,636,416 A | 6/1997 | Anderson |
| 5,636,761 A | 6/1997 | Diamond et al. |
| 5,644,111 A | 7/1997 | Cerny et al. |
| 5,645,186 A | 7/1997 | Powers et al. |
| 5,650,680 A | 7/1997 | Chula |
| D383,277 S | 9/1997 | Peters |
| 5,662,235 A | 9/1997 | Nieto |
| 5,671,847 A | 9/1997 | Pedersen et al. |
| 5,690,247 A | 11/1997 | Boover |
| 5,695,088 A | 12/1997 | Kasbohm |
| 5,699,929 A | 12/1997 | Ouno |
| D388,922 S | 1/1998 | Peters |
| D389,631 S | 1/1998 | Peters |
| 5,704,511 A | 1/1998 | Kellams |
| 5,724,837 A | 3/1998 | Shin |
| 5,730,312 A | 3/1998 | Hung |
| 5,732,845 A | 3/1998 | Armaly, Jr. |
| 5,735,495 A | 4/1998 | Kubota |
| 5,738,239 A | 4/1998 | Triglia |
| 5,770,935 A | 6/1998 | Smith et al. |
| 5,799,909 A | 9/1998 | Ziegler |
| 5,816,431 A | 10/1998 | Giannopoulos |
| 5,816,640 A | 10/1998 | Nishimura |
| D401,383 S | 11/1998 | Gish |
| D401,719 S | 11/1998 | Van Leeuwen et al. |
| 5,873,643 A | 2/1999 | Burgess, Jr. et al. |
| 5,881,896 A | 3/1999 | Presnell et al. |
| 5,881,901 A | 3/1999 | Hampton |
| 5,884,237 A | 3/1999 | Kanki et al. |
| 5,887,748 A | 3/1999 | Nguyen |
| D412,552 S | 8/1999 | Burrows |
| 5,961,105 A | 10/1999 | Ehrnsberger et al. |
| 5,967,355 A * | 10/1999 | Ragot ................ B65F 1/02 220/4.32 |
| 5,967,392 A | 10/1999 | Niemi et al. |
| 5,987,708 A | 11/1999 | Newton |
| 6,000,569 A | 12/1999 | Liu |
| 6,010,024 A | 1/2000 | Wang |
| 6,024,238 A | 2/2000 | Jaros |
| 6,036,050 A | 3/2000 | Ruane |
| 6,102,239 A | 8/2000 | Wien |
| 6,105,859 A | 8/2000 | Stafford |
| 6,123,215 A | 9/2000 | Windle |
| D431,700 S | 10/2000 | Roudebush |
| 6,126,031 A | 10/2000 | Reason |
| 6,129,233 A | 10/2000 | Schiller |
| 6,131,861 A | 10/2000 | Fortier, Jr. et al. |
| D435,951 S | 1/2001 | Yang et al. |
| 6,209,744 B1 | 4/2001 | Gill |
| 6,211,637 B1 | 4/2001 | Studer |
| 6,234,339 B1 | 5/2001 | Thomas |
| 6,250,492 B1 | 6/2001 | Verbeek |
| D445,980 S | 7/2001 | Tjugum |
| 6,286,706 B1 | 9/2001 | Tucker |
| 6,328,320 B1 | 12/2001 | Walski et al. |
| 6,345,725 B1 | 2/2002 | Lin |
| 6,364,147 B1 | 4/2002 | Meinzinger et al. |
| 6,386,386 B1 | 5/2002 | George |
| 6,390,321 B1 | 5/2002 | Wang |
| 6,401,958 B1 | 6/2002 | Foss et al. |
| 6,519,130 B1 | 2/2003 | Breslow |
| 6,557,716 B1 | 5/2003 | Chan |
| D476,456 S | 6/2003 | Englert et al. |
| 6,596,983 B2 | 7/2003 | Brent |
| 6,626,316 B2 | 9/2003 | Yang |
| 6,626,317 B2 | 9/2003 | Pfiefer et al. |
| 6,632,064 B1 | 10/2003 | Walker et al. |
| D481,846 S | 11/2003 | Lin |
| D482,169 S | 11/2003 | Lin |
| 6,659,407 B2 | 12/2003 | Asaro |
| 6,681,950 B2 | 1/2004 | Miller, Jr. et al. |
| 6,701,832 B1 * | 3/2004 | Hawkins ............... B30B 9/3007 100/215 |
| D488,604 S | 4/2004 | Yang et al. |
| D488,903 S | 4/2004 | Yang et al. |
| D489,503 S | 5/2004 | Lin |
| D489,857 S | 5/2004 | Yang et al. |
| D490,583 S | 5/2004 | Yang et al. |
| D490,954 S | 6/2004 | Brand |
| D491,706 S | 6/2004 | Yang et al. |
| 6,758,366 B2 | 7/2004 | Bourgund et al. |
| D493,930 S | 8/2004 | Wang |
| D494,723 S | 8/2004 | Lin |
| 6,812,655 B1 | 11/2004 | Wang et al. |
| 6,814,249 B2 | 11/2004 | Lin |
| D499,450 S | 12/2004 | Goodman et al. |
| 6,837,393 B1 | 1/2005 | Kuo |
| 6,857,538 B2 | 2/2005 | Lin |
| 6,859,005 B2 | 2/2005 | Boliver |
| D503,021 S | 3/2005 | Yang et al. |
| 6,866,826 B2 | 3/2005 | Moore et al. |
| 6,883,676 B2 | 4/2005 | Lin |
| D507,090 S | 7/2005 | Yang et al. |
| 6,920,994 B2 | 7/2005 | Lin |
| 6,974,948 B1 | 12/2005 | Brent |
| D513,445 S | 1/2006 | Lin |
| 6,981,606 B2 | 1/2006 | Yang et al. |
| D517,764 S | 3/2006 | Wang |
| D517,767 S | 3/2006 | Yang et al. |
| D518,266 S | 3/2006 | Yang et al. |
| 7,017,773 B2 | 3/2006 | Gruber et al. |
| 7,044,323 B2 | 5/2006 | Yang |
| D525,756 S | 7/2006 | Yang et al. |
| 7,073,677 B2 | 7/2006 | Richardson et al. |
| 7,077,283 B2 | 7/2006 | Yang et al. |
| 7,080,750 B2 | 7/2006 | Wein et al. |
| 7,086,550 B2 | 8/2006 | Yang et al. |
| D528,726 S | 9/2006 | Lin |
| 7,121,421 B2 | 10/2006 | Yang et al. |
| D531,499 S | 11/2006 | Zaidman |
| D535,799 S | 1/2007 | Epps |
| D535,800 S | 1/2007 | Yang et al. |
| 7,163,591 B2 | 1/2007 | Kim et al. |
| 7,168,591 B1 | 1/2007 | Miller |
| D537,223 S | 2/2007 | Lin |
| D537,599 S | 2/2007 | Lin |
| D537,601 S | 2/2007 | Lin |
| D537,999 S | 3/2007 | Lin |
| D538,995 S | 3/2007 | Lin |
| D539,498 S | 3/2007 | Yang et al. |
| D539,499 S | 3/2007 | Yang et al. |
| D540,001 S | 4/2007 | Zimmerman |
| D542,001 S | 5/2007 | Yang et al. |
| D542,995 S | 5/2007 | Lin |
| D543,673 S | 5/2007 | Yang et al. |
| D544,170 S | 6/2007 | Lin |
| D544,171 S | 6/2007 | Lin |
| D544,671 S | 6/2007 | Saunders et al. |
| D545,024 S | 6/2007 | Liao |
| 7,225,943 B2 | 6/2007 | Yang et al. |
| D547,020 S | 7/2007 | Chen |
| 7,243,811 B1 | 7/2007 | Ramsey |

(56) References Cited

U.S. PATENT DOCUMENTS

| | | |
|---|---|---|
| D550,918 S | 9/2007 | Wang et al. |
| D552,319 S | 10/2007 | Gusdorf |
| D552,321 S | 10/2007 | Yang et al. |
| D552,823 S | 10/2007 | Yang et al. |
| D552,824 S | 10/2007 | Zimmerman |
| D552,825 S | 10/2007 | Yang et al. |
| D555,320 S | 11/2007 | Yang et al. |
| D559,494 S | 1/2008 | Yang et al. |
| D559,495 S | 1/2008 | Yang et al. |
| D562,522 S | 2/2008 | Daams |
| 7,328,842 B2 | 2/2008 | Wagner et al. |
| D564,169 S | 3/2008 | Wang |
| D564,723 S | 3/2008 | Yang et al. |
| D566,367 S | 4/2008 | Lin |
| D566,369 S | 4/2008 | Shek |
| D566,923 S | 4/2008 | Lin |
| D567,468 S | 4/2008 | Yang et al. |
| D568,572 S | 5/2008 | Yang et al. |
| D569,720 S | 5/2008 | Lablaine |
| 7,374,060 B2 | 5/2008 | Yang et al. |
| D571,520 S | 6/2008 | Lin |
| 7,395,990 B1 | 7/2008 | Stevens |
| 7,398,913 B2 | 7/2008 | McClure |
| 7,404,499 B1 | 7/2008 | Ramsey |
| D574,569 S | 8/2008 | Yang et al. |
| D576,371 S | 9/2008 | Zimmerman |
| D578,265 S | 10/2008 | Presnell |
| D578,266 S | 10/2008 | Yang et al. |
| D578,268 S | 10/2008 | Yang et al. |
| D578,722 S | 10/2008 | Yang et al. |
| 7,438,199 B1 | 10/2008 | Tidrick |
| D580,120 S | 11/2008 | Lin |
| D580,613 S | 11/2008 | Yang et al. |
| D580,615 S | 11/2008 | Yang et al. |
| D581,622 S | 11/2008 | Presnell et al. |
| D584,470 S | 1/2009 | Bizzell et al. |
| D585,171 S | 1/2009 | Bizzell et al. |
| D585,618 S | 1/2009 | Yang et al. |
| D586,070 S | 2/2009 | Lin |
| 7,494,021 B2 | 2/2009 | Yang et al. |
| D587,874 S | 3/2009 | Lin |
| D593,271 S | 5/2009 | Yang et al. |
| 7,540,396 B2 | 6/2009 | Yang et al. |
| 7,543,716 B2 | 6/2009 | Lin |
| 7,559,433 B2 | 7/2009 | Yang et al. |
| D599,074 S | 8/2009 | Bizzell et al. |
| D603,119 S | 10/2009 | Yang et al. |
| 7,607,552 B2 | 10/2009 | Efstathiou |
| D604,472 S | 11/2009 | Blanks et al. |
| 7,614,519 B2 | 11/2009 | Krauth et al. |
| 7,621,420 B2 | 11/2009 | Bandoh et al. |
| 7,656,109 B2 | 2/2010 | Yang et al. |
| D611,216 S | 3/2010 | Yang et al. |
| D611,217 S | 3/2010 | Bizzell et al. |
| D611,671 S | 3/2010 | Yang et al. |
| 7,694,838 B2 | 4/2010 | Yang et al. |
| 7,703,622 B1 | 4/2010 | Bynoe |
| D615,270 S | 5/2010 | Yang et al. |
| D615,722 S | 5/2010 | Yang et al. |
| 7,712,285 B2 | 5/2010 | Stravitz et al. |
| 7,741,801 B2 | 6/2010 | Fukuizumi |
| 7,748,556 B2 | 7/2010 | Yang et al. |
| 7,781,995 B2 | 8/2010 | Yang et al. |
| D623,817 S | 9/2010 | Yang et al. |
| D625,068 S | 10/2010 | Shannon |
| 7,806,285 B2 | 10/2010 | Yang et al. |
| D627,533 S | 11/2010 | Yang et al. |
| D627,944 S | 11/2010 | Wang et al. |
| D629,172 S | 12/2010 | Liao |
| D630,404 S | 1/2011 | Yang et al. |
| D631,221 S | 1/2011 | Yang et al. |
| D632,864 S | 2/2011 | Yang et al. |
| D634,911 S | 3/2011 | Yang et al. |
| D635,319 S | 3/2011 | Meyerhoffer |
| 7,896,187 B2 | 3/2011 | Haibel |
| 7,922,024 B2 | 4/2011 | Yang et al. |
| 7,950,543 B2 | 5/2011 | Yang et al. |
| D644,390 S | 8/2011 | Smeets et al. |
| 7,992,742 B1 | 8/2011 | Kim |
| 8,006,857 B2 | 8/2011 | Lin |
| D644,806 S | 9/2011 | Yang et al. |
| D644,807 S | 9/2011 | Yang et al. |
| D649,728 S | 11/2011 | Campbell |
| 8,074,833 B2 | 12/2011 | Yang et al. |
| 8,096,445 B2 | 1/2012 | Yang et al. |
| D655,061 S | 2/2012 | Scaturro |
| 8,136,688 B2 | 3/2012 | Lee et al. |
| D657,108 S | 4/2012 | Yang et al. |
| D657,109 S | 4/2012 | Liao |
| 8,297,470 B2 | 10/2012 | Yang et al. |
| 8,317,055 B2 | 11/2012 | Zawrotny et al. |
| D672,520 S | 12/2012 | Yang et al. |
| D673,750 S | 1/2013 | Quan |
| D675,802 S | 2/2013 | Yang et al. |
| D675,803 S | 2/2013 | Yang et al. |
| 8,418,869 B2 | 4/2013 | Yang et al. |
| D689,255 S | 9/2013 | Sun Ting Kung et al. |
| 8,567,630 B2 | 10/2013 | Yang et al. |
| 8,569,980 B2 | 10/2013 | Yang et al. |
| 8,575,537 B2 | 11/2013 | Yao et al. |
| 8,672,171 B2 | 3/2014 | Wynn et al. |
| 8,678,219 B1 | 3/2014 | Wang et al. |
| 8,686,676 B2 | 4/2014 | Yang et al. |
| D704,406 S | 5/2014 | Kern |
| 8,716,969 B2 | 5/2014 | Yang et al. |
| 8,720,728 B2 | 5/2014 | Yang et al. |
| 8,766,582 B2 | 7/2014 | Yang et al. |
| 8,807,378 B2 | 8/2014 | Kaberna |
| 8,807,379 B1 | 8/2014 | Hammond |
| D714,510 S | 9/2014 | Yang et al. |
| D715,575 S | 10/2014 | Williams et al. |
| D716,015 S | 10/2014 | van de Leest |
| 8,851,316 B2 | 10/2014 | Barrett et al. |
| 8,872,459 B2 | 10/2014 | Yang et al. |
| D725,860 S | 3/2015 | Spivey et al. |
| D725,861 S | 3/2015 | Yang et al. |
| D730,008 S | 5/2015 | Yang et al. |
| 9,051,093 B2 | 6/2015 | Yang et al. |
| D755,461 S | 5/2016 | Wall |
| D759,934 S | 6/2016 | Yang et al. |
| D762,037 S | 7/2016 | Chen |
| D765,937 S | 9/2016 | Chen |
| D766,998 S | 9/2016 | Kao et al. |
| 9,434,538 B2 | 9/2016 | Yang et al. |
| D771,344 S | 11/2016 | Yang et al. |
| 9,481,515 B2 | 11/2016 | Yang et al. |
| 10,906,738 B2 * | 2/2021 | Barry .................. B65F 1/1615 |
| 2001/0002690 A1 | 6/2001 | Rosky |
| 2001/0020619 A1 | 9/2001 | Pfeifer et al. |
| 2001/0045512 A1 | 11/2001 | Brent |
| 2002/0066736 A1 | 6/2002 | Pyles |
| 2002/0092853 A1 | 7/2002 | Wang |
| 2002/0096523 A1 | 7/2002 | Pyles |
| 2002/0096524 A1 | 7/2002 | Hardesty |
| 2002/0104266 A1 | 8/2002 | Ranaudo |
| 2002/0116924 A1 | 8/2002 | Winkelmann et al. |
| 2003/0089719 A1 | 5/2003 | Berger |
| 2003/0102316 A1 | 6/2003 | Forest |
| 2003/0201265 A1 | 10/2003 | Lin |
| 2003/0205979 A1 | 11/2003 | Papari et al. |
| 2003/0230576 A1 | 12/2003 | Lin |
| 2004/0016756 A1 | 1/2004 | Lin |
| 2004/0134924 A1 | 7/2004 | Hansen et al. |
| 2004/0140782 A1 | 7/2004 | Okabe et al. |
| 2004/0164077 A1 | 8/2004 | Kuo |
| 2004/0174268 A1 | 9/2004 | Scott et al. |
| 2004/0175303 A1 | 9/2004 | Lin |
| 2004/0199401 A1 | 10/2004 | Wagner |
| 2004/0200938 A1 | 10/2004 | Forlivio |
| 2004/0206758 A1 | 10/2004 | Lin |
| 2004/0206760 A1 | 10/2004 | Gagnebin |
| 2004/0251746 A1 | 12/2004 | Ichimaru et al. |
| 2005/0017006 A1 | 1/2005 | Kuo |
| 2005/0017010 A1 | 1/2005 | Siegel et al. |

(56) References Cited

U.S. PATENT DOCUMENTS

| | | |
|---|---|---|
| 2005/0029281 A1 | 2/2005 | Westermann et al. |
| 2005/0258177 A1 | 11/2005 | Woodson |
| 2005/0258794 A1 | 11/2005 | Fukuizumi |
| 2006/0027579 A1 | 2/2006 | Yang et al. |
| 2006/0103086 A1 | 5/2006 | Niemeyer et al. |
| 2006/0138149 A1 | 6/2006 | Tracy |
| 2006/0163257 A1 | 7/2006 | Golbert |
| 2006/0175336 A1 | 8/2006 | Wang |
| 2006/0186121 A1 | 8/2006 | Yang et al. |
| 2006/0196874 A1 | 9/2006 | Yang |
| 2006/0237641 A1 | 10/2006 | Moeller et al. |
| 2006/0249510 A1 | 11/2006 | Lin |
| 2006/0278643 A1 | 12/2006 | Chiou |
| 2007/0012699 A1 | 1/2007 | Yang et al. |
| 2007/0034334 A1 | 2/2007 | Ramsey et al. |
| 2007/0045326 A1 | 3/2007 | Tramontina et al. |
| 2007/0090112 A1 | 4/2007 | Kalman et al. |
| 2007/0114847 A1 | 5/2007 | Ichimaru et al. |
| 2007/0181579 A1 | 8/2007 | Kuo et al. |
| 2007/0209846 A1 | 9/2007 | Wilson |
| 2007/0215622 A1 | 9/2007 | Perez |
| 2007/0241109 A1 | 10/2007 | Lin |
| 2007/0266637 A1 | 11/2007 | McGowan |
| 2007/0272691 A1 | 11/2007 | Wang et al. |
| 2007/0289972 A1 | 12/2007 | Wynn et al. |
| 2008/0011754 A1 | 1/2008 | Ramsey |
| 2008/0011910 A1 | 1/2008 | Ramsey |
| 2008/0041863 A1 | 2/2008 | Forest |
| 2008/0083756 A1 | 4/2008 | Daniels |
| 2008/0083757 A1 | 4/2008 | Parker et al. |
| 2008/0099274 A1 | 5/2008 | Seel |
| 2008/0128428 A1 | 6/2008 | Beckerman |
| 2008/0164257 A1 | 7/2008 | Boll et al. |
| 2008/0236275 A1 | 10/2008 | Breed et al. |
| 2008/0257889 A1 | 10/2008 | Kovacevich et al. |
| 2008/0257890 A1 | 10/2008 | Kovacevich et al. |
| 2008/0257891 A1 | 10/2008 | Kovacevich et al. |
| 2008/0264948 A1 | 10/2008 | Kovacevich et al. |
| 2008/0264950 A1 | 10/2008 | Kovacevich et al. |
| 2008/0272119 A1 | 11/2008 | Efstathiou |
| 2008/0272127 A1 | 11/2008 | Kovacevich et al. |
| 2009/0084788 A1 | 4/2009 | Yang et al. |
| 2009/0136341 A1 | 5/2009 | Kenyon |
| 2009/0230131 A1 | 9/2009 | McDuffie et al. |
| 2009/0261105 A1 | 10/2009 | Cunningham et al. |
| 2009/0266836 A1 | 10/2009 | Mobley |
| 2010/0006572 A1 | 1/2010 | Chiou |
| 2010/0084235 A1 | 4/2010 | Lu |
| 2010/0096894 A1 | 4/2010 | Fukai |
| 2010/0122843 A1 | 5/2010 | Peters et al. |
| 2010/0147865 A1 | 6/2010 | Yang et al. |
| 2010/0170904 A1 | 7/2010 | Kalman et al. |
| 2010/0237074 A1 | 9/2010 | Yang et al. |
| 2010/0252557 A1 | 10/2010 | Clements |
| 2010/0294769 A1 | 11/2010 | Lee et al. |
| 2011/0017735 A1 | 1/2011 | Wang et al. |
| 2011/0049149 A1 | 3/2011 | Shih |
| 2011/0056952 A1 | 3/2011 | Borowski et al. |
| 2011/0139781 A1 | 6/2011 | Jin et al. |
| 2011/0220655 A1 | 9/2011 | Yang et al. |
| 2011/0272409 A1 | 11/2011 | Kasbohm |
| 2012/0234849 A1 | 9/2012 | Hughes et al. |
| 2012/0261423 A1 | 10/2012 | Zawrotny et al. |
| 2013/0097809 A1 | 4/2013 | Weber et al. |
| 2013/0098913 A1 | 4/2013 | Yang et al. |
| 2013/0105487 A1 | 5/2013 | Baik |
| 2013/0233853 A1* | 9/2013 | Yang .................. B65F 7/00 220/211 |
| 2013/0233857 A1 | 9/2013 | Yang et al. |
| 2013/0240592 A1 | 9/2013 | Woodruff |
| 2013/0248532 A1 | 9/2013 | Yang et al. |
| 2013/0248535 A1 | 9/2013 | Wolfe et al. |
| 2013/0300119 A1 | 11/2013 | Anzalon et al. |
| 2014/0183193 A1 | 7/2014 | Hammond et al. |
| 2014/0246434 A1 | 9/2014 | Yang et al. |
| 2014/0345453 A1 | 11/2014 | Oh et al. |
| 2015/0251849 A1 | 9/2015 | Yang et al. |
| 2015/0259139 A1 | 9/2015 | Yang et al. |
| 2015/0259140 A1 | 9/2015 | Yang et al. |
| 2015/0321841 A1 | 11/2015 | Salas et al. |
| 2017/0166167 A1 | 6/2017 | Heller et al. |
| 2017/0176986 A1* | 6/2017 | High .................. G06Q 30/0635 |

FOREIGN PATENT DOCUMENTS

| | | |
|---|---|---|
| DE | 1610087 | 7/1950 |
| DE | 822376 | 11/1951 |
| DE | 1283741 | 7/1966 |
| DE | 8436939 | 3/1985 |
| DE | 9108341 | 10/1991 |
| DE | 4225936 | 2/1994 |
| DE | 19525885 | 3/1997 |
| DE | 19617823 | 11/1997 |
| DE | 19809331 | 5/1999 |
| DE | 29918687 | 3/2000 |
| DE | 19933180 | 1/2001 |
| DE | 10148997 | 4/2003 |
| DE | 20217561 | 3/2004 |
| EP | 0582240 | 7/1993 |
| EP | 0903305 A1 | 3/1999 |
| EP | 0906876 A2 | 4/1999 |
| EP | 1094017 A1 | 4/2001 |
| EP | 1361176 A1 | 11/2003 |
| EP | 1136393 B1 | 4/2004 |
| EP | 1447342 A2 | 8/2004 |
| EP | 1600373 A2 | 11/2005 |
| EP | 1647503 A1 | 4/2006 |
| EP | 1686073 A1 | 8/2006 |
| EP | 1918223 A1 | 5/2008 |
| EP | 2343250 A1 | 7/2011 |
| EP | 2364932 | 9/2011 |
| FR | 2887152 | 12/2006 |
| GB | 191004921 | 6/1910 |
| GB | 2384418 | 7/2003 |
| JP | 02-152670 | 6/1990 |
| JP | H06-56011 | 8/1994 |
| JP | 06-272888 | 9/1994 |
| JP | 2004-231237 | 8/2004 |
| JP | D1300450 | 5/2007 |
| JP | D1300451 | 5/2007 |
| JP | 1322056 | 2/2008 |
| JP | D1398668 | 10/2010 |
| KR | 3003841370000 | 6/2005 |
| KR | 3004095430000 | 3/2006 |
| KR | 3004095430001 | 7/2006 |
| NL | 6908550 | 12/1970 |
| TW | D112733 | 9/2006 |
| WO | WO 92/02430 A1 | 2/1992 |
| WO | WO 96/33671 | 10/1996 |
| WO | WO 2005/080232 A1 | 9/2005 |
| WO | WO 2006/079263 A1 | 8/2006 |
| WO | WO 2015/134902 A1 | 9/2015 |
| WO | WO 2015/138625 A1 | 9/2015 |
| WO | WO 2016/054109 A1 | 4/2016 |

OTHER PUBLICATIONS

U.S. Appl. No. 29/519,549, filed Mar. 5, 2015, Yang et al.
U.S. Appl. No. 29/519,551, filed Mar. 5, 2015, Yang et al.
U.S. Appl. No. 29/548,018, filed Dec. 9, 2015, Yang et al.
U.S. Appl. No. 29/557,032, filed Mar. 4, 2016, Yang et al.
U.S. Appl. No. 29/557,088, filed Mar. 4, 2016, Yang et al.
U.S. Appl. No. 29/563,650, filed May 6, 2016, Yang et al.
Trento Corner 23 Trash Can, Hailo product webpage, May 2008, http://www.hailo.de/html/default.asp?site=12_71_107&lang=en.
Extended European Search Report for European Patent Application No. EP 16188727.8 dated Jan. 30, 2017 in 10 pages.

* cited by examiner

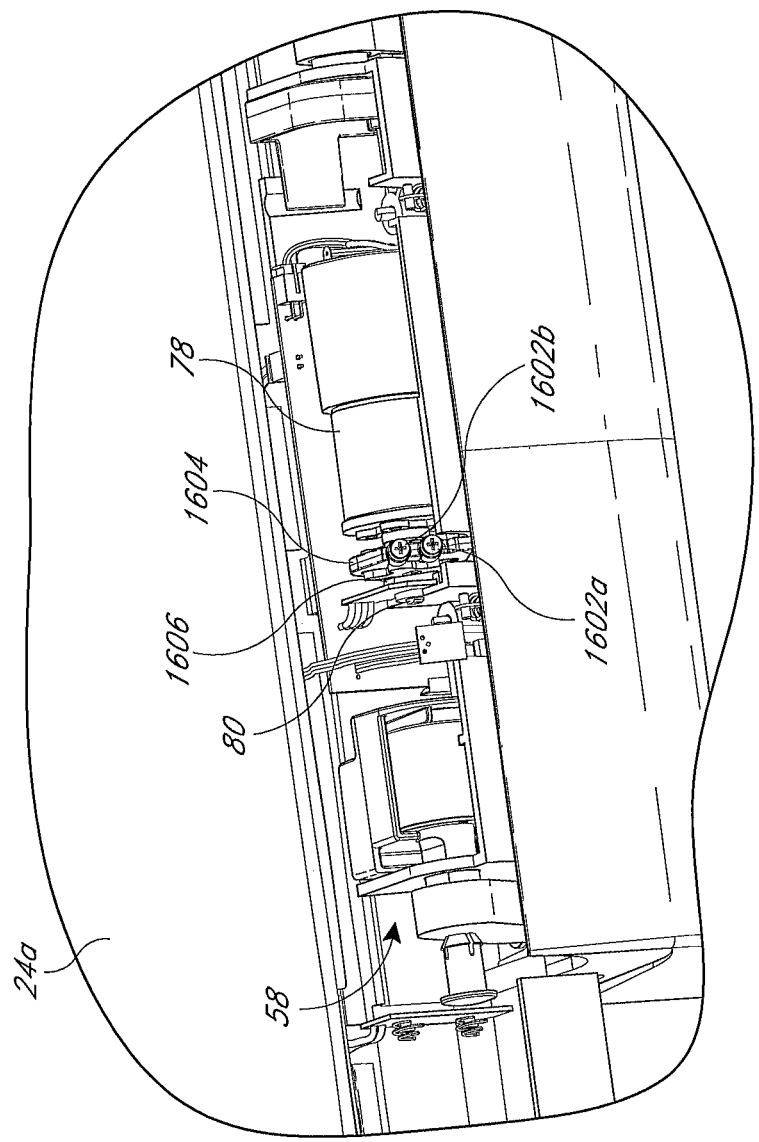

CONTAINERS WITH MULTIPLE SENSORS

CROSS-REFERENCE

This application is a continuation of U.S. patent application Ser. No. 15/850,162, filed Dec. 21, 2017 and titled "CONTAINERS WITH MULTIPLE SENSORS," which is a continuation of U.S. patent application Ser. No. 15/265,455, filed Sep. 14, 2016 and titled "CONTAINERS WITH MULTIPLE SENSORS," which is a continuation-in-part of U.S. patent application Ser. No. 14/856,309, filed Sep. 16, 2015 and titled "DUAL SENSING RECEPTACLES," and claims priority under 35 U.S.C. § 119(e) to U.S. Provisional Patent Application No. 62/304,076, filed Mar. 4, 2016 and titled "DUAL SENSING RECEPTACLES." In some aspects, this application relates to U.S. patent application Ser. No. 14/639,862, filed Mar. 5, 2015 titled "DUAL SENSING RECEPTACLES," which claims the benefit of priority to U.S. Provisional Patent Application No. 61/953,402, filed Mar. 14, 2014, titled "DUAL SENSING RECEPTACLE." The disclosures of each of the aforementioned applications are considered part of, and are incorporated by reference in, this application in their entireties.

BACKGROUND

Field

The present disclosure relates to receptacle assemblies, particularly to trashcan assemblies having power-operated lids.

Description of the Related Art

Receptacles having a lid are used in a variety of different settings. For example, in both residential and commercial settings, trashcans often have lids for preventing the escape of contents or odors from the trashcan. Recently, trashcans with power-operated lids have become commercially available. Such trashcans can include a sensor that can trigger the trashcan lid to open.

SUMMARY

In sensor-activated receptacles, it can be difficult to calibrate the sensor to trigger lid movement only when the user intends to open the lid. If the sensor is too sensitive, the sensor can trigger lid movement nearly every time a person walks by the receptacle. This accidental lid movement will quickly exhaust the power source and/or wear down components from over use (e.g., the motor). Further, if the sensor is not adaptable, an accidental or unintended lid movement may occur due to a stationary or static object (e.g., a piece of furniture) that triggers the sensor. However, if the sensor is calibrated to be less sensitive, it can be difficult to trigger lid movement.

According to some embodiments, a trashcan assembly includes a sensor zone (e.g., above the front portion of the lid) that is the primary location for actuating a lid of the trashcan assembly. For example, a user can waive a hand or hold an item of trash within a specified vertical distance of the sensor and the trashcan assembly will detect the object and automatically open the lid in response. After the lid has been opened, it can remain open for a short time and then close. In some embodiments, the trashcan assembly is configured to keep the lid open for a longer time if movement is sensed above the front portion of the lid, even movement that is further away (within a greater specified vertical distance) than the movement required to initially trip the lid.

Certain embodiments have generally vertical and generally horizontal sensing zones. However, detection of objects in the generally horizontal sensing zone alone may not accurately indicate when the lid should be opened. For example, people often walk by a trashcan (e.g., along its front face) without intending to throw trash away, in which case it would be undesirable for the lid to open. In some embodiments, the trashcan assembly is configured to recognize such a situation and/or to not open the lid merely because someone has walked by. For example, the trashcan assembly can be configured such that detecting an object in the horizontal sensing zones, without first, concurrently, or soon afterward detecting an object in the vertical sensing zone ordinarily will not cause the lid to be opened.

If someone is walking by the front of the trashcan, the person's hand or a part of their clothing might pass above the trashcan, which could be detected in the vertical sensing zone, and thus could unintentionally trigger the lid. Some embodiments are configured to avoid such a result by monitoring the horizontal sensing zone to see if someone is walking by (and not stopped), in which case the object detection in the vertical sensing zone can be ignored.

After an object has been detected in the vertical sensing zone, the horizontal sensing zone can be monitored to maintain the lid open for a period and/or until a condition is satisfied. For example, the lid can remain open so long as the trashcan assembly senses that someone is standing in near (e.g., in front) of it, even if the person's hands are not hovering over the lid region. This may happen, for example, if the person is reaching across a counter for more trash or sorting through items (e.g., mail) to determine which items to discard into the trashcan assembly.

Certain aspects of the disclosure are directed to a trashcan assembly that includes a body portion and a lid portion. The lid portion can be pivotably coupled with the body portion. The trashcan assembly can include a sensor assembly. The sensor assembly can be coupled to the body portion. The sensor assembly can have a first transmitter, a second transmitter, and/or one or more receivers. A transmission axis of the first transmitter can be generally perpendicular to a transmission axis of the second transmitter.

The sensor assembly can include a controller, which can have one or more hardware processors. The controller can be configured to perform various actions. For example, the controller can be configured to instruct the first transmitter to emit a first signal. The controller can be configured to receive, from the one or more receivers, a first indication that an object is detected in a first region. After the first indication is received, the controller can be configured to determine whether a second indication has been received from the one or more receivers in response to emission of a second signal by the second transmitter. The controller can be configured to transmit an instruction to a power-operated drive mechanism, such as in response to receiving at least the first indication. The instruction can cause the power-operated drive mechanism to move the lid portion from a closed position to an open position.

Any of the trashcan assembly features or structures disclosed in this specification can be included in any embodiment. In certain embodiments, the controller is configured to receive the second indication from the receiver. The second indication can indicate that the object or another object is detected in the first region or the second region. In some embodiments, the controller is configured to transmit another instruction to the power-operated drive mechanism, such as in response to the second indication not being received after a predetermined period. The another instruction can cause the power operated drive mechanism to move the lid portion from the open position to the closed position. The controller can be configured to instruct, in response to the second indication not being received after the predetermined period, the second transmitter to stop emitting the second signal. In some implementations, the controller is configured to instruct the second transmitter not to emit any signals before the first indication is received. In other implementations, the controller is configured to instruct the second transmitter to emit the second signal before the first indication is received. In some variants, the first transmitter has a transmission axis extending generally vertically and/or the second transmitter has a transmission axis extending generally horizontally. The first region can be a region that extends generally vertically from the upper surface of the sensor assembly. The second region can be a region that extends generally horizontally from the lateral surface of the sensor assembly. The receiver can be configured to transmit the first indication in response to reception of a reflection of the first signal. In some embodiments, in a first state, the first region comprises a ready mode region. In certain embodiments, in a second state, the first region comprises a hyper-mode region. The hyper-mode regions can extend beyond the ready-mode region. The receiver can be configured to transmit the first indication, such as in response to detection of the object in the ready-mode region. In some embodiments, the second region forms a beam angle of at least about 60 degrees. The beam angle can be measured from an outer periphery of the second region to a central axis of the second region. In some embodiments, the sensor assembly can include a third transmitter and a fourth transmitter. The controller can be configured to, in response to receiving the first indication, instruct the second transmitter to emit the second signal, instruct the third transmitter to emit a third signal, and instruct the fourth transmitter to emit a fourth signal.

Certain aspects of the disclosure are directed to a computer-implemented method for determining a position of a lid portion of a trashcan assembly. The method can include generating a first command that instructs a first transmitter of a sensor assembly to emit a first signal. The trashcan assembly can include the sensor assembly. The method can include receiving, from one or more receivers of the sensor assembly, a first indication that an object is detected in a first region. The method can include, after the first indication is received, determining whether a second indication has been received from the one or more receivers in response to emission of a second signal by a second transmitter of the sensor assembly. A transmission axis of the first transmitter can be generally vertical and the transmission axis of the second transmitter can be generally horizontal. The method can include generating a second command that instructs a power-operated drive mechanism in response to receiving at least the first indication. The second command can cause the power-operated drive mechanism to move the lid portion from a closed position to an open position. The method can be performed under control of program instructions executed by one or more computing devices.

In some embodiments, the method can include receiving the second indication from the receiver. The second indication can indicate whether the object or another object is detected in the first region or the second region. The method can include generating, in response to the second indication indicating that the object or another object is detected in the first region or the second region, a third command that instructs the power-operated drive mechanism to move the lid portion from the open position to the closed position. The method can include generating, in response to the second indication indicating that the object or another object is detected in the first region or the second region, a fourth command that instructs second transmitter to stop emitting the second signal. In some embodiments, the method can include instructing the second transmitter not to emit any signals before the first indication is received. In other embodiments, the method can include instructing the second transmitter to emit the second signal before the first indication is received. In some embodiments, the first region can be a region that extends generally upward from the upper surface of the sensor assembly. In certain embodiments, the second region is a region that extends generally outward from the lateral surface of the sensor assembly. In some embodiments, the first region includes a ready-mode region and a hyper-mode region extending beyond the ready-mode region. The method can include receiving the first indication in response to detection of the object in the ready-mode region. In some embodiments, the second region forms a beam angle of at least about 60 degrees. The beam angle can be measured from an outer periphery of the second region to a central axis of the second region.

Certain aspects of the disclosure are directed to a trashcan assembly that includes a body that includes a top end, bottom end, sidewall, and internal cavity. The trashcan assembly can include a lid unit coupled with the top end of the body. The lid unit includes a lid and a motor. The motor is configured to move the lid between an open position and a closed position. The trashcan assembly can include a sensor assembly that includes a first sensor configured to emit first signals generally vertically to produce a first sensing region. The sensor assembly can include a second sensor configured to emit second signals generally horizontally to produce a second sensing region. The sensor assembly can include a receiver configured to receive one or more reflected signals. The reflected signals include the first or second signals reflected off an object in the first or second sensing regions. The sensor assembly can include a lens cover positioned over the first sensor, second sensor, and receiver. The trashcan assembly can include a controller operably connected with the sensor assembly and the motor. The trashcan assembly can be configured such that, in response to the receiver receiving one or more reflected signals, the trashcan assembly moves the lid from the closed position to the open position. The trashcan assembly can be configured to detect the presence of contaminants on the lens covering.

In some embodiments, the trashcan assembly can be configured to detect the presence of contaminants on the lens covering by determining whether a proximity measurement to a detected object is less than a threshold distance. The threshold distance can be less than about 0.5 inches.

Certain aspects of the disclosure are directed to a trashcan assembly that includes a body portion, a lid portion pivotably coupled with the body portion, a microphone coupled to the bod portion, and a sensor assembly coupled to the body portion. The microphone can be configured to receive an utterance and transform the utterance into an audio signal. The sensor assembly can include a controller, which can have one or more hardware processors and memory. The controller can be configured to perform various actions. For example, the controller can be configured to receive the audio signal from the microphone. The controller can be configured to perform speech recognition on the audio signal to identify an uttered keyword. The controller can be configured to retrieve a stored keyword from the memory. The controller can be configured to compare the stored keyword with the uttered keyword. The controller can be configured to transmit an instruction to a power-operated drive mechanism in response to a determination that the stored keyword matches the uttered keyword. The instruction can cause the power-operated drive mechanism to move the lid portion from a closed position to an open position.

Any of the trashcan assembly features or structures disclosed in this specification can be included in any embodiment. In certain embodiments, the sensor assembly further includes a first transmitter, a second transmitter, and a receiver. A transmission axis of the first transmitter can be generally perpendicular to a transmission axis of the second transmitter. In some implementations, the controller can be configured to instruct the first transmitter to emit a first signal, receive, from the receiver, a first indication that an object is not detected in a first region, and transmit a second instruction to the power-operated drive mechanism in response to receiving the first indication. The second instruction can cause the power-operated drive mechanism to move the lid portion from the open position to the closed position. In certain embodiments, the controller can be configured to instruct the first transmitter to emit a first signal, receive, from the receiver, a first indication that an object is detected in a first region, and generate a second instruction that causes the power-operated drive mechanism to move the lid portion from the closed position to the open position. In some embodiments, the controller can be configured to retrieve a second stored keyword from the memory, compare the second stored keyword with the uttered keyword, and transmit a third instruction to the power-operated drive mechanism instead of the second instruction in response to a determination that the second stored keyword matches the uttered keyword. The third instruction can cause the power-operated drive mechanism to move the lid portion from the open position to the closed position. In some implementations, the trashcan assembly further includes a light sensor coupled to the body portion. The light sensor can be configured to detect a first lux level of ambient light at a first time before the first indication is received and a second lux level of ambient light at a second time after the first indication is received. The second lux level can be greater than the first lux level. In certain embodiments, the controller can be configured to not transmit the second instruction to the power-operated drive mechanism in response to a determination that the second lux level is greater than the first lux level by a threshold value. In some embodiments, the controller can be configured to receive the stored keyword from a user device over a wireless network.

Certain aspects of the disclosure are directed to a trashcan assembly that includes a body portion, a lid portion pivotably coupled with the body portion, a power-operated drive mechanism coupled with the body portion, and a sensor assembly coupled to the bod portion. The power-operated drive mechanism can include a motor, a shaft driven by the motor, and an adaptor coupled to the shaft and the lid portion.

The sensor assembly can include a controller, which can have one or more hardware processors. The controller can be configured to perform various actions. For example, the controller can be configured to detect an object in a first region. The controller can be configured to transmit an instruction to the power-operated drive mechanism in response to the detection of the object, wherein the instruction causes the power-operated drive mechanism to move the lid portion from a closed position to an open position.

Any of the trashcan assembly features or structures disclosed in this specification can be included in any embodiment. In certain embodiments, the power-operated drive mechanism can further include a position sensor coupled to the shaft. A rotation of the shaft can cause a change in voltage output by the position sensor. In some implementations, the controller can be further configured to transmit a second instruction to the power-operated drive mechanism that causes the power-operated drive mechanism to stop operation in response to a determination that a voltage output by the position sensor is a threshold value. In some embodiments, the position sensor can include a potentiometer. In certain embodiments, the controller can be further configured to determine a position of the lid portion using the voltage output by the position sensor. In some implementations, the controller can be further configured to determine the position of the lid portion using the voltage output by the position sensor even if the object obstructs movement of the lid portion by the power-operated drive mechanism.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIGS. 16A-16C illustrate an enlarged, rear perspective view of another embodiment of the receptacle assembly shown in FIG. 1 with a rear cover removed to show a driving mechanism.

DETAILED DESCRIPTION

Figure 1:
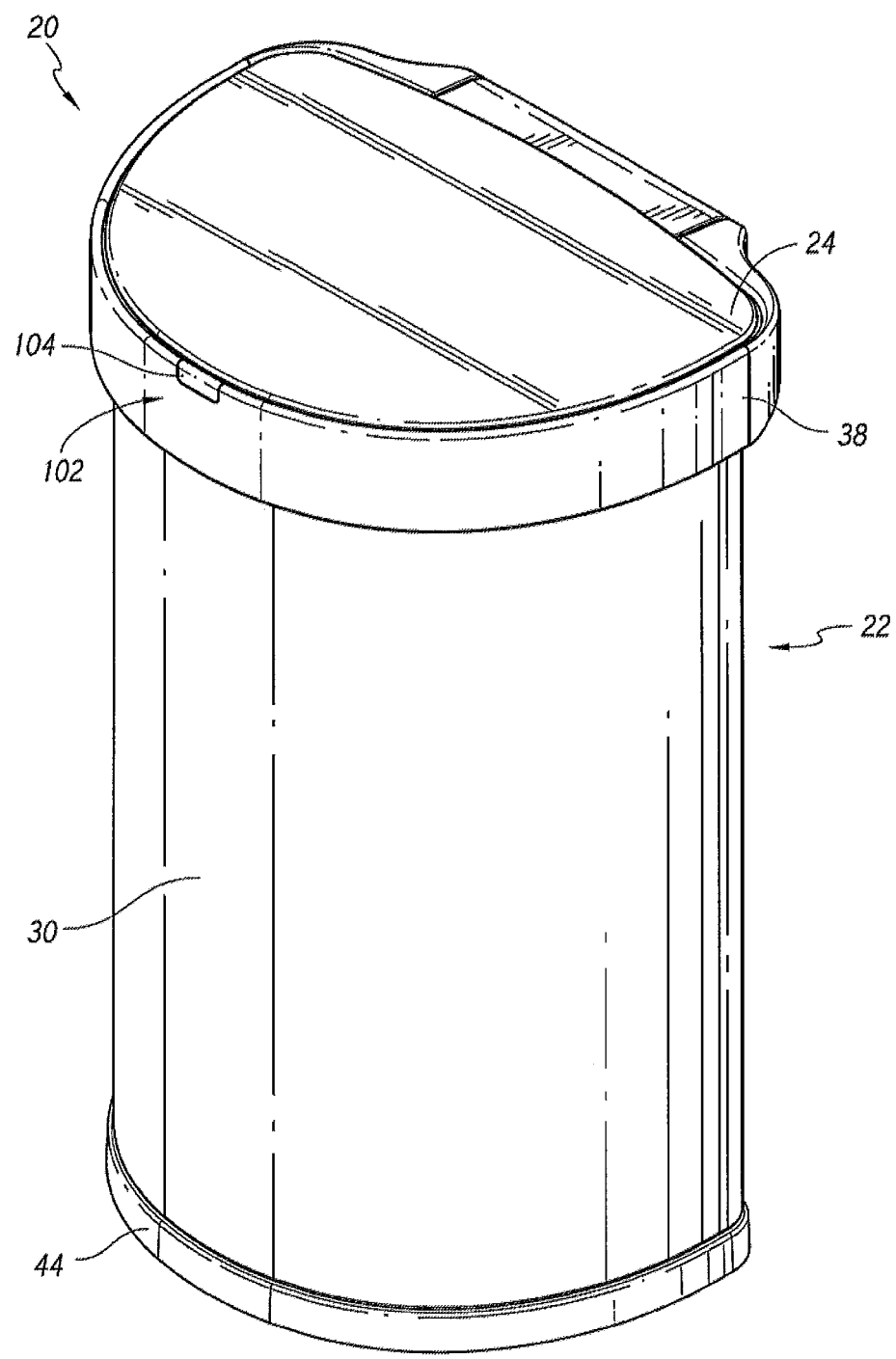
FIG. 1 illustrates a front perspective view of an embodiment of a receptacle assembly.
Figure 2:
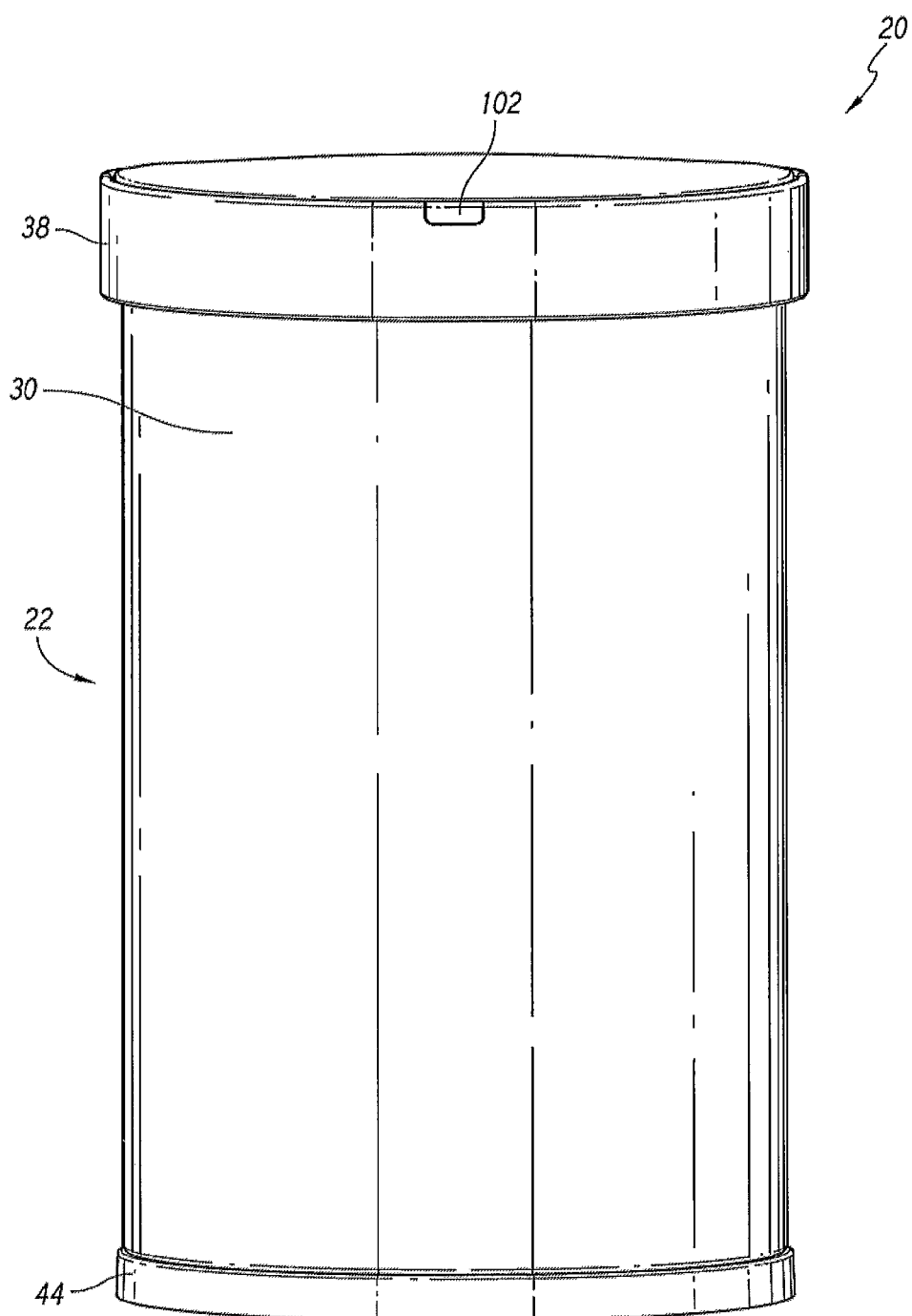
FIG. 2 illustrates a front elevation view of the receptacle assembly shown in FIG. 1.
Figure 3:
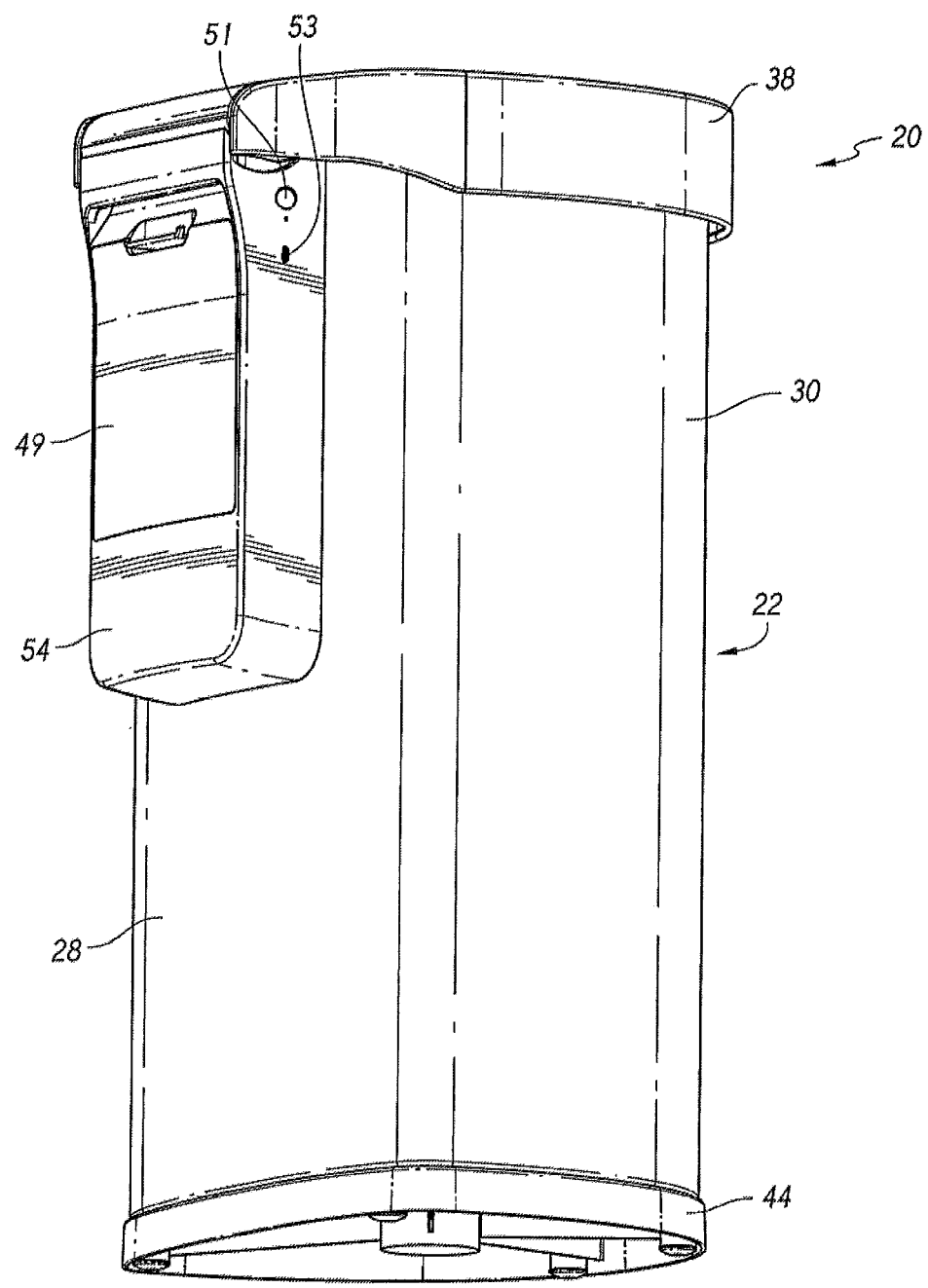
FIG. 3 illustrates a rear perspective view of the receptacle assembly shown in FIG. 1.
Figure 4:
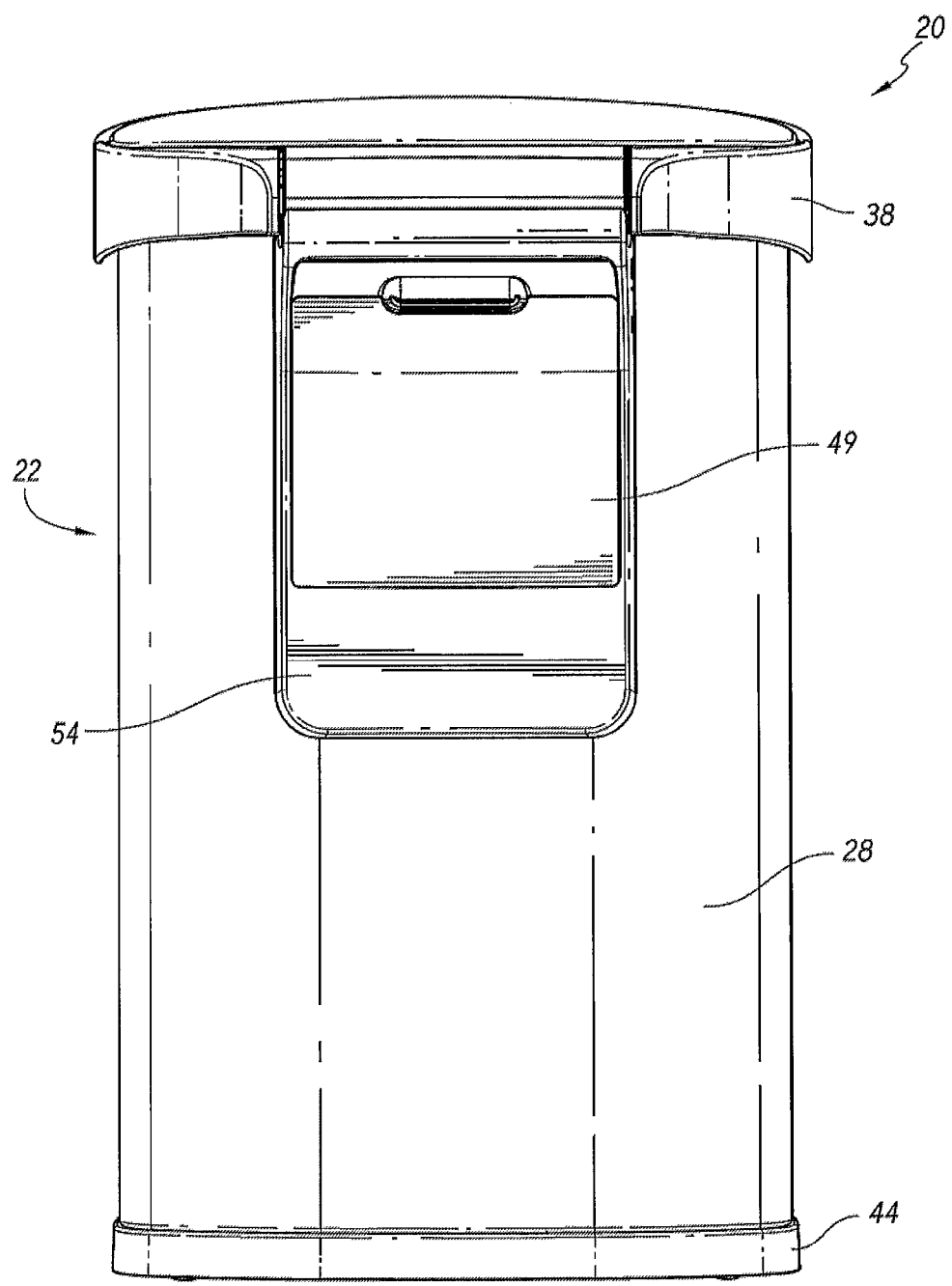
FIG. 4 illustrates a rear elevation view of the receptacle assembly shown in FIG. 1.

The various embodiments of a system for opening and closing a lid or door of a receptacle, such as a trashcan, or other device, are disclosed in the context of a trashcan. The present disclosure describes certain embodiments in the context of a trashcan due to particular utility in this context. However, the subject matter of the present disclosure can be used in many other contexts as well, including, for example, commercial trashcans, doors, windows, security gates, and other larger doors or lids, as well as doors or lids for smaller devices such as high precision scales, computer drives, etc. The embodiments and/or components thereof can be implemented in powered or manually operated systems.

It is also noted that the examples may be described as a process, such as by using a flowchart, a flow diagram, a finite state diagram, a structure diagram, or a block diagram. Although these examples may describe the operations as a sequential process, many of the operations can be performed in parallel, or concurrently, and the process can be repeated. In addition, the order of the operations may be different than is shown or described in such descriptions. A process is terminated when its operations are completed. A process may correspond to a method, a function, a procedure, a subroutine, a subprogram, etc. When a process corresponds to a software function, its termination can correspond to a return of the function to the calling function or the main function. Any step of a process can be performed separately or combined with any other step of any other process.

Overview

As shown in FIGS. 1-6, a trashcan assembly 20 can include a body portion 22 and a lid portion 24 pivotably attached to the body portion 22. The trashcan assembly 20 can rest on a floor and can be of varying heights and widths depending on, among other things, consumer need, cost, and ease of manufacture.

The trashcan assembly 20 can receive a bag liner (not shown), which can be retained at least partially within the body portion 22. For example, an upper peripheral edge 26 of the body portion 22 can support an upper portion of the bag liner such that the bag liner is suspended and/or restrained within the body portion 22. In some embodiments, the upper edge 26 of the body portion 22 can be rolled, include an annular lip, or otherwise include features that have a generally rounded cross-section and/or extend outwardly from a generally vertical wall of the body portion 22 (see FIG. 5). The outward-extending, upper peripheral edge 26 can support the bag liner and prevent the bag liner from tearing near an upper portion of the bag liner. Although not shown, in some embodiments, the trashcan assembly 20 can include a liner support member supported by the body portion 22, which can support the bag liner.

FIGS. 1-6 illustrate the body portion 22 having a generally semi-circular configuration with a rear wall 28 and a curved, front wall 30. However, other configurations can also be used, for example, a rectangular configuration. The body portion 22 can be made from plastic, steel, stainless steel, aluminum or any other material.

Figure 11A:
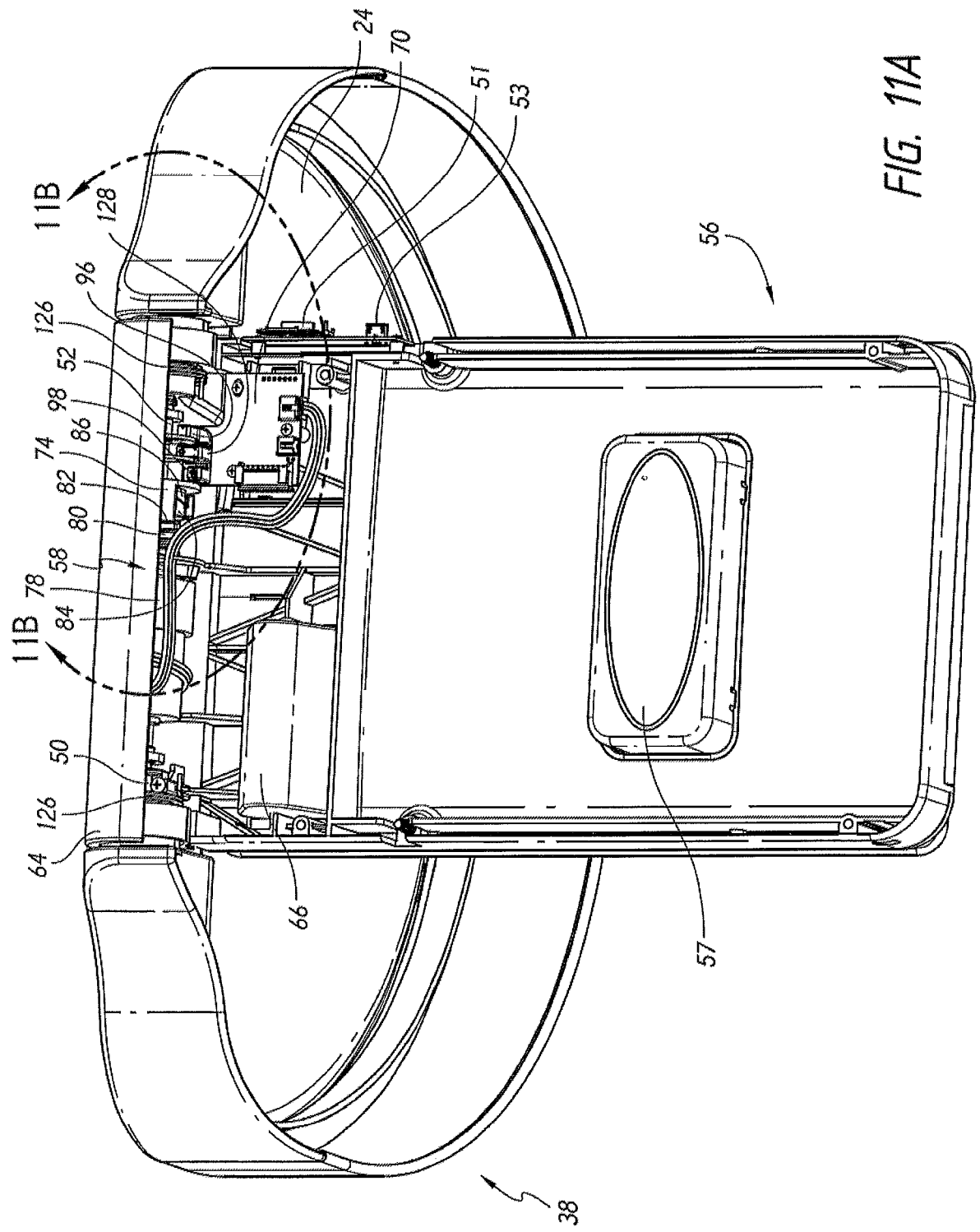
FIG. 11A illustrates an enlarged, rear perspective view of the receptacle assembly shown in FIG. 1 with a rear cover removed to show a driving mechanism.

The pivotal connection between the body portion 22 and the lid portion 24 can be any type of connection allowing for pivotal movement, such as, hinge elements, pins, or rods. For example, as shown in FIG. 11A, the lid portion 24 can pivot about pivot pins 50, 52 extending laterally through a backside enclosure 56. In some embodiments, biasing members 126, such as one or more torsion springs, can be positioned around the pins 50, 52. The biasing members 126 can provide a biasing force to assist in opening and/or closing the lid portion 24. This can reduce the amount of power consumed by a motor 78 when moving the lid portion 24 between the open and closed positions and/or can allow for the use a smaller motor (e.g., in dimensional size and/or in power output).

The trashcan assembly 20 can include a base portion 44. The base portion 44 can have a generally annular and curved skirt upper portion and a generally flat lower portion for resting on a surface, such as a kitchen floor. In some implementations, the base portion 44 can include plastic, metal (e.g., steel, stainless steel, aluminum, etc.) or any other material. In some implementations, the base portion 44 and the body portion 22 can be constructed from different materials. For example, the body portion 22 can be constructed from metal (e.g., stainless steel), and the base portion 44 can be constructed from a plastic material.

Figure 5:
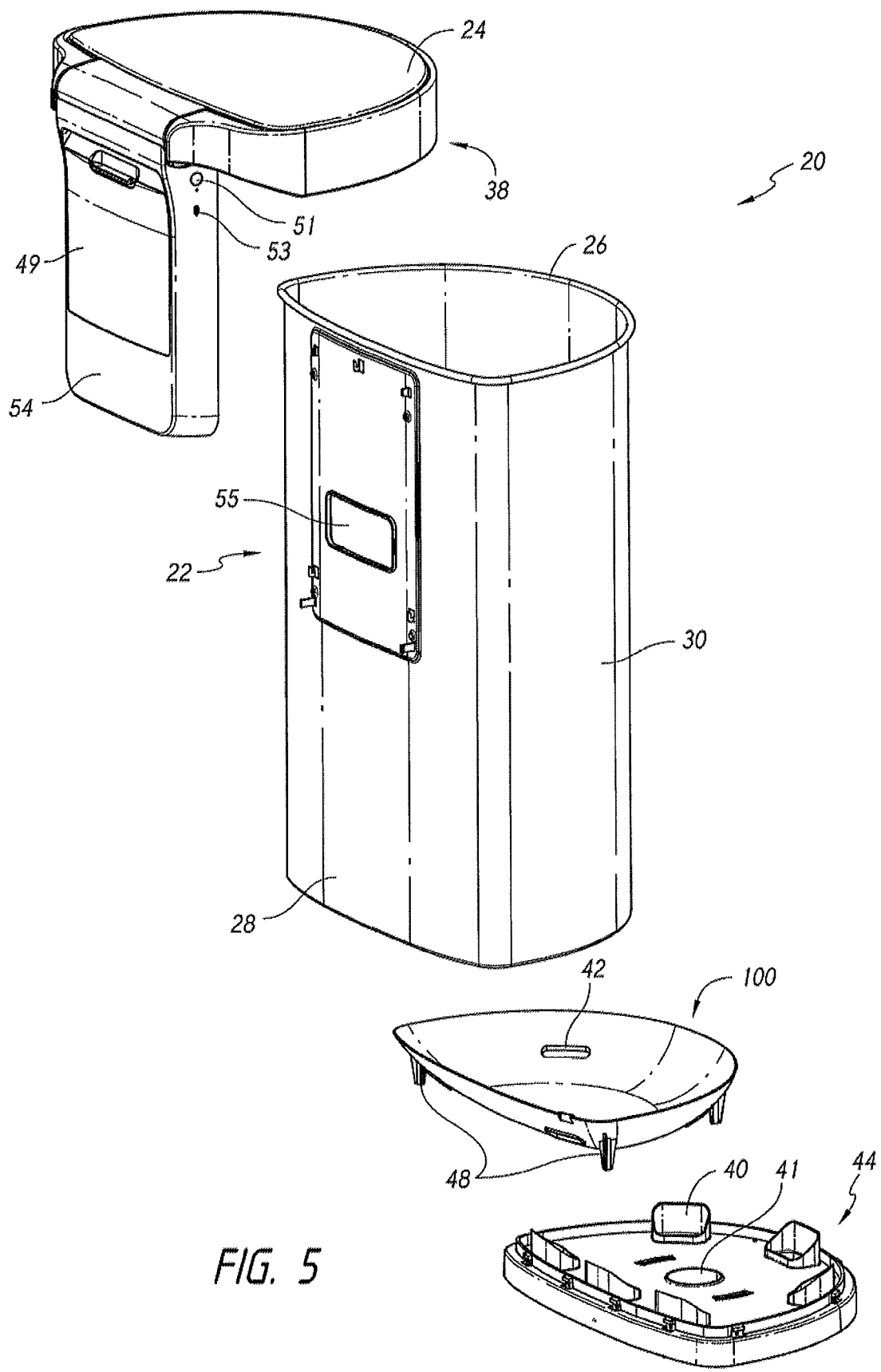
FIG. 5 illustrates a partial-exploded, rear perspective view of the receptacle assembly shown in FIG. 1.
Figure 6:
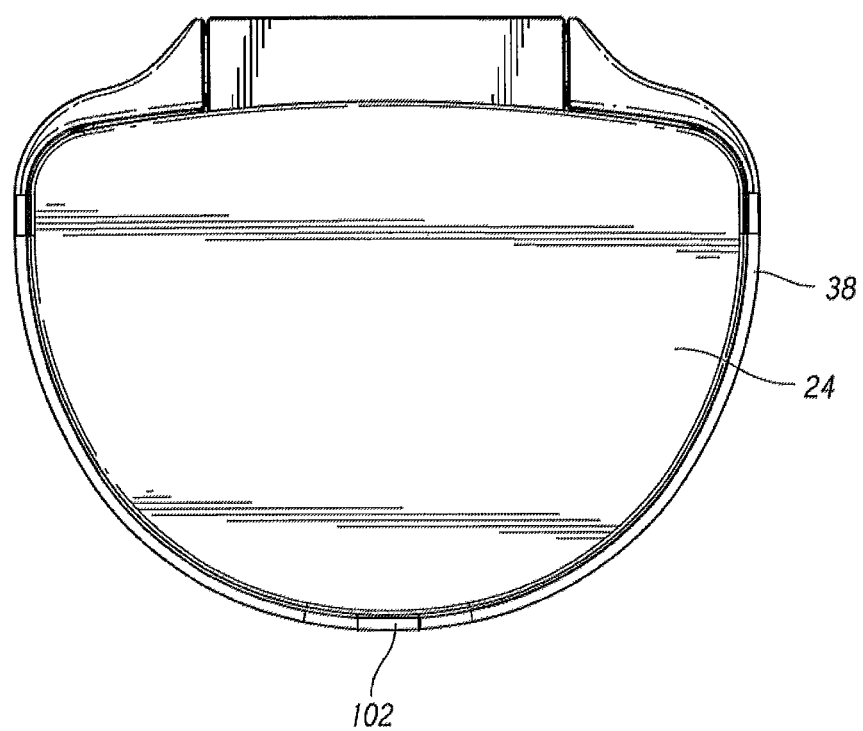
FIG. 6 illustrates a top plan view of the receptacle shown in FIG. 1.

In some embodiments, as shown in FIG. 5, the base portion 44 can be separately formed from the body portion 22. The base portion 44 can be connected with or attached to the body portion 22 using adhesive, welding, and/or connection components 46, such as hooks and/or fasteners (e.g., screws). For example, the base portion 44 can include hooked tabs that can connect with a lower edge (e.g., a rolled edge) of the body portion 22. The hooked tabs can engage the lower edge of the body portion 22 by a snap-fit connection.

As shown in FIG. 5, the base portion 44 can include projections 40 that are open or vented to the ambient environment (e.g., thorough the generally flat lower portion of the base portion 44). As illustrated, certain embodiments of the base portion 44 include a generally centrally located passage 41 extending through the base portion 44.

In some embodiments, the trashcan assembly 20 can include a liner insert 100 positioned within the body portion 22 (see FIG. 5). The liner insert 100 can be secured to the base portion 44. For example, the liner insert 100 can have support members 48 that are joined with the base portion 44 (e.g., with fasteners, welding, etc.). The support members 48 can support and/or elevate the liner insert 100 above away from the base portion 44.

The liner insert 100 can generally support and/or cradle a lower portion of a liner disposed in the trashcan assembly 20 to protect a bag liner from rupture or damage and retain spills. For instance, the liner insert 100 can have a generally smooth surface to reduce the likelihood of the bag liner being torn or punctured by contact with the liner insert 100. As illustrated, the liner insert 100 can be generally concave or bowl-shaped.

The liner insert 100 can reduce the chance of damage to the bag liner even in trashcan assemblies 20 that do not utilize a generally rigid liner that extends along a majority of or all of the height of the body portion 22. In some embodiments, the height of the liner insert 100 can be substantially less than the height of the body portion 22, positioning the uppermost surface of the liner insert 100 substantially closer to the bottom of the trashcan assembly 20 than to the middle and/or top of the trashcan assembly 20. In some embodiments, the height of the liner insert 100 can be less than or generally equal to about one-fourth of the height of the body portion 22. In certain embodiments, the height of the liner insert 100 can be less than or generally equal to about one-eighth of the height of the body portion 22.

The liner insert 100 can form a seal (e.g., generally liquid resistant) with a lower portion of the body portion 22. In some embodiments, the liner insert 100 can include openings 42 that are configured to correspond to, or mate with, the projections 40 located on the interior bottom surface of the base portion 44, thereby placing the openings 42 and the projections 40 in fluid communication. By aligning the openings 42 of the liner insert 100 and the projections 40 of the base portion 44, the openings 42 can allow ambient air to pass into and out of the interior of the trashcan assembly. The openings 42 can inhibit or prevent the occurrence a negative pressure region (e.g., in comparison to ambient) inside the trashcan assembly 20 when a user removes a bag liner from the trashcan assembly 20. Further, in certain variants, when a user inserts refuse or other materials into the bag liner in the trashcan assembly 20, air within the trashcan assembly 20 can exit via the openings 42 and the projections 40. The openings 42 can inhibit the occurrence of a positive pressure region (e.g., in comparison to ambient) inside the trashcan assembly 20 and allowing the bag liner to freely expand.

In some embodiments, the trashcan assembly 20 can include a backside enclosure 56 that can house a plurality of bag liners (not shown). A rear cover 54 can encase an open portion of the backside enclosure 56. The rear cover 54 can include a rear lid 49 that provides access to the interior of the backside enclosure 56, so the user can replenish the plurality of bag liners. An interior surface of the backside enclosure 56 can include an opening 57 that provides access to the plurality of bag liners from the interior of the body portion 22 (see FIG. 11A). The rear wall 28 of the body portion 22 can include an opening 55 in communication with the backside enclosure opening 57. The openings 55, 57 can be positioned such that the user can reach into the interior of the body portion 22 and take a bag liner from the backside enclosure 56. Additional examples and details of bag liner dispensers are included in U.S. Provisional Application No. 61/949,868, filed Mar. 7, 2014, the contents of which are incorporated herein by reference in their entirety. As with all embodiments in this specification, any structure, feature, material, step, and/or process illustrated or described in such application can be used in addition to or instead of any structure, feature, material, step, and/or process illustrated or described in this specification.

As shown in FIG. 11A, the backside enclosure 56 can house a power source 66 and a power-operated driving mechanism 58 to drive lid movement (discussed in greater detail below). In some embodiments, the backside enclosure 56 can include a port 43 (e.g., a USB port, mini-USB port, or otherwise) for recharging the power source 66 (see FIG. 3). In some embodiments, the backside enclosure 56 can include a power button 51 for turning on and off power to one or more features of the trashcan assembly 20 (see FIG. 3).

A controller 70 (which is stored in the backside enclosure 56 in some embodiments) can control one or more features of the trashcan assembly 20, e.g., the power-operated driving mechanism. The controller 70 can include one or a plurality of circuit boards (PCBs), which can provide hard-wired feedback control circuits, at least one processor and memory devices for storing and performing control routines, or any other type of controller. In some embodiments, the memory included in controller 70 may be a computer-readable media and may store one or more of any of the modules of software and/or hardware that are described and/or illustrated in this specification. The module(s) may store data values defining executable instructions. The one or more processors of controller 70 may be in electrical communication with the memory, and may be configured by executable instructions included in the memory to perform functions, or a portion thereof, of the trashcan assembly 20. For example, in some aspects, the memory may be configured to store instructions and algorithms that cause the processor to send a command to trigger at least one of the several modes of operation (e.g., ready-mode, hyper-mode, calibration-mode, etc.) of the trashcan assembly 20, as described herein in reference to FIGS. 9A-9B and 13. As another example, in some aspects, the memory may be configured to store instructions and algorithms that cause the processor to send a command to trigger the motor 78 to move the lid portion 24 between the open and closed positions based at least in part on received voice commands, such as in the example described herein in FIG. 19.

The backside enclosure 56 can have a generally low profile configuration. For example, the back-side enclosure 56 can extend rearward from the rear wall 28 a distance of less than or equal to about the distance from the rear wall 28 to the furthest rearward extent of the lid portion 24 and/or the furthest rearward extent of a trim ring portion 38, such as less than or equal to about 1 inch, or less than or equal to about ⅕th of the distance between the outside surfaces of the rear wall 28 and the front-most portion of the front wall 30.

Trim Ring Portion

In some embodiments, the trashcan assembly 20 can include a trim ring portion 38 that can secure or retain an upper portion of the bag liner between the trim ring portion 38 and the upper edge 26 of the body portion 22. The trim ring portion 38 can surround at least a portion of the body portion 22 and/or be positioned at least partially above the body portion 22. As illustrated, a diameter of the trim ring portion 38 can be greater than a diameter of the upper portion of the body portion 22, such that the trim ring portion 38 can receive, nest with, and/or or removably lock onto the upper edge 26 of the body portion 22, e.g., by a friction fit. When a bag liner is placed in the body portion 22 and the upper portion of the bag liner is positioned over the rolled edge or annular lip of the upper edge 26, the trim ring portion 38 can be positioned (e.g., rotated into position) such that the bag liner is disposed between the trim ring portion 38 and the body portion 22. The trim ring portion 38 can secure a portion of the bag liner within the body portion 22 and prevent the bag liner from falling into the body portion 22.

The trim ring portion 38 can include a rear-projecting portion 39 that can be secured to the back-side enclosure 56 and/or body portion 22, such as by fasteners 29 (e.g., screws). Some embodiments of the trim ring portion 38 can rotate with respect to the body portion 22 and/or the lid portion 24. The trim ring portion 38 can be made of various materials, such as plastic or metal. The trim ring portion 38 and the body portion 22 can be made from the same or different materials. For example, the trim ring portion 38 and the body portion 22 can be constructed from a plastic material. Some embodiments of the trim ring portion 38 can engage and/or overlap the upper edge 26 of the trashcan assembly 20.

The trim ring portion 38 can be pivotably coupled to the trashcan assembly 20. For example, the lid portion 24 and the trim ring portion 38 can pivot generally along the same pivot axis. In some embodiments, the trim ring portion 38 includes a retaining mechanism to maintain the trim ring portion 38 in an open position while the bag liner is being replaced or the trashcan interior is cleaned. As shown in FIG. 11C, the trim ring portion 38 can include a detent housing 160 positioned within the rear projecting portion 39. The detent housing 160 can be integrally formed with or secured to the outer and/or inner trim ring (if present) 38a, 38b (see FIGS. 7A and 7B). The detent housing 160 can include a first detent structure 162a configured to interface (e.g., engage) with a second detent structure disposed on the backside enclosure 56. As the trim ring portion 38 moves to an open position, the first detent structure 162a can interface with the second detent structure 162b to maintain the trim ring portion 38 in an open position. In some embodiments, the first detent structure 162a can be a tooth, and the second detent structure 162b can be a divot, groove, opening, or likewise.

Lid Sensor Assembly

The trashcan assembly 20 can include a sensor assembly 102 for detecting user movement (e.g., by detecting a reflected or emitted signal or characteristic, such as light, thermal, conductivity, magnetism, or otherwise). The sensor assembly 102 can communicate with the controller 70 to control lid movement.

Figure 7A:
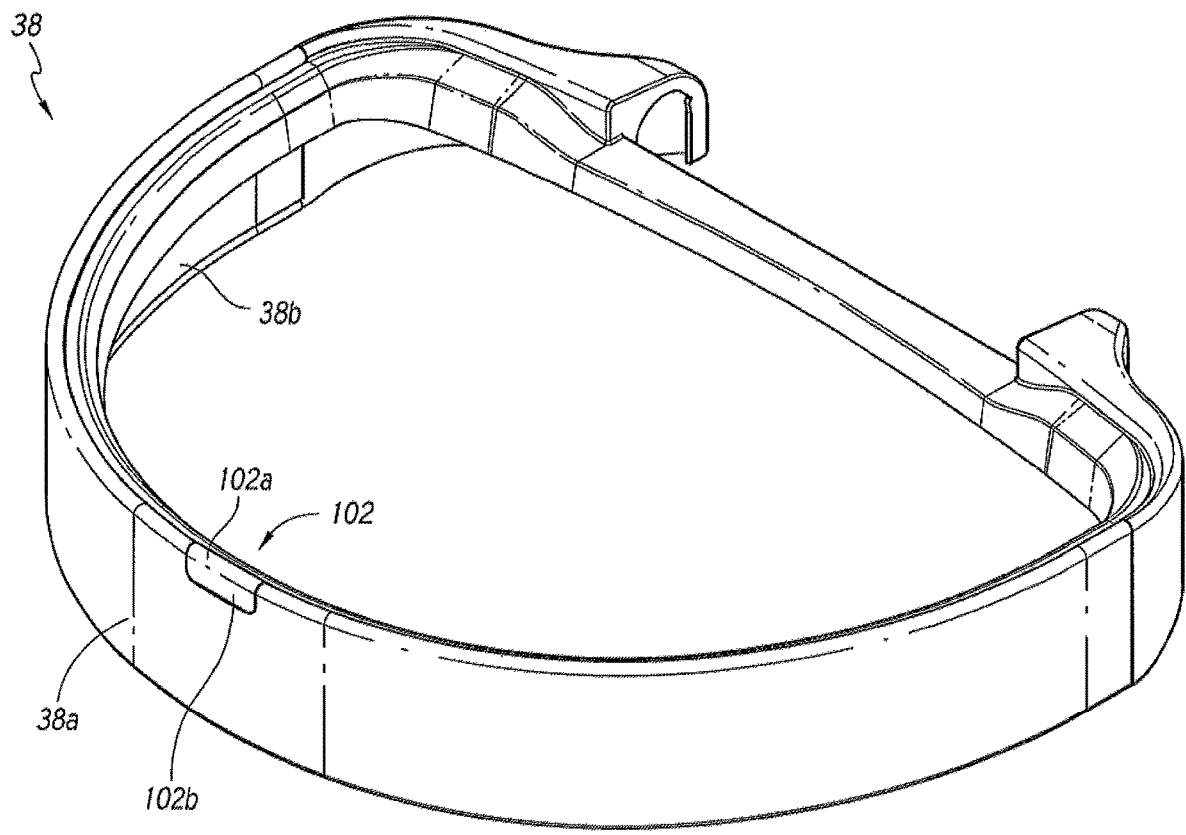
FIG. 7A illustrates a trim ring portion of the receptacle of FIG. 1.
Figure 7B:
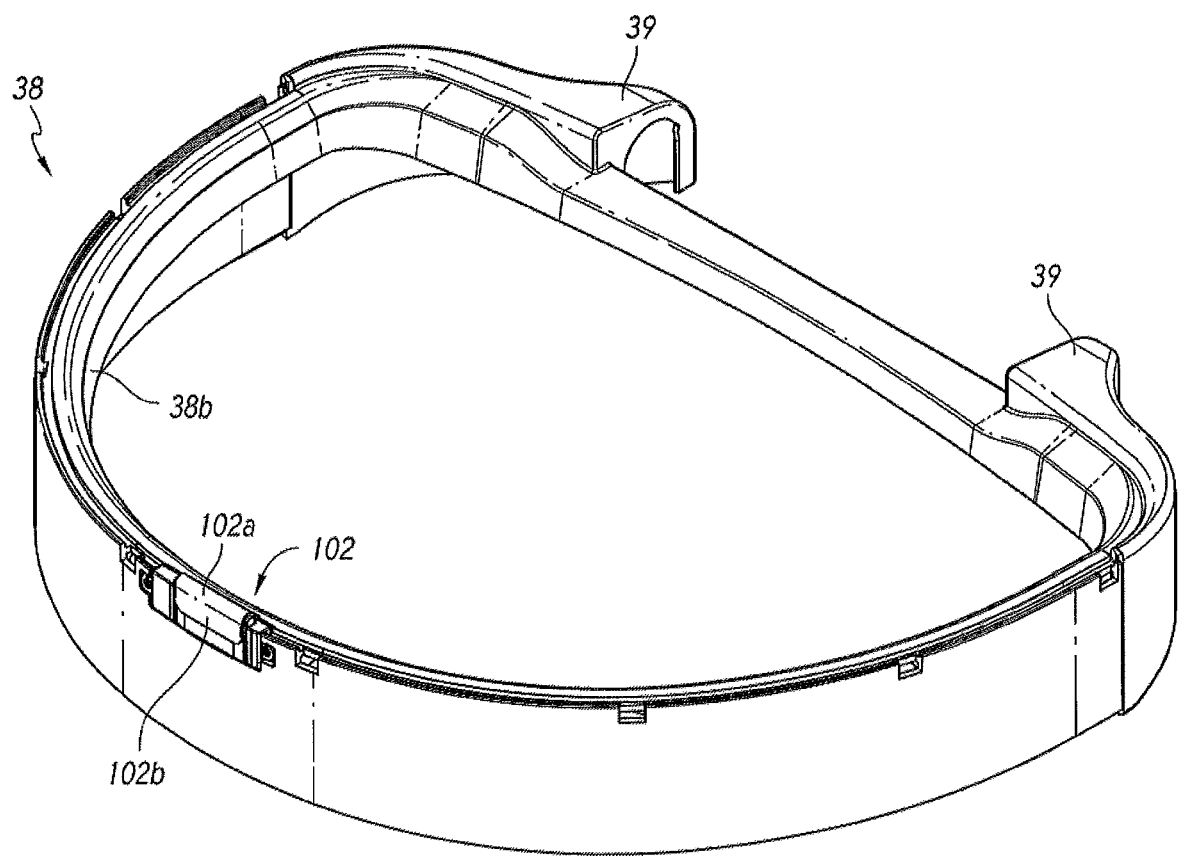
FIG. 7B illustrates the trim ring portion of FIG. 7A with the outer trim cover removed.

The sensor assembly 102 can be disposed on a generally outer portion of the trashcan assembly 20. In some embodiments, the sensor assembly 102 can be positioned at least partially between the outer trim ring 38a and the inner trim ring 38b (see FIGS. 7A and 7B) with a portion of the sensor assembly 102 exposed to the trashcan exterior. For example, as shown in FIG. 7A, the sensor assembly 102 can be positioned such that at least a portion of an upper surface 102a and/or a front surface 102b of the sensor assembly 102 is exposed to the trashcan exterior. The sensor assembly 102 can be positioned near a central and/or upper portion of a front surface of the trim ring portion 38, such that the exposed surfaces of the sensor assembly 102 can be substantially flush with, and/or be shaped to generally match or correspond to the shape of, a top surface and/or an outer front surface of the trim ring portion 38.

Figure 8A:
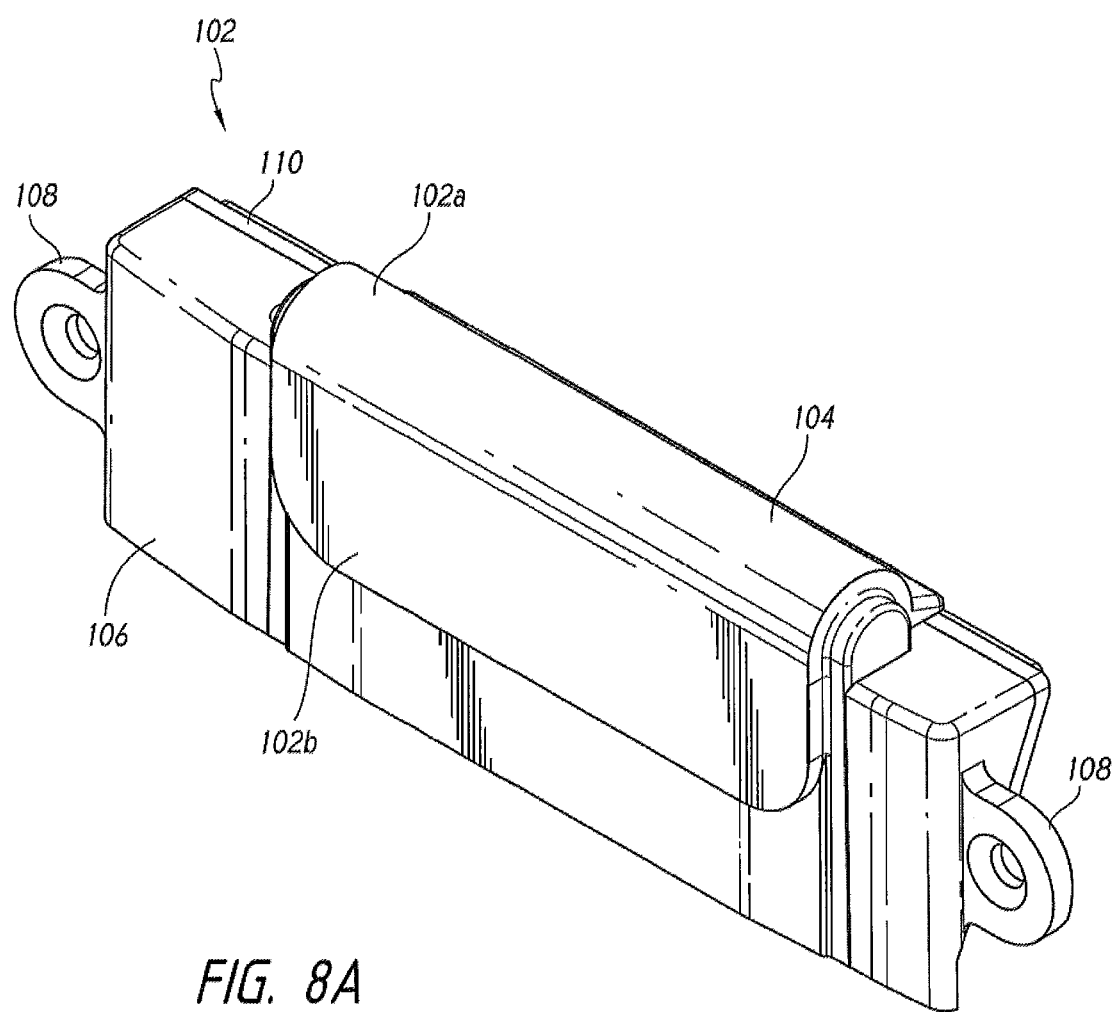
FIG. 8A illustrates a sensor assembly of the receptacle of FIG. 1.
Figure 8B:
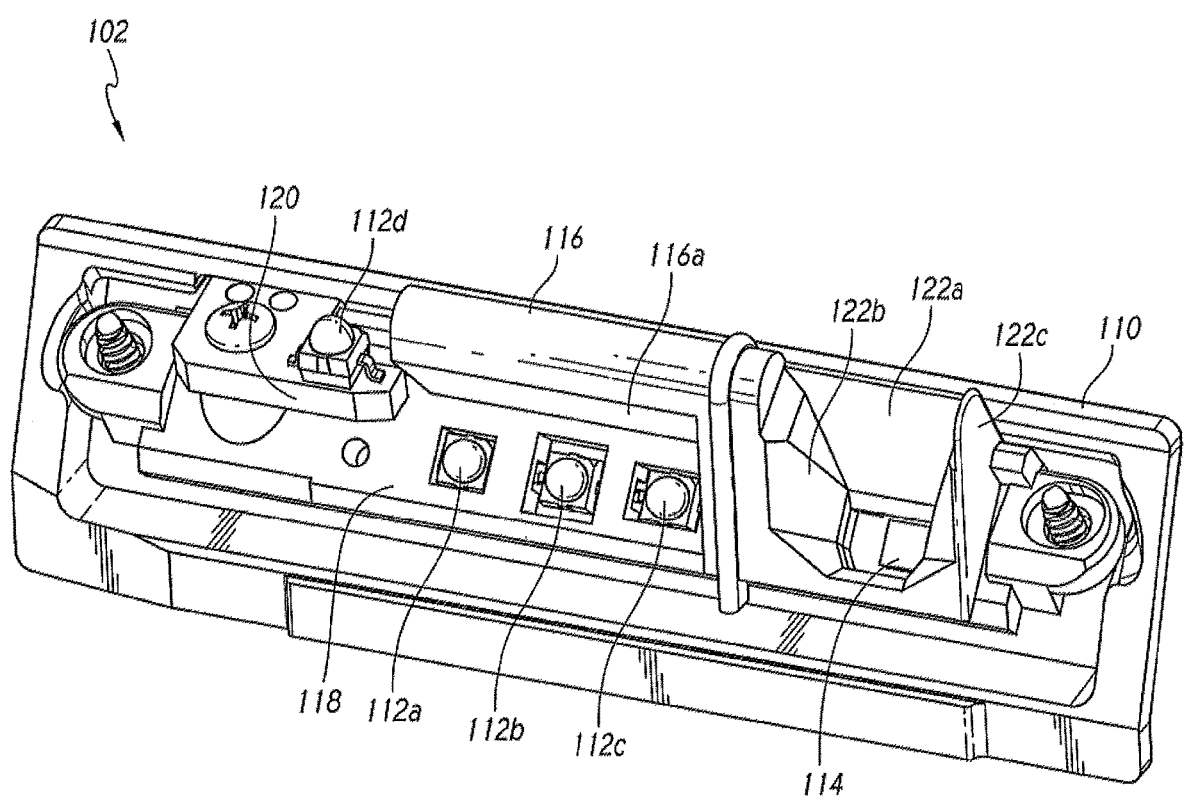
FIG. 8B illustrates the sensor assembly of FIG. 8A with the outer covering removed.

FIGS. 8A and 8B illustrate enlarged views of the sensor assembly 102. The sensor assembly 102 can include a support structure 110 for supporting one or more transmitters and receivers. An outer covering 106 can be secured to the support structure 110 to cover the one or more transmitters and receivers. The outer covering 106 can include one or more connection features 108 for securing the sensor assembly 102 to the trim ring portion 38 (e.g., using screws, hooks, or other fasteners).

The outer covering 106 can include a lens covering 104 that can be transparent or translucent to permit transmission and/or receipt of light signals. For example, the lens covering 104 can be made of glass or plastics, such as polycarbonate, Makrolon®, etc. In some embodiments, the lens covering 104 can be opaque to visible light and transparent or translucent to UV and/or infrared light to reduce erroneous signals from visible light and/or to generally obscure the transmitter(s) and/or receiver(s) from view. The lens covering 104 can be substantially flush with a top surface and an outer front surface of the trim ring portion 38. As shown in FIG. 1, the lens covering 104 of the sensor assembly 102 can be aligned with the trim ring portion 38. The front surface of the lens covering 104 can be aligned with a front surface of the trim ring portion 38, and the top surface of the lens covering 104 can curve over a top edge of the trim ring portion 38 so that the top surface of the lens covering 104 is substantially flush with a rolled edge of the trim ring portion 38. In some embodiments, a width of the lens covering 104 can be at least two times a height of the lens covering 104, e.g., the width can be about 30 mm and the height can be about 7 mm. In some embodiments, the height of the lens covering 104 can be at least about two times a depth of the lens covering, e.g., the height can be about 15 mm and the depth can be about 7 mm.

As shown in FIG. 8B, the sensor assembly 102 can include one or more transmitters 112a-d (e.g., one, two, three, four, five or more) and one or more receivers 114 (e.g., one, two, three, four, five or more). The transmitters 112a-d can emit electromagnetic energy, such as infrared light. The beams of light emitting from the transmitters 112a-d can define one or more overlapping or separate sensing regions 130, 132. In some embodiments, the outer periphery of the sensing regions 130, 132 can be identified by the regions in which an object (e.g., a person's body) will not trigger lid movement or where radiant intensity of emitted light falls below 50% of the maximum value. The receiver 114 can receive electromagnetic energy, such as infrared light, and detect reflections from an object within the beams of light emitted from the transmitters 112*a-d*. If the receiver 114 detects a signal above a certain sensing threshold, the sensor assembly 102 can send a signal to the controller 70 to activate a function of the trashcan assembly 20. In certain variants, the transmitters can emit other types of energy, such as sound waves, radio waves, or any other signals. The transmitters and receivers can be integrated into the same sensor or configured as separate components.

The transmitters 112*a-d* can transmit light in more than one direction, e.g., a first subset of transmitters can transmit light in a first direction, and a second subset of transmitters can transmit light in a second direction. As shown in FIG. 8B, the first subset of transmitters 112*a-c* can include a greater number of transmitters than the second subset of transmitters 112*b*. For example, the first subset of transmitters can include three transmitters 112*a-c* and the second subset of transmitters can include a single transmitter 112*d*. However, any number of transmitters can be included in each subset of transmitters and/or additional subsets of transmitters can transmit light in additional directions. In some embodiments, the first subset of transmitters 112*a-c* and the second subset of transmitters 112*d* can be mounted on different PCB boards. However, in other embodiments, all of the transmitters 112*a-b* can be mounted on a single PCB board having a structure to permit the second subset of transmitters 112*d* to be directed at an angle different than the first subset of transmitters 112*a-c*, e.g., in the configuration shown in FIG. 8B.

The first subset of transmitters 112*a-c* can be positioned on or in the support structure 110, such that a transmitting axis of each of one or more of the first subset of transmitters 112*a-c* is generally perpendicular to a front surface 118 of the support structure 110. In some embodiments, the front surface 118 can be positioned at an angle relative to a longitudinal axis of the trashcan assembly 20, such as between about −10 degrees and about 45 degrees (e.g., at least about: −10 degrees, −5 degrees, 0 degrees, 5 degrees, 10 degrees, 15 degrees, 20 degrees, 25 degrees, 30 degrees, values in between, or otherwise). For example, as shown in FIG. 9C, the first subset of transmitters 112*a-c* can emit light at an angle between about 0 degrees and 60 degrees from a top surface of the trashcan assembly, such as about 45 degrees. As another example, as shown in FIG. 9D, the first subset of transmitters 112*a-c* can emit light at an angle between about −10 degrees and 10 degrees from a top surface of the trashcan assembly, such as about 0 degrees. As shown in FIG. 8B, the second subset of transmitters 112*d* can be positioned on or in a platform 120 extending from the support structure 110. The platform 120 can be positioned such that a transmitting axis of each of the second subset of transmitters 112*d* is positioned at an angle relative to the front surface 118 of the support structure 110, such as between about 45 degrees and about 100 degrees (e.g., about 45 degrees, 60 degrees, 75 degrees, 80 degrees, 85 degrees, 90 degrees, 95 degrees, 100 degrees, values in between, or otherwise). In some embodiments, an upper surface of the platform 120 can be generally perpendicular to the longitudinal axis of the trashcan assembly 20. As shown in FIGS. 9C and 9D, the second subset of transmitters 112*d* can be positioned or otherwise configured to emit light along an axis substantially parallel to a longitudinal axis of the trashcan assembly 20.

As shown in FIG. 8B, the second subset of transmitters 112*d* and the receiver 114 can be positioned on opposite sides of the first subset of transmitters 112*a-c*. However, in certain variants, the second subset of transmitters 112*d* and the receiver 114 can be positioned on the same side of the first subset of transmitters 112*a-c* or interspersed between transmitters 112*a-c* in the first subset.

The support structure 110 can include a projecting portion 116 extending across at least a portion of a length of the first subset of transmitters 112*a-c*. An inner wall 116*a* of the projecting portion 116 can be generally perpendicular to the front surface 118 of the support structure 110. As shown in FIG. 8B, the projecting portion 116 can extend from an upper portion of the support structure 110 and extend along the length of the first subset of transmitters 112*a-c*. The inner wall 116*a* of the projecting portion 116 can block portions of emissions from the first subset of transmitters 112*a-c* that may accidentally trigger lid movement (e.g., when transmitted light reaches the receiver 114 without first reflecting off a user). In some embodiments, the second subset of transmitters 112*d* can be spaced away from the projecting portion 116, such that the projecting portion 116 does not block emissions from the second subset of transmitters 112*b*.

The receiver 114 can be recessed from the front surface 118 of the support structure. The recessed portion can include an upper wall 122*a* positioned at an angle relative to the longitudinal axis of the trashcan assembly 20, such as between about 0 degrees and about 45 degrees (e.g., at least about: 15 degrees, 20 degrees, 25 degrees, 30 degrees, values in between, or otherwise). The recessed portion can also include sidewalls 122*b*, 122*c*. The sidewall 122*b* can separate the transmitters 122*a-d* from the receiver 114 to reduce the likelihood that emitted light reaches the light receiver without first reflecting off a separate surface (e.g., a user).

The first subset of transmitters 112*a-c* can transmit light in a first direction and the second subset of transmitters 112*d* can transmit light in a second direction. As shown in FIG. 8B, each transmitter in each subset of transmitters can transmit light in substantially the same direction. However, in other embodiments, one or more transmitters in each subset can transmit light in different directions.

Figure 9A:
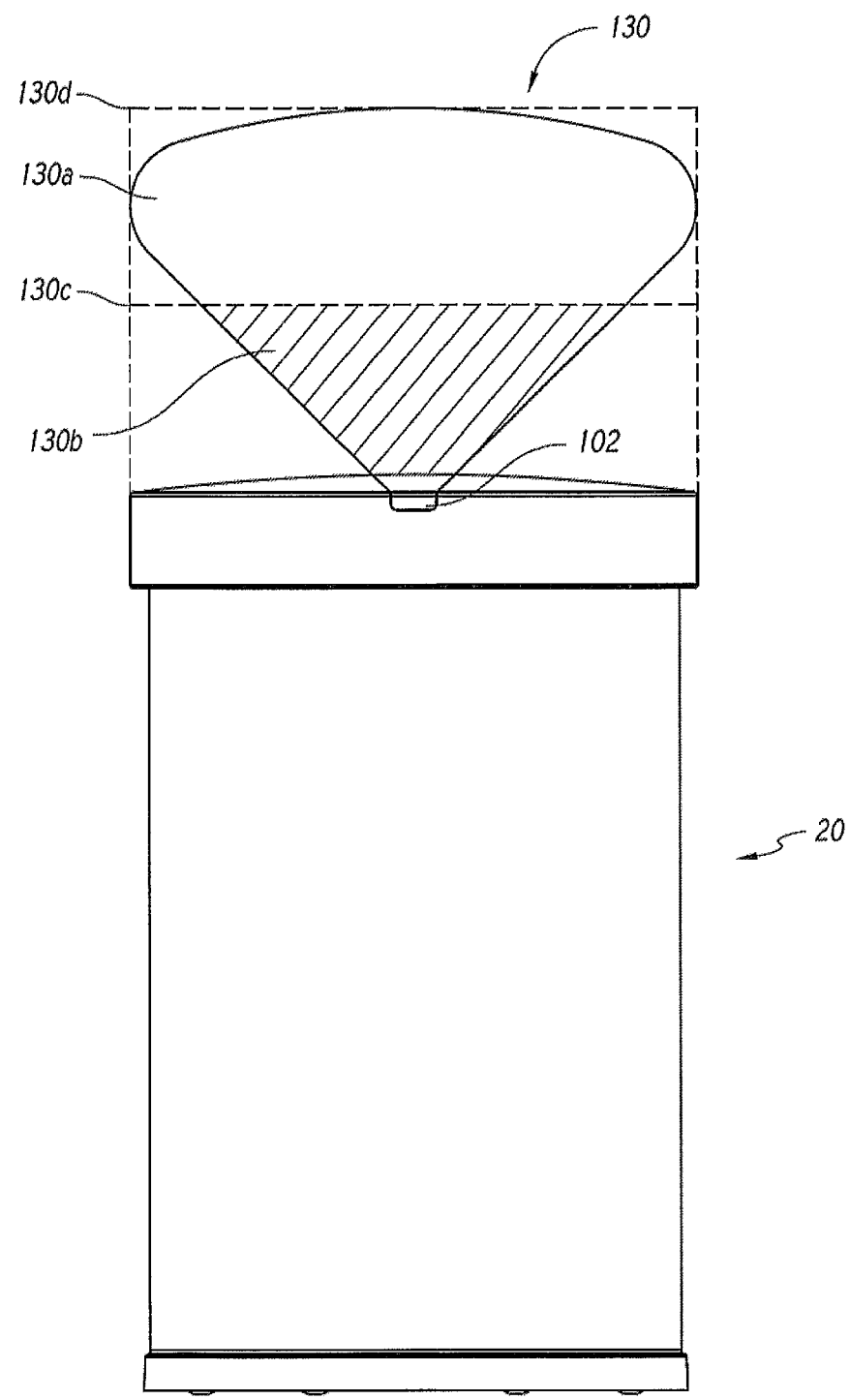
FIG. 9A illustrates an upward sensing range of the receptacle assembly shown in FIG. 1.
Figure 9B:
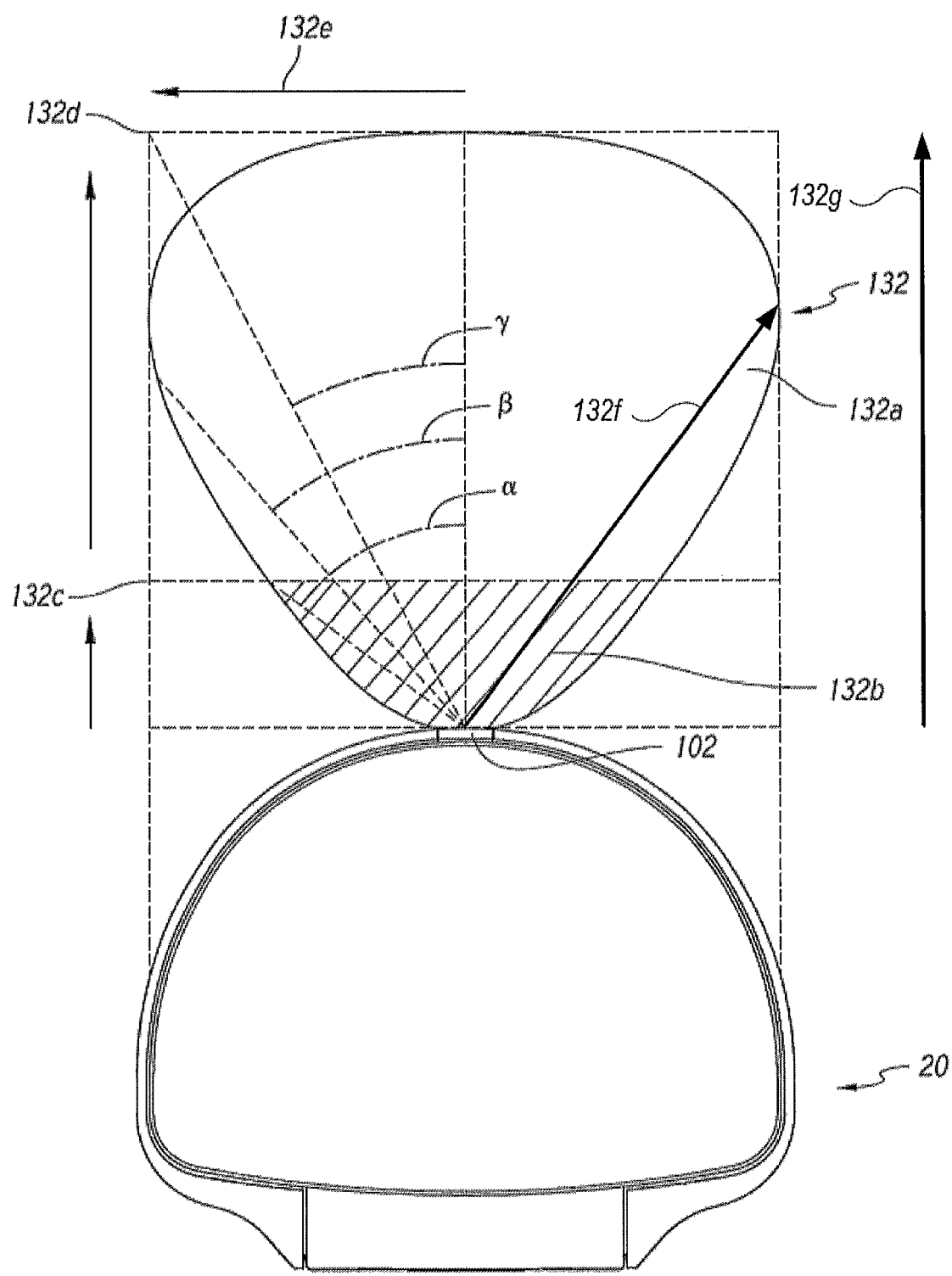
FIG. 9B illustrates an outward sensing range of the receptacle assembly shown in FIG. 1.
Figure 9C:
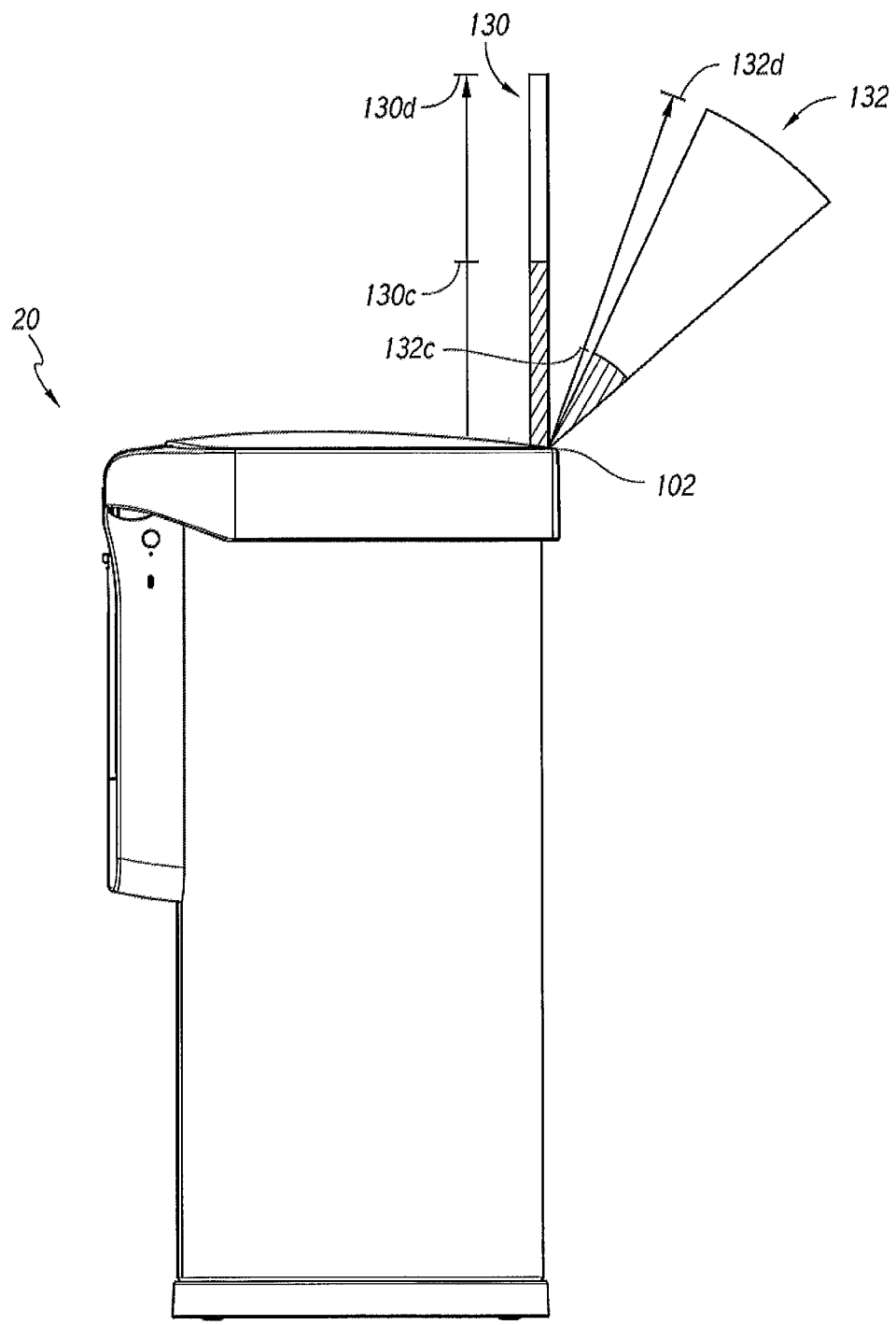
FIG. 9C illustrates a side view of a first example of the sensing ranges shown in FIGS. 9A and 9B.
Figure 9D:
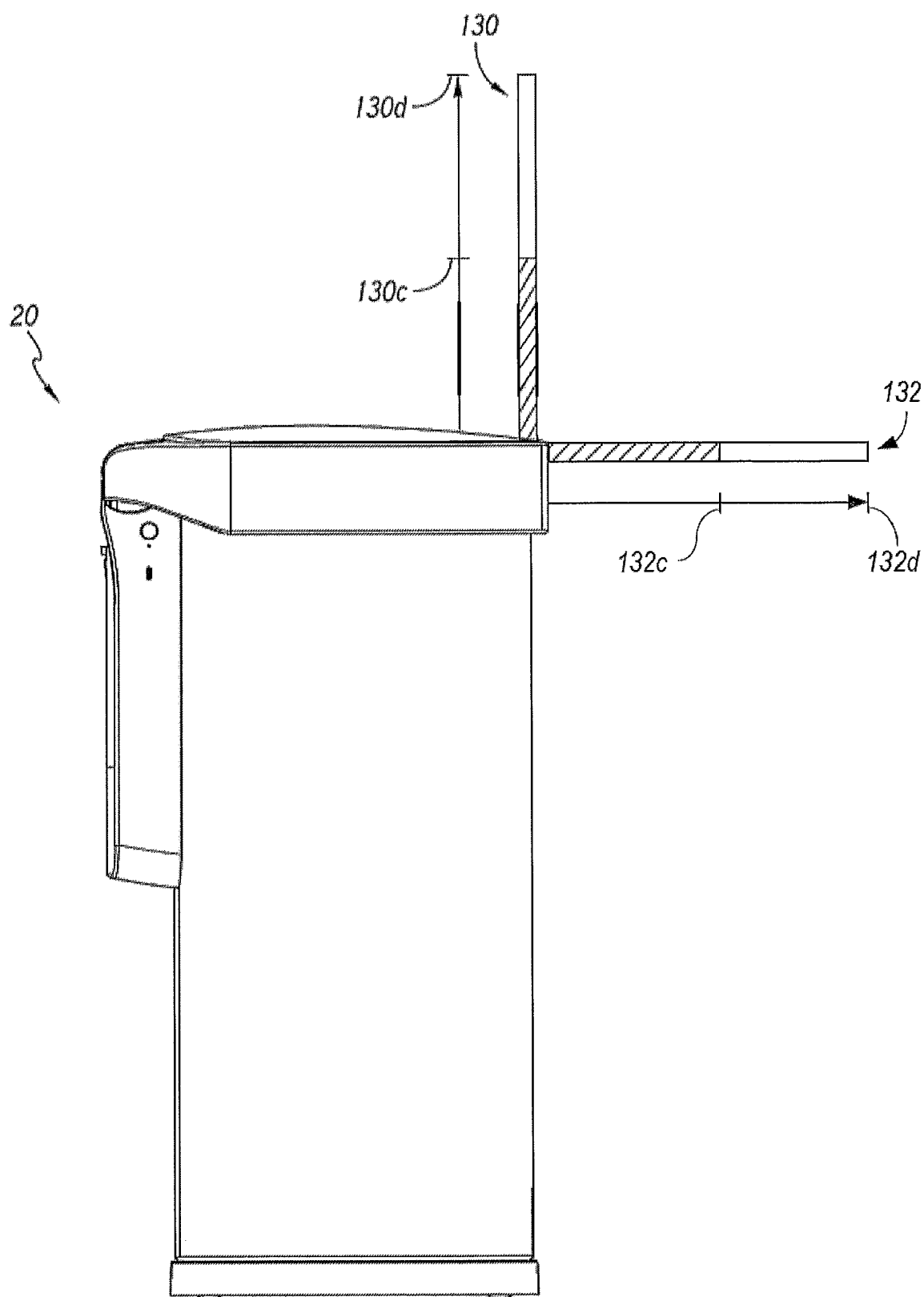
FIG. 9D illustrates a side view of a second example of the sensing ranges shown in FIGS. 9A and 9B.

As shown in FIGS. 9A and 9B, the transmitters 112*a-d* can create a first sensing region 130 extending in a first direction and a second sensing region 132 extending in a second direction. As illustrated, the sensing regions can be generally conical in shape. The conical shapes can extend along respective centerlines. In some embodiments, the first direction (e.g., along the centerline of the sensing region 130) is between about 30 degrees and about 90 degrees from the second direction, such as between about 30 degrees and about 45 degrees, between about 45 degrees and about 60 degrees, between about 60 degrees and about 75 degrees, or between about 75 degrees and about 90 degrees. The first sensing region 130 can extend generally upward, e.g., within about 15 degrees from the longitudinal axis of the trashcan assembly 20. This can enable the trashcan assembly 20 to detect user movement above the trashcan assembly 20 (e.g., from a hand waving over the lid portion 24). As mentioned above, the second sensing region 132 can extend in extending in a second direction (e.g., along the centerline of the sensing region 130). The second direction can be generally outward from the trashcan assembly 20. For example, the second direction can extend between about 0 degrees and about 60 degrees from a top surface of the trashcan assembly (e.g., about 45 degrees). This can enable the trashcan assembly 20 to detect user movement in front of the trashcan assembly 20 (e.g., from a user standing in front of the trashcan assembly 20). In some embodiments, the centerline of the first sensing region 130 and the centerline of the second sensing region 132 are approximately perpendicular to each other, such as one centerline being substantially vertical and the other centerline being substantially horizontal.

As explained above, the first subset of transmitters 112a-c can include a greater number of transmitters than the second subset of transmitters 112d. There can be a greater number of transmitters emitting light in front of the trashcan assembly 20 (e.g., between about −10 degrees and about 10 degrees from a top surface of the trashcan assembly and/or from a line perpendicular to the longitudinal axis of the trashcan) than transmitters emitting light above the trashcan assembly 20 (e.g., along an axis substantially parallel to a longitudinal axis of the trashcan assembly 20). As shown in FIG. 9C, the first subset of transmitters 112a-c can achieve a sensing region 132 having a greater depth (i.e., larger beam angle) than the sensing region 130. In certain variants, such as is illustrated in FIG. 9D, the sensing region 132 has a depth (i.e., beam angle) that is greater than or equal to the depth of the sensing region 130. In some embodiments, the each of the second subset of transmitters 112d can emit a light having a greater half angle than each of the first subset of transmitters 112a-c. The half angle being measured from the central transmission axis to a region at which an object can no longer be detected or where radiant intensity falls below 50% of the maximum value. For example, the half angle of transmitter 112d can be about 18 degrees and the half angle of each of the transmitters 112a-c can be about ten degrees.

In some embodiments, the sensing regions 130, 132 can be adjusted by modifying one or more features of the lens covering 104. For example, the sensing regions 130, 132 can change depending on the angle of the lens cover 104 relative to the axis of light transmission from the transmitters 112a-d. As another example, the sensing regions 130, 132 can change depending on the cross-sectional shape of the lens covering 104 (e.g., rectangular or triangular).

In some embodiments, sensor assembly 102 may only require enough power to generate a low power beam of light, which may or may not be visible to the human eye. In some embodiments, the sensor assembly 102 can operate in a pulsating mode. The transmitters 112a-d can be powered on and off in a cycle for short bursts lasting for any desired period of time (e.g., less than or equal to about 0.01 second, less than or equal to about 0.1 second, or less than or equal to about 1 second) at any desired frequency (e.g., once per half second, once per second, once per ten seconds). Cycling can greatly reduce the power demand for powering the sensor assembly 102. In operation, cycling does not degrade performance in some embodiments because the user generally remains in the path of the light beam long enough for a detection signal to be generated.

In some embodiments, the trashcan assembly 20 can have one or more modes of operation, for example, a ready-mode and a hyper-mode. In some embodiments, the trashcan assembly 20 can include an algorithm that determines whether and when to trigger the trashcan assembly 20 to operate in ready-mode, hyper-mode, or any other mode. For example, the algorithm can be executed by a software module of the controller 70 (e.g., a lid position controller) and can send a command to open the lid portion 24. In some embodiments, the command can be sent if (e.g., in response to) an object being detected within the ready-mode sensing regions 130b, 132b. In certain implementations, the controller 70 can send a command to open the lid, and/or to keep the lid open, if an object is detected and/or remains (e.g., for a pre-determined period of time) within the hyper-mode sensing regions 130a, 132a.

The algorithm can include various scenarios under which the trashcan assembly 20 provides an action, such as the lid portion 24 opening and closing, triggering the ready-mode and hyper-mode, or other actions. For example, broadly speaking, the algorithm can include evaluating one or more received signals and, in response, determining whether to provide an action. In some embodiments, the algorithm determines whether to provide an action in response to receipt of a signal from at least two sensors, such as at least two transmitters (e.g., the transmitter 112d and at least one of transmitters 112a-c).

In some scenarios, in the ready-mode, the lid portion 24 can open when an object is detected within at least one of the ready-mode sensing regions 130b (e.g., generally vertical region) and/or 132b (e.g., generally horizontal region). For example, in some embodiments, the lid portion 24 is opened in response to an object being detected in the sensing region 130b. In certain implementations, the trashcan assembly 20 is configured to open the lid portion 24 only in response to an object being detected in the sensing region 130 and/or does not open the lid portion 24 in response to an object being detected in the sensing region 132.

At least one of the transmitters 112a-d can operate when the trashcan assembly 20 is in the ready mode. In some embodiments, in the ready mode, the generally vertical transmitter 112d operates (e.g., emits a signal) and the generally horizontal transmitters 112a-c are deactivated (e.g., do not emit a signal). This can reduce power usage and/or the chance of unintentional opening of the lid portion 24, such as in response to a person walking by the front of the trashcan assembly 20. In some variants, the generally horizontal sensing field 132 is not produced when the trashcan assembly 20 is in the ready mode, until the vertical transmitter 112d has been emitting a signal for a period of time, but before an object is detected in the sensing region 130b, and/or until an object is detected in the sensing region 130b. In other variants, in the ready mode, both the generally vertical transmitter 112d and the generally horizontal transmitters 112a-c are activated. In some embodiments, in the ready mode, the generally vertical sensing region 130b can extend across a range 130c, for example, between about 0 inches and about 6 inches from an upper surface 102a of the sensor assembly 102.

In certain implementations, the trashcan assembly 20 produces both the first and second ready-mode regions 130b, 132b. As shown in FIGS. 9A and 9B, the upward-directed, ready-mode sensing region 130b can extend across a greater distance than the outward-directed (e.g., in front of the trashcan assembly, such as less than about 10 degrees from horizontal), ready-mode sensing region 132b. For example, the ready-mode sensing region 130b can extend across a range 130c, for example, between about 0 inches and about 6 inches from an upper surface 102a of the sensor assembly 102, and the ready-mode sensing region 132b can extend across a range 132c, for example, between about 0 inches and about 3 inches from a front surface 102b of the sensor assembly 102. An outer-most portion of the ready-mode sensing region 132 can form a beam angle at between about 30 degrees and about 90 degrees, such as about 60 degrees. The beam angle being measured from the central transmission axis to a region at which an object can no longer be detected or where radiant intensity falls below 50% of the maximum value. As mentioned above, in some embodiments, the sensing region 132 is not formed when the trashcan assembly 20 is in the ready mode. For example, some embodiments do not include the ready-mode sensing region 132b.

Once the lid portion 24 opens, the lid portion 24 can remain open so long as the sensor assembly 102 detects an object in at least one of the sensing regions 130, 132. In some implementations, when an object is no longer detected in at least one of the sensing regions 130, 132, the lid portion 24 is moved to the closed position. Alternatively, lid portion 24 can remain open for a pre-determined period of time. For example, opening the lid portion 24 can initialize a timer. If the sensor assembly 102 does not detect an object before the timer runs out, then the lid portion 24 returns to a closed position. If the sensor assembly 102 detects an object before the timer runs out, then the controller 70 either reinitializes the timer either immediately or after the timer runs out. In some embodiments, the trashcan assembly 20 can operate in a stay-open mode. If an object or movement of an object is continuously detected in the ready-mode region or hyper-mode region (if activated), then the lid portion 102 can remain open for an extended period of time. This can be useful if a large amount of refuse is being thrown in the trashcan assembly 20 or to clean the interior of the trashcan assembly 20.

Once ready-mode is activated, and/or the lid is open, and/or the sensor detects further movement in the ready-mode regions 130b, 132b, and/or the sensor detects continued presence of an object in the ready-mode regions 130b, 132b, for a pre-determined time period, then the sensor assembly 102 can enter a hyper-mode (e.g., during which the sensor assembly 102 has increased sensitivity to movement within a zone, or has a larger or wider sensitivity zone, or has some other increased sensitivity signal detection) for a pre-determined period of time. When the trashcan assembly 20 is in hyper-mode, the lid portion 24 can remain open so long as an object is detected within the ready-mode regions 130b, 132b or hyper-mode regions 130a, 132a. In some implementations, when an object is no longer detected in at least one of the sensing regions 130, 132, the lid portion 24 is moved to the closed position and/or the trashcan assembly 20 reverts to the ready-mode.

As shown in FIGS. 9A and 9B, the upward-directed, hyper-mode sensing region 130a can extend across a range between about 0 inches and about six inches from the ready-mode sensing region 130b, e.g., up to about 12 inches from the upper surface 102a of the sensor assembly 102. A width of the hyper-mode sensing region 130a can extend across at least a majority of or substantially the entire width of the trashcan assembly 20 (i.e., measured from a sidewall to the opposite sidewall of the trashcan assembly 20). For example, the width of the hyper-mode sensing region 130a can extend at least about 75% of the width of the trashcan assembly 20 and/or less than or equal to about the width of the trashcan assembly 20. The outward-directed, hyper-mode sensing region 132a can extend across a range 132d, for example, between about 0 inches and about nine inches from the ready-mode sensing region 132b, e.g., up to about 12 inches from the front surface 102b of the sensor assembly 102. In some embodiments, the extent of the ready-mode and hyper-mode regions 132c, 132d is approximately equal. A width 132e of the hyper-mode sensing region 132a can extend across at least a majority of or substantially the entire width of the trashcan assembly 20. For example, the width of the hyper-mode sensing region 132a can be at least about 75% of the width of the trashcan assembly 20 and/or less than or equal to about the width of the trashcan assembly 20. For example, width 132e can be between approximately 0 and approximately 7 inches. In some embodiments, the range 130d of the upward-directed hyper-mode region 130a can be about the same as the range 132d of the outward-directed, hyper-mode region 132a. In some embodiments, the angle of the sensing region 132 can decrease across the hyper-mode sensing region 132a. For example, an inner portion of the hyper-mode sensing region 132a can form a beam angle at between about 30 degrees and about 90 degrees, such as about 60 degrees. A mid-portion of the hyper-mode sensing region 132a can form a beam angle β between about 15 degrees and about 75 degrees, such as about 47 degrees. An outer-portion of the hyper-mode sensing region 132a can form a beam angle γ between about 0 degrees and about 60 degrees, such as about 30 degrees.

In some embodiments, the transmitter 112d is the primary transmitter. For example, in some implementations, in the ready-mode the transmitter 112d operates (e.g., emits a signal) and the transmitters 112a-c do not operate. As shown in FIGS. 9C and 9D, in some implementations, the transmitter 112d can emit a signal along an axis that is substantially parallel (e.g., between about −10 degrees and about 10 degrees from being perfectly parallel) to a longitudinal axis of the trashcan assembly 20. The ready-mode sensing region 130b can extend across a range 130c, for example, between about 0 inches and about ten inches from an upper surface 102a of the sensor assembly 102. In those embodiments in which the transmitters 112a-c are not operating in the ready-mode, the range of the ready-mode sensing region 132b is about 0 inches. The transmitter 112d can operate at a frequency of about 8 Hz in the ready-mode.

In certain scenarios, in the ready-mode, the trashcan assembly 20 determines whether a first object-detection-event has occurred, such as an object being detected in the ready-mode sensing region 130b. In some embodiments, in response to detection of the first object-detection-event, the lid portion 24 is opened. In some variants, in response to the first object-detection-event, the trashcan assembly 20 can enter the hyper-mode. In some embodiments, the lid portion 24 is opened when (e.g., before, concurrent with, or immediately following) the trashcan assembly 20 enters the hyper-mode. In certain variants, unlike some scenarios described above, the lid portion 24 is not opened when the trashcan assembly 20 enters the hyper-mode. Rather, as will be described in more detail in the following paragraphs, in some embodiments, satisfaction of a further condition (e.g., a further object detection) is needed for the lid portion 24 to be opened. In some implementations, a further condition (e.g., a further object detection) is needed for the lid portion 24 to be kept open.

In some embodiments, in the hyper-mode, the transmitter 112d continues to operate and the transmitters 112a-c begin to operate as well. In embodiments in which the transmitters 112a-c are active before the first object-detection-event (e.g., the transmitters 112d and 112a-c become active concurrently, the transmitter 112d becomes active before the transmitters 112a-c, the transmitters 112a-c become active before the transmitter 112d, etc.), in the hyper-mode, the transmitter 112d and the transmitters 112a-c continue to operate. In some variants, the transmitter 112d can stop operating, such as until the receiver 114 detects an object in the sensing region 132 and/or until the sensor assembly 102 reverts to the ready-mode. As shown in FIG. 9D, the transmitters 112a-c can emit a signal between about −10 degrees and about 10 degrees from a top surface of the trashcan assembly 20 and/or along a line generally perpendicular to the longitudinal axis of the trashcan assembly 20. In certain embodiments, each transmitter 112a-d emits a signal about every quarter of a second (e.g., each transmitter 112a-d operates at a frequency of about 4 Hz). The transmitters 112a-d can operate sequentially such that no two transmitters 112*a-d* emit a signal at the same time. The sequenced transmitters 112*a-d* can operate in any order.

In various embodiments, in the hyper-mode the extent of the sensing range can increase compared to the ready mode. For example, as shown in FIGS. 9A and 9B, in hyper-mode the upward-directed extent of the sensing region can increase, such as between about 0 inches and about five inches beyond the upper extent of the ready-mode sensing region 130*b*. In some embodiments, the hyper-mode sensing region 130*a* extends vertically to about 15 inches from the upper surface 102*a* of the sensor assembly 102. A width of the hyper-mode sensing region 130*a* can extend across at least a majority of or substantially the entire width of the trashcan assembly 20 (e.g., measured from a sidewall to the opposite sidewall of the trashcan assembly 20). For example, the width of the hyper-mode sensing region 130*a* can extend at least about 75% of the width of the trashcan assembly 20 and/or less than or equal to about the width of the trashcan assembly 20. In some embodiments, the sensor assembly 102 changes its sensitivity in the hyper-mode, such as being more sensitive in the hyper-mode than in the ready-mode.

Various techniques can be employed to increase the extent of the sensing range and/or to increase the sensitivity of the sensor assembly 102. For example, in some embodiments, the amount of power supplied to the transmitters 112*a-d* and/or the power of the emitted signal is increased. In certain embodiments, the sensitivity of the receiver 114 is increased in the hyper-mode. For example, the minimum signal level (also called the threshold) that is determined to be a detected object can be reduced. In some implementations, the detected signal is filtered (to reduce noise which could lead to erroneous object detections) and the amount of filtering is decreased in the hyper-mode. This may result in certain object detections that would be filtered-out in the ready-mode not being filtered-out in the hyper-mode.

In the hyper-mode, the outward-directed (e.g., generally horizontal) sensing region 132 can be produced. As shown in FIG. 9B, the sensing region 132 can extend across a range 132*d*. For example, sensing region 132 can extend between about 0 inches and about 12 inches from the front surface 102*b* of the sensor assembly 102. A width 132*e* of the hyper-mode sensing region 132 can extend across at least a majority of or substantially the entire width of the trashcan assembly 20. For example, the width of the sensing region 132 can be at least about 75% of the width of the trashcan assembly 20 and/or less than or equal to about the width of the trashcan assembly 20. For example, width 132*e* can be between approximately 0 and approximately 7 inches. A length 132*f* of a distance between the sensor assembly 102 on the central transmission axis and an outer edge of the sensing region 132*a* at which an object can no longer be detected or where radiant intensity falls below 50% of the maximum value can be between approximately 0 and approximately 10 inches. In some implementations, a length 132*g* of the sensing region 132 can be between approximately 0 and approximately 12 inches. In some embodiments, the range 132*d* of the outward-directed sensing region 132 the can be about the same as range 130*d* of the upward-directed hyper-mode sensing region 130*a*. In some embodiments, the angle of the sensing region 132 can decrease across the sensing region 132*a* and/or 132*b*. For example, an inner portion of the sensing region 132*a* and/or 132*b* can form a beam angle at between about 30 degrees and about 90 degrees, such as about 60 degrees. A mid-portion of the sensing region 132*a* and/or 132*b* can form a beam angle β between about 15 degrees and about 75 degrees, such as about 47 degrees. An outer-portion of the sensing region 132*a* and/or 132*b* can form a beam angle γ between about 0 degrees and about 60 degrees, such as about 30 degrees.

In some embodiments, in hyper-mode, the trashcan assembly 20 determines whether a second object-detection-event occurs. For example, in hyper-mode, the trashcan assembly 20 can look, for a certain period, to see if an object is within the sensing region 130 and/or the sensing region 132. In some embodiments, such an object can be detected by light from one of the transmitters 112*a-c* being reflected off of the object and received by the receiver 114. The receiver 114 can wait for reflected signals, or any other signals, that may indicate that an object is detected within the sensing region 132 for a first predetermined period (e.g., approximately 1 second, approximately 5 seconds, etc. or a time based on a time it takes the transmitters 112*a-d* to emit a predetermined number of signals). In some embodiments, some or all of the transmitters 112*a-c* may continue to operate for the first predetermined period of time after the sensor assembly 102 transitions to the hyper-mode. In certain implementations, if a second object-detection-event is not detected (e.g., no object is detected within the sensing region 132) during the first predetermined period, then the sensor assembly 102 reverts to the ready-mode and/or closes the lid portion 24. In some implementations, such reversion includes reducing or stopping operation of the transmitters 112*a-c*. In other implementations (e.g., implementations in which the transmitters 112*a-c* are active in the ready-mode), such reversion may not affect operation of the transmitters 112*a-c*.

In some implementations, during the hyper-mode, in response to the trashcan assembly 20 determining that the second object-detection-event has occurred, the lid portion 24 is opened and/or kept open (e.g., not closed). For example, in hyper-mode, in response to an object being detected within the sensing region 130 and/or the sensing region 132 for a second predetermined period of time (e.g., approximately 0.5 seconds, approximately 1 second, etc. or a time based on a time it takes the transmitters 112*a-d* to emit a predetermined number of signals), then the controller 70 (via a software module running the algorithm, such as the lid position controller) can send a command to trigger the trashcan assembly 20 to open the lid. In some embodiments, the object is determined to be detected for the second predetermined period when: the object is detected at first and second moments spaced by the second predetermined period, the object is detected at least twice in a span of time equal to the second predetermined period, and/or the object is detected continuously during a span of time equal to the second predetermined period.

In some embodiments, the second object-detection-event only occurs if the object is detected for a sufficient amount of time to indicate that the object's presence near the trashcan assembly 20 is not merely fleeting or transitory. An example of a fleeting or transitory object detection may occur when a person walks by the trashcan assembly 20. The person may pass their hand, or a part of clothing, unintentionally above the lid portion 24 and within the ready-mode sensing region 130*b*, and then continue to walk away from the trashcan assembly 20. In such a situation, some it may be desirable to not open the lid. This can reduce unintended operation of the lid portion 24 (which can be perceived as annoying by a user), reduce power usage, reduce the chance of escape of odors in the trashcan assembly 20, and/or increase the operational life of the trashcan assembly 20. In various embodiments, the trashcan assembly 20 is configured such that a person may pass by the trashcan assembly 20 without the lid portion 24 opening and/or such that the lid portion 24 automatically opens only after a person slows below a maximum speed (e.g., or stops next to (e.g., in front of) the trashcan assembly 20. In some embodiments, the maximum speed is less than the normal walking speed for a human, such as about 3.1 mph. In some embodiments, the trashcan assembly 20 is configured to open the lid portion 24 in response to an object being detected in the ready-mode sensing region 130b, and further configured to close the lid portion 24 soon thereafter (e.g., within less than about 30 seconds from the start of the opening action) if a further object detection event is not detected in at least one of the regions 130, 132.

In some embodiments, the lid portion 24 remains open as long as the object is detected within the sensing region 130 or the sensing region 132. For example, in certain implementations, in hyper-mode, the lid portion 24 is kept open if an object is detected in the sensing region 130a or if an object is detected in the sensing region 132a. In certain embodiments, the controller 70 transmits a command to close the lid portion 24 if no object has been detected in the sensing region 130 or the sensing region 132 for at least a third predetermined period of time (e.g., approximately 1 second, approximately 5 seconds, etc. or a time based on a time it takes the transmitters 112a-d to emit a predetermined number of signals). In various embodiments, the sensor assembly 102 reverts to the ready-mode after the lid portion 24 is closed and/or in response to no object being detected in the sensing regions 130, 132 for at least the third predetermined period.

The software module of the controller 70 (e.g., the lid position controller) can implement a timer or a counter to determine whether the first, second, and/or third predetermined period of time has passed. Alternatively, the trashcan assembly 20 can include a mechanical timer that transmits a signal to the controller 70 when the timer expires or fires to indicate that the timer has expired.

In certain embodiments, the range and/or angles of the sensing regions 130a, 130b, 132a, and/or 132b are predetermined (e.g., set to the values disclosed above). In other embodiments, the range and/or angles of the sensing regions 130a, 130b, 132a, and/or 132b can be adjusted by a user. For example, a switch, dial, or other physical component may allow a user to adjust the range and/or angle settings. As another example, the trashcan assembly 20 (e.g., the sensor assembly 102) includes a wireless transceiver in communication with the controller 70 (e.g., a Bluetooth transceiver, a Wi-Fi transceiver, etc.). As yet another example, the trashcan assembly 20 can include a port (e.g., a universal serial bus port) in communication with the controller 70. The user can adjust the range and/or angle settings via an application running on a mobile device (e.g., cell phone, tablet, laptop, watch, etc.) or on any other computing device (e.g., a desktop) and the mobile device can transmit the user-provided adjustments wirelessly to the wireless transceiver of the trashcan assembly 20. The trashcan assembly 20 may then adjust the range and/or angle settings accordingly.

In some embodiments, these arrangements of transmitter(s) and/or receiver(s), or one or more other arrangements of transmitter(s) and/or receiver(s), in cooperation with one or more processing algorithms in the controller, can be configured to trigger an opening of the lid, in either the ready-mode or the hyper-mode, that occurs in one or more of the following situations: (a) when an object is positioned at or near a front, top, lateral corner or region (left or right) of the trashcan assembly; (b) when an object is positioned in front of the front plane or front portion of the trashcan assembly and spaced further laterally away from a lateral side (either left or right) or lateral face of the trashcan; (c) when an object is positioned at or below the top plane of the lid in the closed position, such as below the top plane of the lid in the closed position by at least about the front height of the trim ring, and/or below the plane of the lid in the closed position by at least about 2 inches, and/or below the plane of the lid in the closed position by at least about the front-to-rear thickness of the trim ring; (d) when an object is positioned above the topmost surface of the trashcan; (e) when an object is positioned above the topmost surface of the trashcan and in front of the frontmost surface of the trashcan; and/or (f) when an object is positioned above the topmost surface of the trashcan and behind the frontmost surface of the trashcan. In some embodiments, the sensing regions 130, 132 may have varying levels of sensitivity. The transmitters 112a-d can emit cones of light, which define the sensing regions 130, 132 of the sensors (subject to the nominal range of the sensor assembly 102). The areas in which two or more cones overlap can create sensing regions with increased sensitivity. Portions of the sensing regions 130, 132 in which cones do not overlap create regions of decreased sensitivity. A user may need to be present in the regions with decreased sensitivity for a longer period of time, or move closer to a transmitter or receiver, to trigger lid movement as compared to regions with increased sensitivity.

In some embodiments, the controller 70 can trigger an extended-chore mode in which the trim ring portion 38 can open (as described above) to permit the user to replace the bag liner or clean the interior of the trashcan assembly 20. For example, the trashcan assembly 20 can include a separate sensor assembly or sensing region (e.g., on a lateral sidewall of the body portion 22 or the rear wall 28 of the body portion) configured to trigger the extended-chore mode. As another example, the user can trigger the extended-chore mode by particular hand motions. In some embodiments, the user can manually position the trim ring portion 38 in an open mode.

Environmental Calibration

In some embodiments, the controller 70 can trigger a calibration-mode in which sensing thresholds of receiver 114 may be adjusted to account for changes in environment surrounding the trashcan assembly 20. The calibration-mode can be configured to avoid unintended actuation (e.g., opening) of the trashcan lid by stationary objects located within one or more sensing zones 130b, 132b. For example, receiver 114 of sensor assembly 102 may detect an object within sensing regions 130b, 132b by detecting one or more signals from one or more of transmitters 112a-d that are reflected off from the object. Having detected an object in one or more of the sensing regions 130b, 132b, the sensor assembly 102 can send a signal to the controller 70 to activate a function of the trashcan assembly 20, e.g., ready-mode. However, situations may occur where a permanently or temporarily stationary or static object is located within one or more of sensing regions 130b, 132b of trashcan assembly 20, such as when the user places the trashcan assembly 20 near a stationary object, thereby positioning the object within sensing regions 130b, 132b. Some examples of stationary objections that may routinely be placed within a sensing region 130b, 132b include a wall, or a piece of furniture, or the underside of a table or desk, or an interior of a cabinet, or a door. For example, the trashcan assembly 20 may be placed under a table located within at least one of the sensing regions 130b, 132b. This may result in unintended or accidental operation of lid portion 24 due to the table being positioned within sensing regions 130b, 132b, because receiver 114 may detect a signal, reflected from the table, above the sensing threshold, causing sensor 102 to send a signal to controller 70 to activate the ready-mode. In another example, degradation of receiver 114 over time may result in sensor drift, which may cause unintended actuation of lid portion 24. In some embodiments, an algorithm included in controller 70 can send a command to adapt the sensing thresholds of receiver 114 based at least in part on changes in the surrounding environment located within the sensing regions 130b, 132b.

Figure 13:
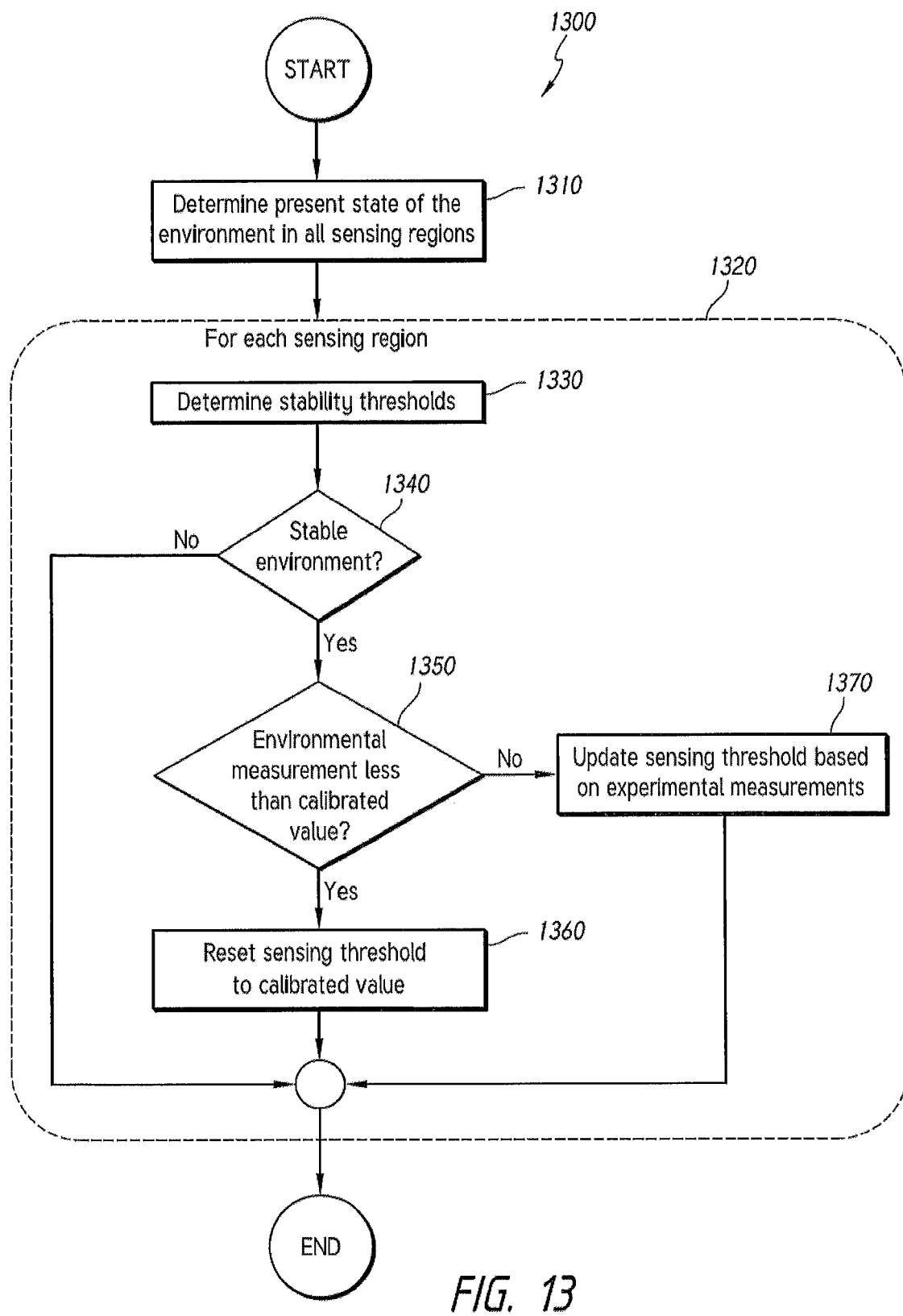
FIG. 13 schematically illustrates a method for adapting sensing thresholds of the receptacle assembly shown in FIG. 1.

An example method of adapting sensing conditions of trashcan assembly 20, in accordance with some embodiments, will now be described in reference to FIG. 13. In some embodiments, the adaptable sensing condition is a sensing threshold of receiver 114 that is adaptable based, at least in part, on a change in the environment positioned within the sensing regions 130, 132. Process 1300 may be performed by controller 70 of trashcan assembly 20, as described in reference to FIG. 11A. The method can be implemented, in part or entirely, by a software module of the controller 70 or implemented elsewhere in the trashcan assembly 20, for example by one or more processors executing logic in controller 70. In some embodiments, controller 70 includes one or more processors in electronic communication with at least one computer-readable memory storing instructions to be executed by the at least one processor of controller 70.

In some embodiments, process 1300 starts at a start block where a calibration-mode can be initiated. In some embodiments, process 1300 may be initiated by an algorithm of controller 70 that is configured to periodically scan the surrounding environment. This scan can occur with or without user initiation or interaction. For example, in automatic calibration, at a set time interval (e.g., once an hour, once a day, once a week, etc.) controller 70 may send a command to trigger calibration-mode. The automatic periodic scan permits the trashcan assembly 20 to continuously and automatically monitor the surrounding environment and update sensing thresholds in accordance with the method described in reference to FIG. 13. In some embodiments, the controller 70 can include an algorithm configured to send a command triggering calibration-mode based on user input. For example, trashcan assembly 20 may include a button (not shown) that a user may operate to manually activate a calibration-mode, such as when the trashcan is positioned in a new location near stationary objects. In some embodiments, a user may place a stationary object within sensing regions 130b, 132b (e.g., by moving a piece of furniture near the trashcan assembly 20 or by moving the trashcan assembly 20 near a piece of furniture) and the detection of the object within the sensing regions 130b, 132b may trigger a calibration-mode prior to activating ready-mode. For example, if the trashcan assembly 20 is actuated by an object within a sensing region 130b, 132b that does not move for longer than a set period of time (e.g., 5 minutes, 10 minutes, 30 minutes, an hour, etc.), then a calibration-mode may be triggered. In some embodiments, controller 70 may automatically send a command to trigger a calibration-mode when a user manually moves the lid (e.g., to open or close it). For example, if the lid is improperly opening or remaining open because a stationary object is within one or more sensing regions 130b, 132b, a user may manually close the lid, which may automatically trigger a calibration-mode. Also, if a user manually opens the lid portion 24, this may be indicative that one or more current sensing thresholds are inaccurate and that the controller 70 is missing events that should cause trashcan assembly 20 to actuate.

After calibration-mode is initiated, the process 1300 continues to block 1310, where a present state of the environment surrounding trashcan 20 is determined. For example, present proximity measurements are acquired for one or more or all sensing regions of trashcan assembly 20. In some embodiments, one or more proximity measurements may represent the distance between the trashcan assembly 20 and objects located in the environment surrounding the trashcan assembly 20. In some embodiments, acquiring proximity measurements for sensing regions includes detecting one or more objects located within sensing regions 130, 132. For example, the transmitters 112a-d may emit a signal into sensing regions 130, 132 and objects located within sensing regions 130, 132 may cause a reflected signal. The reflected signal, detected by receiver 114, may cause the sensor assembly 102 to send an electronic signal to the controller 70 to store information about nearby objects in the sensing regions 130b, 132b in the memory of controller 70. It will be understood that, while the embodiments disclosed herein refer to sensing regions 130 and 132, the method of FIG. 13 may not be limited to one or two sensing regions, but may include any number of sensing regions or directions. After determining the present state of the environment, the process continues to subprocess 1320 for each sensing region of the trashcan assembly 20.

For a plurality of sensing regions, subprocess 1320 can continue to block 1330, where stability thresholds are determined. In some embodiments, the stability thresholds may be based, at least in part, on past proximity or environmental measurements of a given sensing region. A set of past proximity measurements may be stored in the memory of controller 70. The controller 70 may be configured based on instructions to compute the stability thresholds based on the set of past proximity measurements. For example, the stability threshold may include an average of past proximity measurements. In some embodiments, the stability threshold may be based on all past measurements, or the average may be based on a set of past measurements corresponding to a predetermined time period (e.g., past proximity measurements of the previous day or week or month). In some embodiments, the stability threshold may include a determination of the variability within the past proximity measurements of a given sensing region. For example, the stability threshold may be based on the standard deviation of past proximity measurements used to determine the average proximity measurement.

After the stability thresholds are determined, the process 1300 continues to decision block 1340, where a determination is made as to whether the environment is stable within a given sensing region. In some embodiments, the environment may be deemed stable based, at least in part, on a comparison of the stability thresholds and the current proximity measurement for a given sensing region. For example, if the current proximity measurement acquired in block 1310 for a given sensing region is outside, e.g., exceeds or is below, the stability threshold determined in block 1330, then the environment is not determined to be stable (e.g., "not stable"). In some embodiments, where the current proximity measurement from block 1310 is off of the average proximity measurement and outside of the standard deviation, then the environment may be deemed not stable. In some embodiments, if decision block 1340 determines that the environment is not stable, then the process 1300 continues to an end block, the sensing threshold is not updated, and the process 1300 is complete. In some embodiments, the determination that the environment is not stable may trigger one or more other functions of trashcan assembly 20, e.g., ready-mode, hyper-mode, etc., as detailed herein.

If decision block 1340 determines that the environment is stable, based, at least in part, on the comparison of the stability thresholds and present state of the environment, then process 1300 continues to decision block 1350. At decision block 1350 a determination is made as to whether the environmental measurement (e.g., the distance between a sensor and a stationary object) of a given sensing region is less than a calibrated value for that sensing region. In some embodiments, the calibrated value may be the sensing threshold of receiver 114 preinstalled in the controller 70 that causes sensor assembly 102 to send a signal to controller 70 to activate a function of the trashcan assembly 20. The calibrated value may be based on an expected detection of reflected light of an object in sensing regions 130*b*, 132*b* that activates ready-mode operation. The calibrated value may be locally stored in the memory of controller 70. In some embodiments, the predetermined calibrated value may include sensing thresholds previously updated due to a prior iteration of process 1300. In some embodiments, the stability of the environment may be determined based at least in part on the present state of the environment for a given sensing region determined in block 1310. In some embodiments, the stability of the environment may be determined based at least in part on the average of past proximity measurements determined in block 1330. In some embodiments, the controller 70 may include an algorithm configured to send a command to compare the proximity measurement with the calibrated value.

If a determination is made that the environmental measurement is less than the predetermined calibrated value, then process 1300 continues to block 1360. At block 1360, the sensing threshold for a given sensing region is reset to the calibrated value. For example, the sensing thresholds may be adjusted to the preinstalled sensing threshold based on the calibrated value, thereby prohibiting receiver 114 from detecting objects outside of the given sensing regions, for example, due to sensor drift. In some embodiments, the updated sensing threshold may be stored in the memory of controller 70.

If the determination at decision block 1350 is that an environmental measurement is greater than the calibrated value, then process 1300 continues to block 1370. At block 1370, the sensing threshold for a given sensing region is normalized based on the environmental measurement. The updated sensing threshold may be stored in the memory of controller 70. In some embodiments, the environmental measurement may be based on the present state of the environment, as determined in block 1310. In some embodiments, the environmental measurement may be based on the average of past proximity measurements, as determined in block 1330. In embodiments where the environmental measurement is greater than the calibrated value, the environmental measurement may represent a static change in the environment located within in the given sensing region. The controller 70 may include an algorithm to issue a command to normalize or calibrate the sensing thresholds, such as in process 1300, to accommodate the static change. For example, the sensing thresholds may be adjusted or normalized. For example, a reflected signal received by receiver 114 from a static change may produce an adjustment or normalization that represents a triggering measurement beyond which the ready-mode operation will be activated. In some embodiments, unintended or accidental movement of lid portion 24 may be avoided by normalizing the sensing thresholds based on the static change.

In some embodiments, the sensing threshold may be updated to be equal to the environmental measurement plus a margin. Thus, the sensing thresholds may be set marginally beyond the environmental measurement, for example, based on the standard deviation determined in block 1330. By setting the sensing threshold marginally beyond the environmental measurement, the controller 70 may account for noise detected by sensor assembly 102 or other inconsequential variations in the detected surroundings. Sensing thresholds can be adapted or normalized to accommodate static changes in the surrounding environment, e.g., a new piece of furniture placed near trashcan assembly 20. In some embodiments, a fixed object or static object within sensing regions 130*b*, 132*b* may not trigger ready-mode, or may avoid a repeated triggering or ready-mode, thereby avoiding repeated unintended or accidental opening of the lid portion 24.

Once the sensing thresholds are updated for one or more sensing regions, either from block 1360 or 1370, the process 1300 continues to an end block and the process 1300 is completed. Upon completion of process 1300, the process 1300, or portions thereof, may be repeated. In some embodiments, the controller 70 may continuously or periodically monitor the surrounding environment and update the sensing thresholds as needed. In some embodiments, controller 70 may send a command to trigger calibration-mode based on a predetermined time interval, e.g., once an hour, a day, a week, or a month, etc. In some embodiments, controller 70 may monitor the surrounding environment to update sensing thresholds as necessary without constantly operating sensor assembly 102. in some embodiments, periodic rather than continuous running of calibration-mode, including sensor assembly 102, can reduce the power demand for powering the sensor assembly 102, thereby improving the performance and life of sensor assembly 102. In some embodiments, controller 70 may not trigger process 1300 until receiving a user input, e.g., user operating a button or selecting a command prompt.

Lid Driving Mechanism

As mentioned above, the backside enclosure 56 can house a power source 66 and a power-operated driving mechanism 58 to drive lid movement. The driving mechanism 58 can include a drive motor 78 and a shaft 80. In some embodiments, the driving mechanism 58 can include a clutch member 84 that can translate along at least a portion of the longitudinal length of the shaft 80. The clutch member 84 can be positioned on the motor shaft 80 between a biasing member 82 (e.g., a spring) and an end member 86 (e.g., a torque transmission member) (see FIG. 12), such that the biasing member 82, the clutch member 84, and the end member 86 are generally coaxial. At least some of the driving mechanism components can be removably coupled to facilitate repair, replacement, etc.

Figure 12:
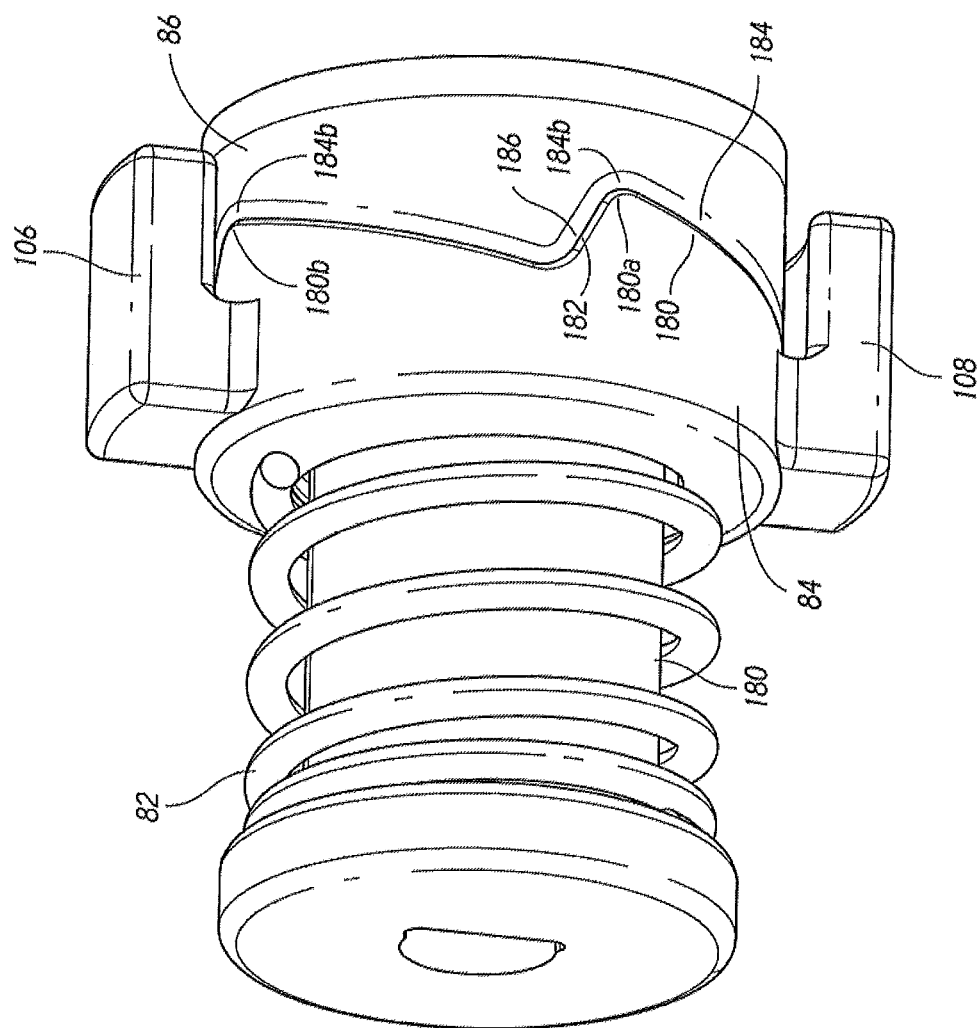
FIG. 12 illustrates an enlarged perspective view of a portion of a drive mechanism of FIG. 11A.

As shown in FIG. 12, the clutch member 84 can include one or more torque transmission members, such a first arm 106 and a second arm 108 that can extend radially outward from a body of the clutch member 84. In some embodiments, the arms 106, 108 can be spaced apart from each other, such as by about 180 degrees. Various other angles are contemplated, such as at least about: 30°, 45°, 60°, 90°, 120°, values in between, or otherwise.

In some embodiments, the end member 86 can be fixed to the motor shaft 80 (e.g., by a fastener), such that torque from the motor 78 can be transmitted through the shaft 80 and into the end member 86. The biasing member 82 can bias the clutch member 84 against the end member 86 to form a frictional interface between the clutch 84 and end member 86. The frictional interface causes the clutch member 84 to rotate when the end member 86 rotates.

As shown in FIG. 11A, the lid portion 24 can include a rear portion 64 covering at least a portion of the driving mechanism 58. The lid portion 24 can include a lid driving portion 74 positioned at or near the rear underside of the lid portion 24. The lid-driving portion 74 can abut, mate, contact, receive, and/or be received by the drive mechanism 58 to facilitate opening and closing the lid portion 24. For example, the lid-driving portion 74 can be generally arcuately-shaped and surround at least a portion of the drive mechanism 58. The lid-driving portion 74 can include rotation support members, such as a first flange 88 and a second flange 90 that can extend radially inward. The flanges 88, 90 can interface with the clutch member 84, such that rotation of the clutch member 84 can drive lid movement. Rotational force produced by the motor 78 (via the shaft 80, end member 86, and/or clutch member 84) encourages rotation of the arms 106, 108 against the flanges 88, 90 to rotate the lid portion 24.

In some scenarios, a user may accidentally or intentionally try to manually close or open the lid portion 24. However, manually closing the lid portion 24 when the motor has opened or is in the process of opening the lid portion 24 acts against the operation of the motor 78 and can damage components of driving mechanism 58. For example, when the motor 78 is opening the lid portion 24, the motor 78 encourages the arms 106, 108 to abut against and turn the flanges 88, 90 in a first direction. Yet, when a user manually attempts to close the lid portion 24, the lid and the flanges 88, 90 are encouraged to rotate in a second direction opposite the first direction. In this scenario, the arms 106, 108 are being encouraged to rotate in opposite directions concurrently, which can damage the clutch member 84, the shaft 80, and the motor 78.

To avoid such damage, the clutch member 84 can be configured to rotate relative to the end member 86 or other components, such that manual operation of the lid portion 24 does not damage (e.g., strip or wear down) components of the driving mechanism 58. In some embodiments, the clutch member 84 can include a first cam surface 180 and a first return surface 182 (see FIG. 12). The first cam surface 180 can be inclined from a first level to a second level, in relation to a plane extending generally transverse to the longitudinal axis of the clutch member 84. The first return surface 182 can intersect the first cam surface 180 and can be disposed between the first and second levels.

The end member 86 can include a second cam surface 184 and a second return surface 186. The second cam surface 184 can be inclined from a first level to a second level, in relation to a plane extending generally transverse to the longitudinal axis of the end member 86 and the shaft 80. The second return surface 186 can intersect the first cam surface 180 and can be disposed between the first and second levels.

The second cam surface 184 and the second return surface 186 of the end member 86 can be shaped to correspond with the first cam surface 180 and the first return surface 182 of the clutch member 84, thereby allowing mating engagement of the end member 86 and the clutch member 84. For example, summits 180*a* of the first cam surface 180 can be nested in the valleys 184*b* of the second cam surface 184, and summits 184*a* of the second cam surface 184 can be nested in the valleys 180*b* of the first cam surface 180.

When the lid portion 24 is manually operated, the first inclined cam surface 180 can move relative to the second inclined cam surface 184. As the inclined cam surface 180 slides relative to the second inclined cam surface 184, the summit 180*a* circumferentially approaches the summit 184*a*. The relative movement between the first and second inclined cam surfaces 180, 184 (e.g., by the interaction of the inclines) urges the clutch member 84 away from the end member 86 along the longitudinal axis of the shaft 80 (e.g., in a direction generally toward the motor 78 and against the bias of the biasing member 82). The end member 86 can be generally restrained from moving longitudinally (e.g., by the fastener). Since the clutch member 84 is displaced from the end member 86, manual operation of the lid portion 24 can be performed without imposing undue stress on, or damage to, components of the trashcan assembly 20

When manual operation of the lid portion 24 ceases, the biasing member 82 can return the clutch member 84 into generally full engagement with the end member 86. Re-engaging the clutch member 84 and the end member 86 permits transmission of torque from the motor 78 to the clutch member 84 to drive lid movement.

Figure 11B:
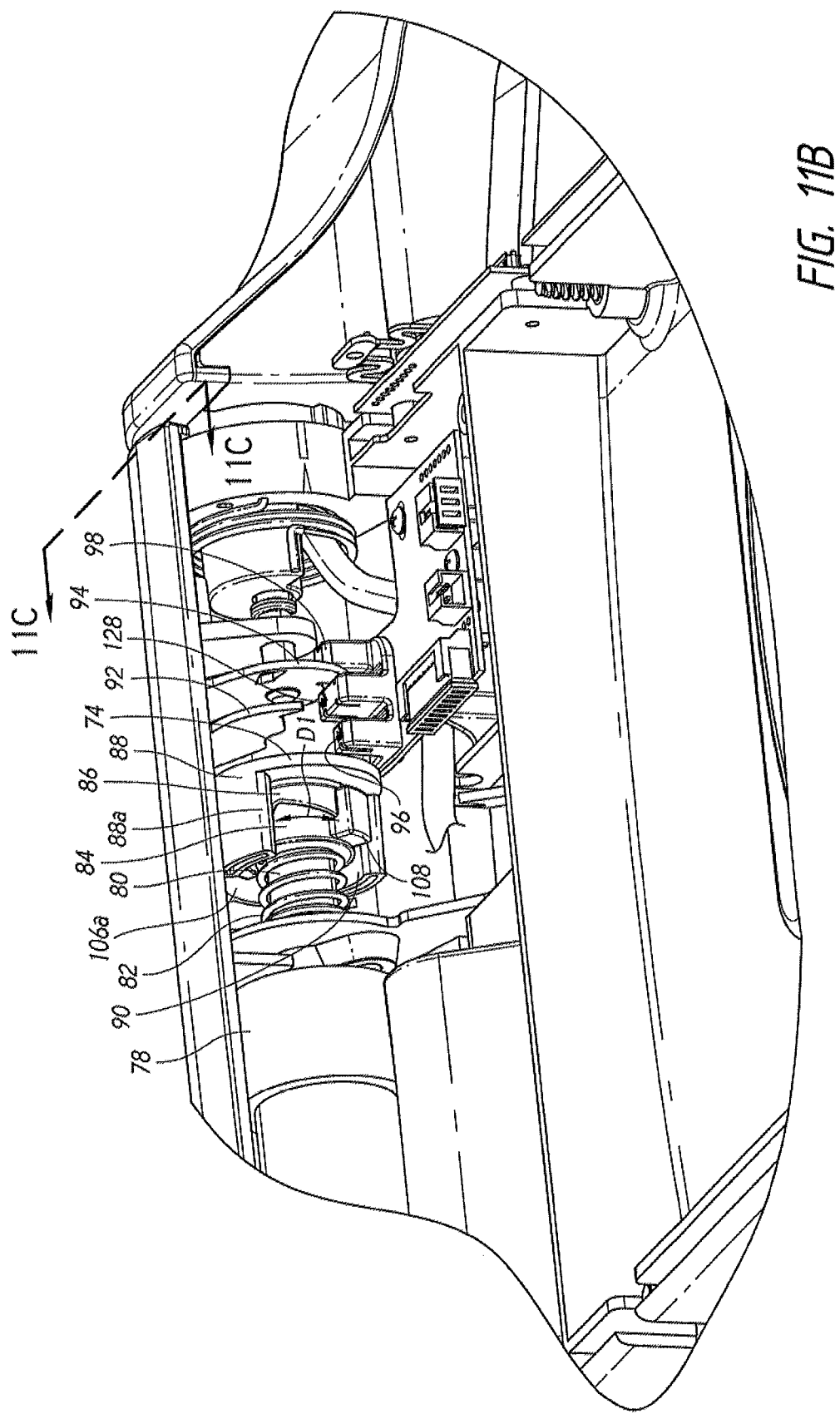
FIG. 11B illustrates an enlarged view of the driving mechanism shown in FIG. 11A.
Figure 11C:
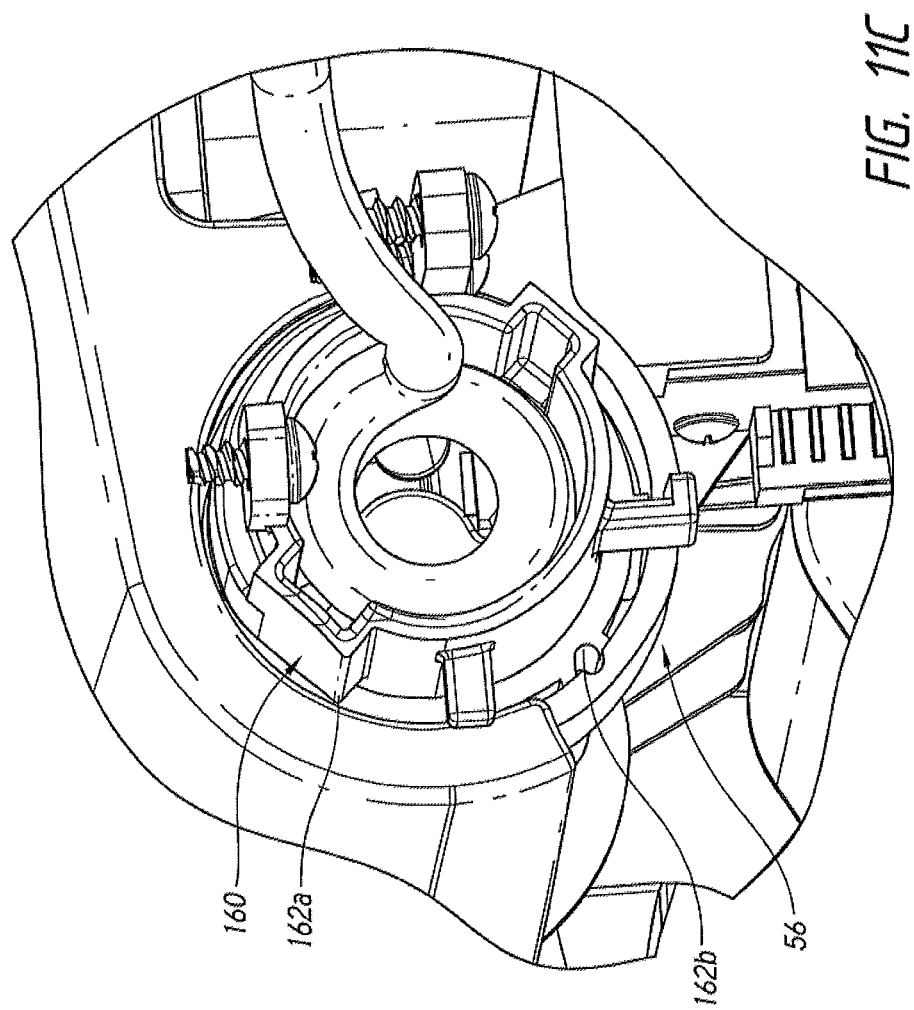
FIG. 11C illustrates an enlarged, cross-sectional view of the trim ring portion shown in FIG. 11B taken along line 11C-11C.

As shown in FIG. 11B, when the first arm 106 abuts the first flange 88 and the second arm 108 abuts the second flange 90, a circumferential distance D1 exists between a non-abutted surface 108*a* of the second arm 108 and a non-abutted surface 88*a* of the first flange 88. In some embodiments, a generally equal circumferential distance D2 (not shown) exists between a non-abutted surface 106*a* of the first arm 106 and a non-abutted surface 90*a* (not shown) of the second flange 90. In certain configurations, the circumferential distance D1 and/or D2 is greater than or equal to the amount of rotation of the lid from the open to the closed position. For example, the circumferential distance D1 and/or D2 can be at least about 60° and/or less than or equal to about 125°. In certain variants, the circumferential distance D1 and/or D2 is greater than or equal to about 80°.

Due to the circumferential distances D1, D2 between the non-abutted surfaces 88*a*, 90*a* of the flanges 88, 90 and the non-abutted surfaces 106*a*, 108*a* of the arms 106, 108, the lid portion 24 can be manually operated without turning the motor 78. If a user were to operate the lid portion 24 manually, the flanges 88, 90 would rotate without applying force to the arms 106, 108 of the clutch member 84, and thus rotate the lid without damaging components of the driving mechanism 58.

Figure 16B:
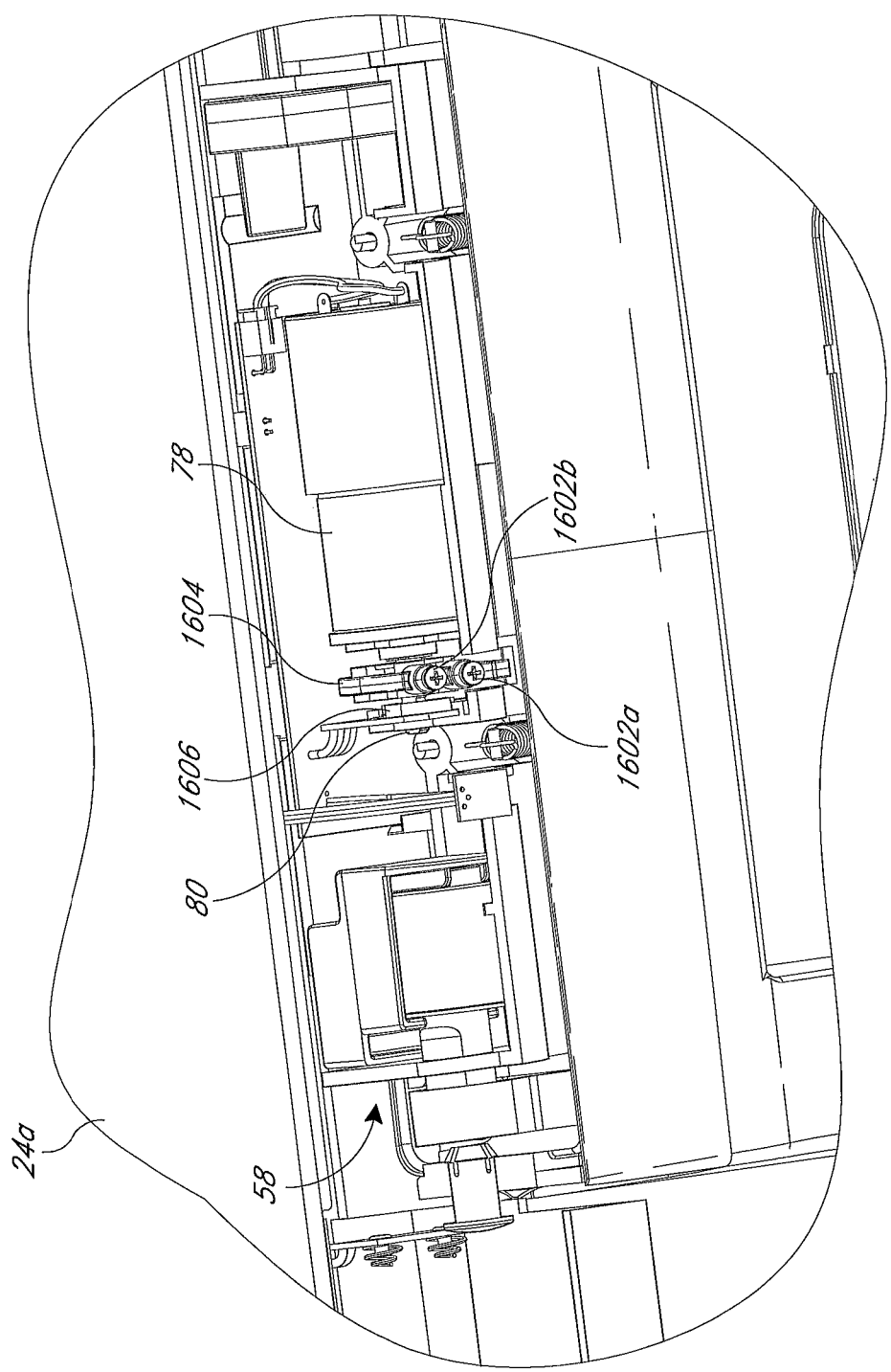
Figure 16C:
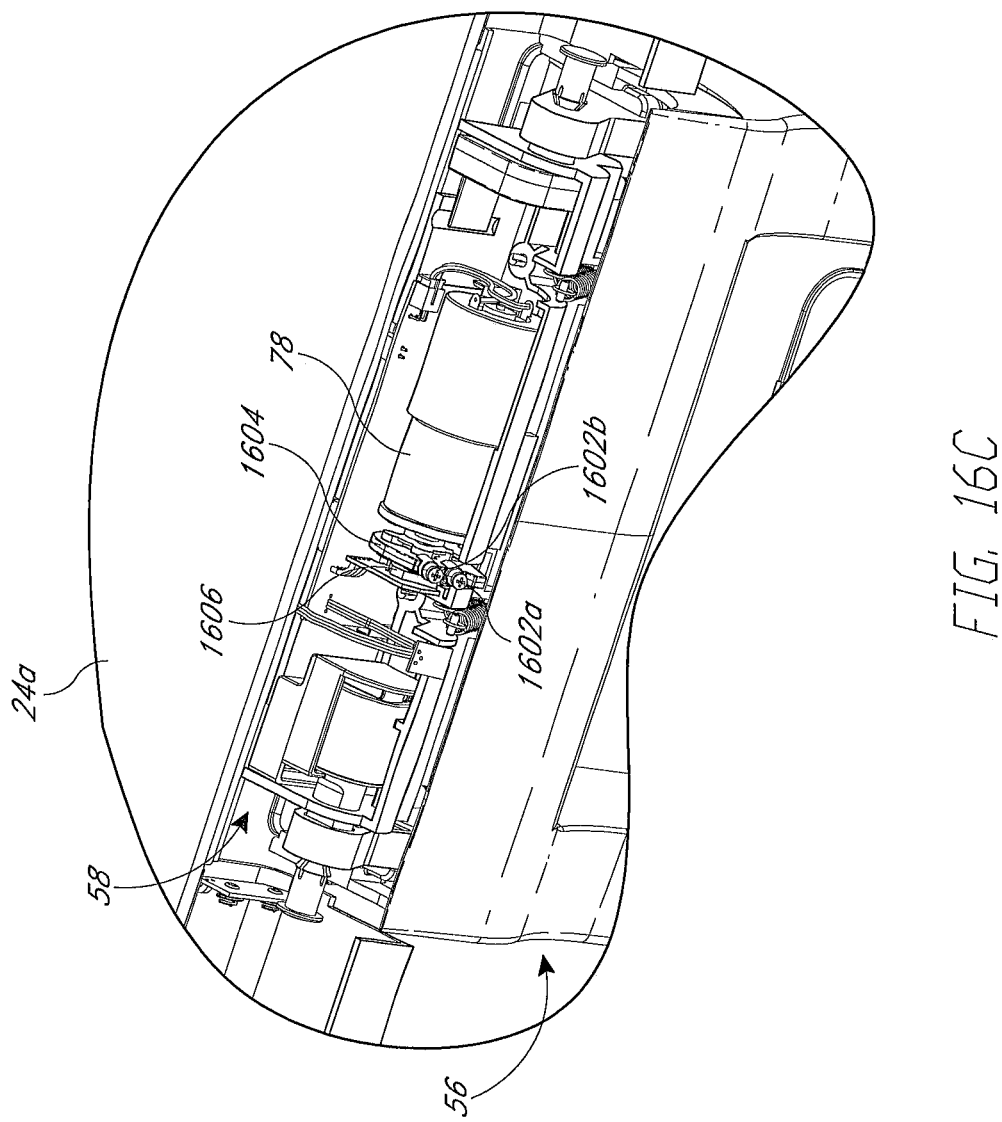

In some embodiments, the driving mechanism 58 can drive the lid movement without the clutch member 84. As shown in FIG. 16A, the driving mechanism 58 can include the motor 78, a torque transfer system such as the shaft 80, fasteners 1602*a-b*, an adaptor 1604, and an electronic dynamic position detector such as a potentiometer 1606. In some embodiments, the adaptor 1604 and the potentiometer 1606 can be positioned on or in mechanical communication with the shaft 80 adjacent to the motor 78 such that the adaptor 1604 and the potentiometer 1606 are generally coaxial. The positioning of the adaptor 1604 and the potentiometer 1606 on the shaft 80 is described in greater detail below with respect to FIGS. 17D and 17E. The adaptor 1604 can be positioned between the potentiometer 1606 and the motor 78. As shown in FIGS. 16B and 16C, the adaptor 1604, the potentiometer 1606, and/or the motor 78 can be spaced apart from each other.

Figure 18A:
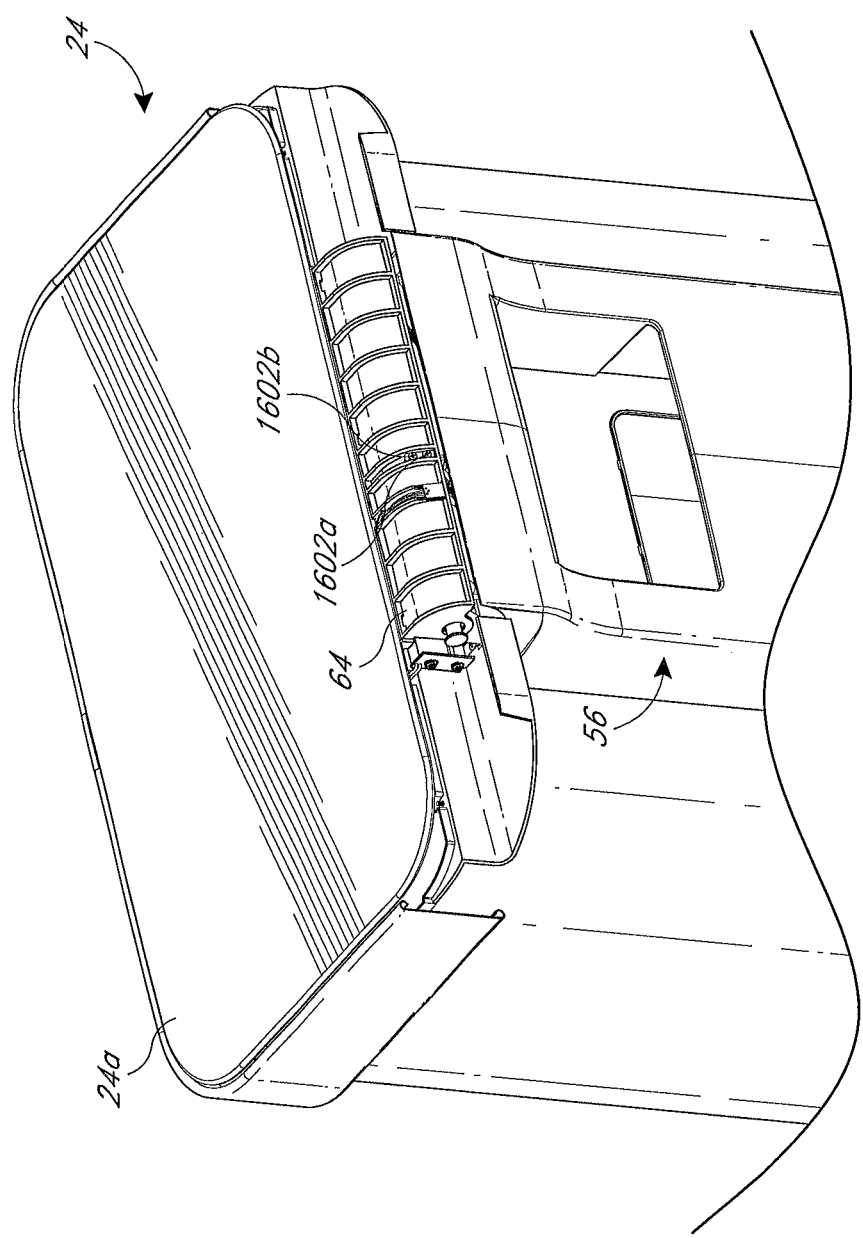
FIG. 18A illustrates a rear, top perspective view of the receptacle assembly shown in FIG. 1.

In some embodiments, the adaptor 1604 can be fixed or mated to or otherwise in mechanical communication with the shaft 80 such that torque from the motor 78 can be transmitted through the shaft 80 and into the adaptor 1604. A rotation of the shaft 80 caused by the motor 78 can result in the rotation of the adaptor 1604 about the longitudinal axis of the shaft 80. The fasteners 1602*a-b* (e.g., screws) can be used to fasten the adaptor 1604 to the rear portion 64 of the lid portion 24, as shown in FIG. 18A and described in greater detail below. The fasteners 1602*a-b* can generally restrain the adaptor 1604 from moving longitudinally. The motor 78 can be rigidly coupled with the lid portion 24 via the adaptor 1604 and fasteners 1602*a-b*. The motor 78 can directly drive the opening and/or closing of the lid portion 24 without the clutch member 84 in some embodiments.

As described above, in some scenarios, a user may accidentally or intentionally try to manually close or open the lid portion 24. Similarly, the lid portion 24 may not be able to completely open or close due to an obstruction (e.g., the lid portion 24 contacts the underside of a table when opening or the trashcan assembly 20 is overfilled with trash, preventing the lid portion 24 from completely closing). In some systems, components of the driving mechanism 58 can be damaged if an obstruction or user action acts against the operation of the motor 78, especially if a clutch assembly is not available.

In some embodiments, the trashcan assembly 20 can avoid or prevent the likelihood of such damage occurring. In some embodiments, as the motor 78 is operating to open or close the lid portion 24, the driving mechanism 58 may monitor for any friction or resistance that could indicate an obstruction or manual operation of the trashcan assembly 20. Such friction or resistance may be detected by the motor 78, the potentiometer 1606, the controller 70, and/or any other components of the driving mechanism 58. For example, the potentiometer 1606 may output a voltage to the controller 70. As described in greater detail below, as the motor 78 rotates the shaft 80, the shaft 80 causes a change in resistance of the potentiometer 1606, thereby resulting in a change in the voltage output by the potentiometer 1606. Generally, as the lid portion 24 is opened or closed, the voltage output by the potentiometer 1606 gradually changes in a constant direction (e.g., the voltage gradually increases or gradually decreases) given that the shaft 80 rotates in a single direction until the lid portion 24 is opened or closed. If an obstruction is present or a user attempts to manually control the trashcan assembly 20, the gradual change in the voltage output by the potentiometer 1606 may be disrupted (e.g., the voltage may begin to increase when the voltage is expected to decrease, or the voltage may begin to decrease when the voltage is expected to increase, or the voltage may stay constant when the voltage is expected to increase or decrease, and/or the voltage may change more slowly than expected, etc.). When the controller 70 detects such a disruption, the power to the motor 78 can be modified, such as by shutting off the power and/or reversing the direction of the motor 78, or otherwise disabling the motor, thereby reducing the likelihood of damage to the components of the driving mechanism 58. When the motor 78 is disabled, the movement of the lid portion 24 may work against the internal friction of the motor 78 (e.g., because the lid portion 24 is rigidly coupled with the motor 78 via the adaptor 1604 and the fasteners 1602*a-b*), thereby providing an inherent damping ability that reduces a speed at which the lid portion 24 closes.

In some embodiments, if an obstruction is detected (e.g., the voltage of the potentiometer 1606 remains generally constant while the motor 78 attempts to drive the lid portion 24) and the obstruction occurs two or more times within a finite or predetermined period of time, this may indicate that an inanimate object (e.g., an underside of a cabinet or a wall or a piece of furniture or a door, etc.) is blocking operation of the lid portion 24 and/or causing the lid portion 24 to open in the first place. The controller 70 may reduce range 130*d* and/or range 132*d*, such as to be less than the distance to such object, to reduce the likelihood that the inanimate object would cause the lid portion 24 to open in the future.

Figure 17A:
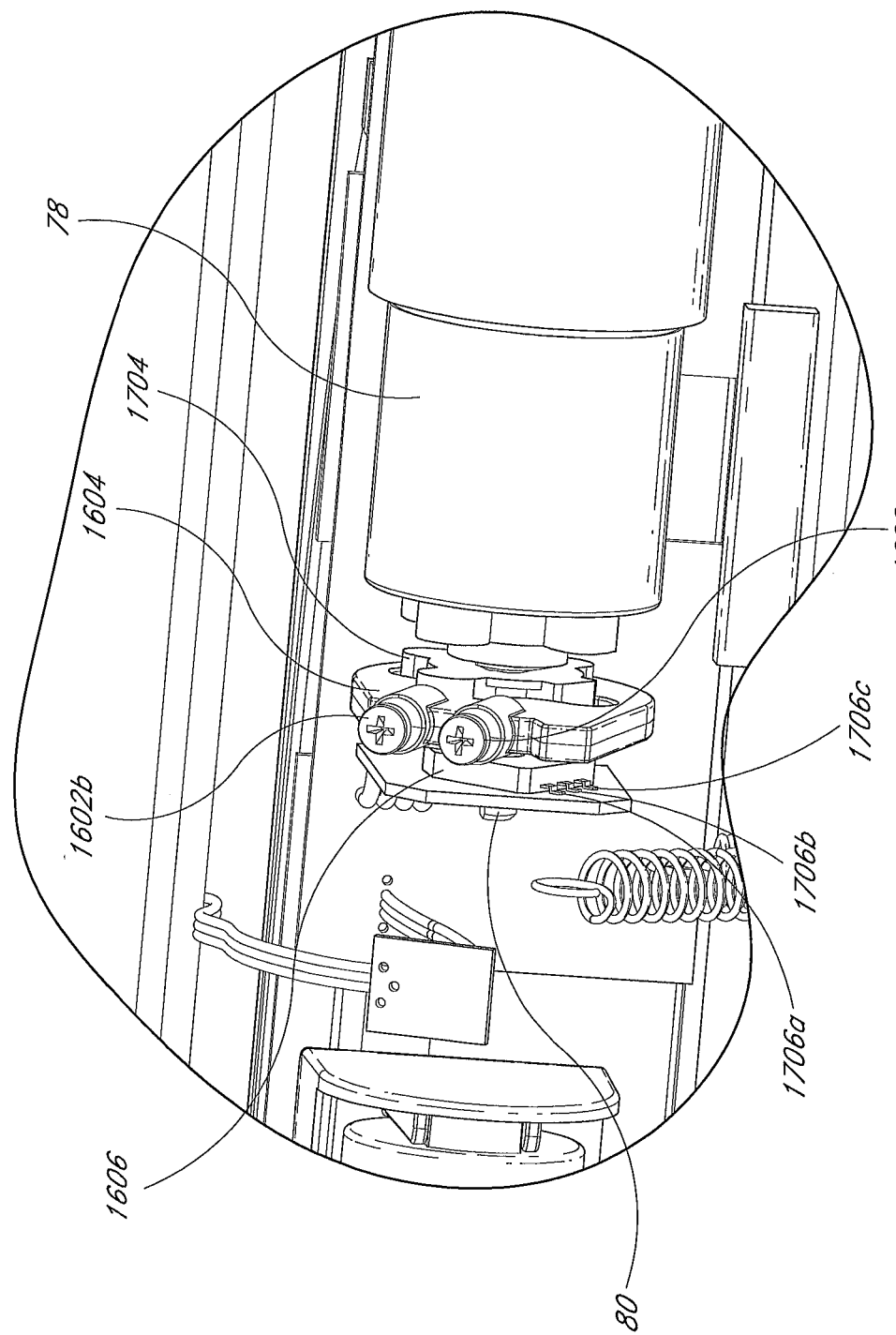
FIG. 17A illustrates an enlarged, rear perspective view of the adaptor and potentiometer shown in FIGS. 16A-16C.
Figure 17B:
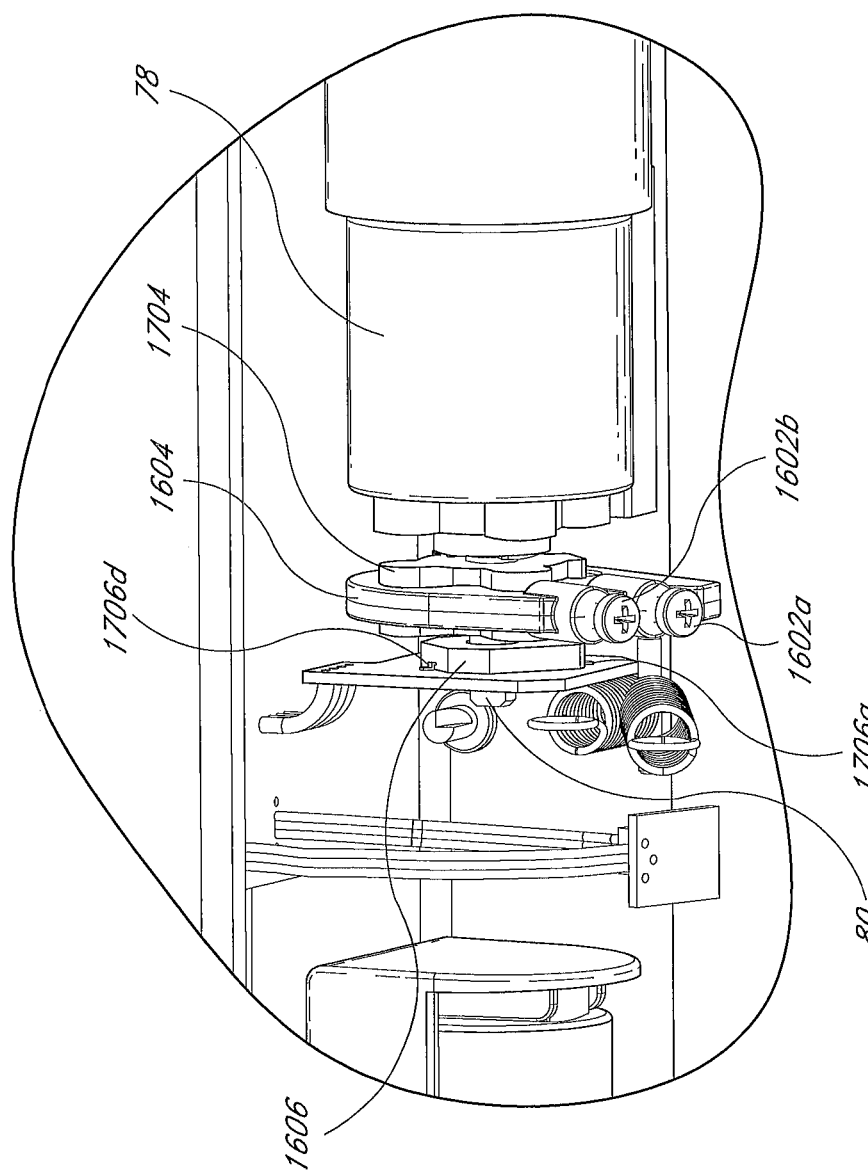
FIG. 17B illustrates an enlarged, rear, and top perspective view of the adaptor and potentiometer shown in FIGS. 16A-16C.
Figure 17C:
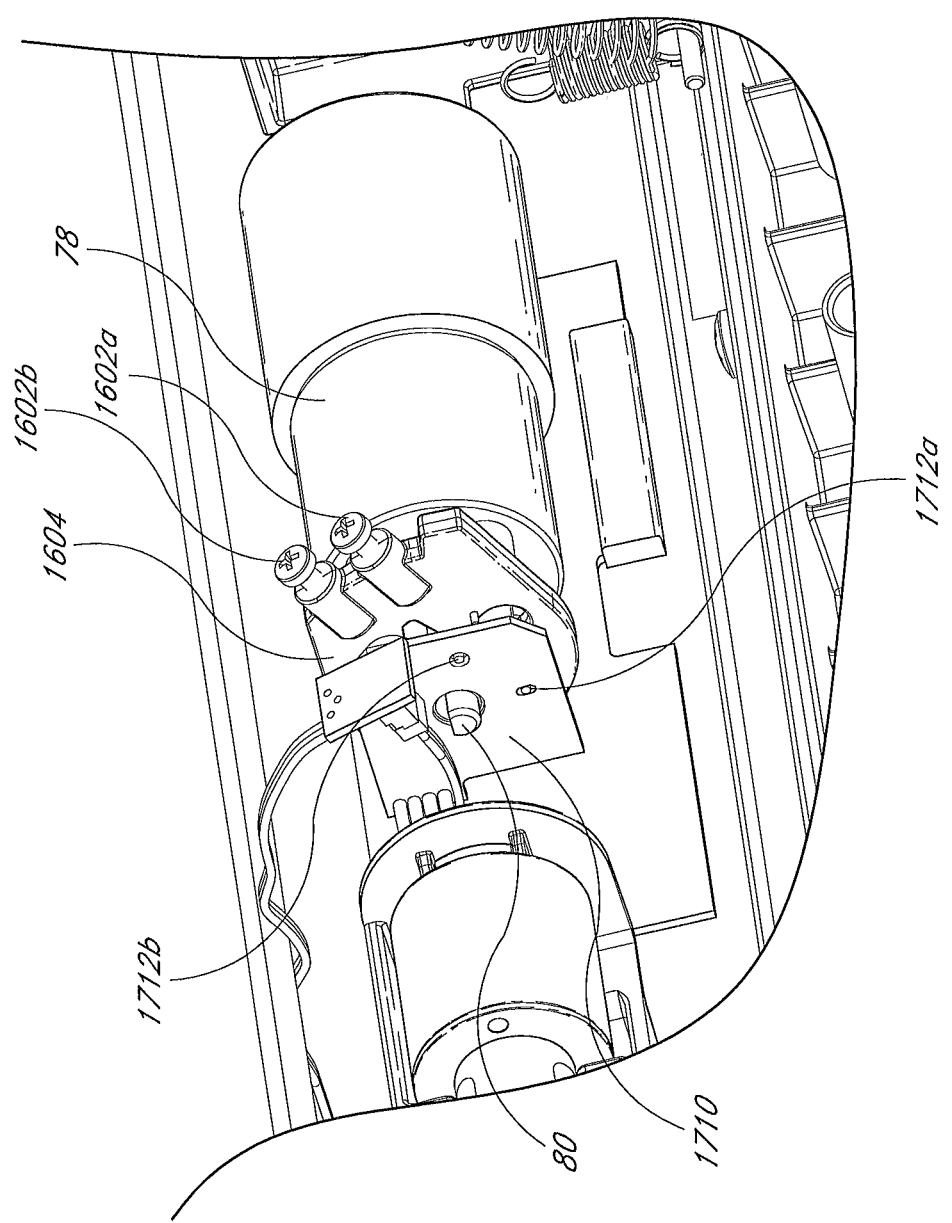
FIG. 17C illustrates an enlarged, rear, and bottom perspective view of the adaptor and potentiometer shown in FIGS. 16A-16C.

As shown in FIGS. 16B and 16C, the potentiometer 1606 can be coupled adjacent to or otherwise in electrical communication with a PCB of the controller 70. As shown in FIGS. 17A and 17B, the potentiometer 1606 can include one or more connectors 1706*a-d* to couple the potentiometer 1606 with the PCB. The one or more connectors 1706*a-d*, together with other circuitry of the PCB, may form a closed circuit, thereby allowing a current to pass through the potentiometer 1606. A bottom portion of the potentiometer 1606 includes notches 1712*a* and 1712*b* that extend outward from the bottom portion of the potentiometer 1606, as shown in FIG. 17C. When the potentiometer 1606 is coupled adjacent to the PCB, the notches 1712*a-b* each mate with openings in the PCB.

Figure 17D:
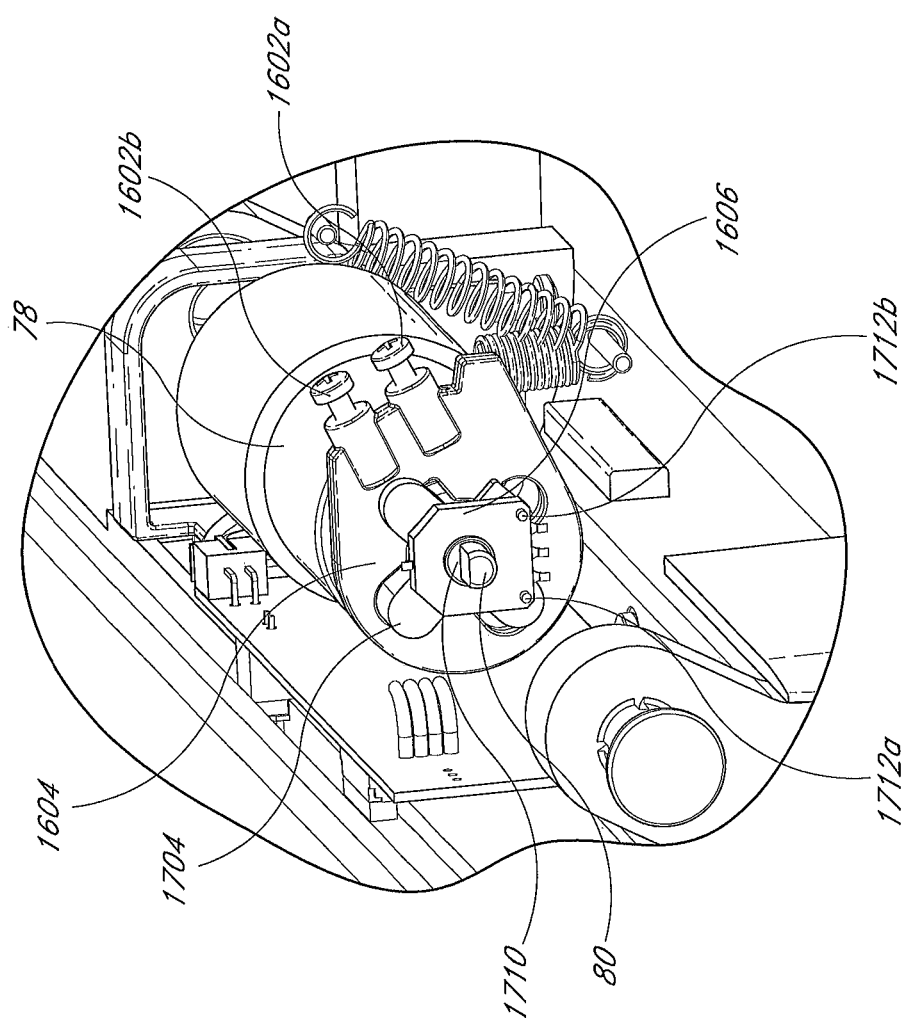
FIG. 17D illustrates an enlarged, side perspective view of the potentiometer shown in FIGS. 16A-16C.

In certain embodiments, as shown in FIG. 17D, the potentiometer 1606 includes an opening through which the shaft 80 longitudinally extends. The potentiometer 1606 also includes a contact 1710 that controls a variable resistance of the potentiometer 1606. The contact can be configured to connect with, functionally interact with, or be in mechanical communication with, the driving system of the lid. For example, a portion of the contact 1710 can have a flat surface and another portion of the contact 1710 can have a curved or rounded surface. Likewise, a portion of the shaft 80 can have a flat surface and another portion of the shaft 80 can have a curved or rounded surface. The flat surface of the shaft 80 can abut, contact, and/or mate with the flat surface of the contact 1710 and the curved or rounded surface of the shaft 80 can abut, contact, and/or mate with the curved or rounded surface of the contact 1710. In some embodiments, both the contact 1710 and the shaft 80 have corresponding or complementary grooves, indentations, or other non-uniform features on a surface to allow the contact 1710 and the shaft 80 to abut, contact, and/or mate. Rotational force produced by the motor 78 (via the shaft 80) may encourage rotation of the contact 1710 about the longitudinal axis of the shaft 80. This rotation causes the contact 1710 to adjust or modify the resistance of the potentiometer 1606, and thereby causes the contact 1710 to adjust the output voltage of the potentiometer 1606.

Figure 17E:
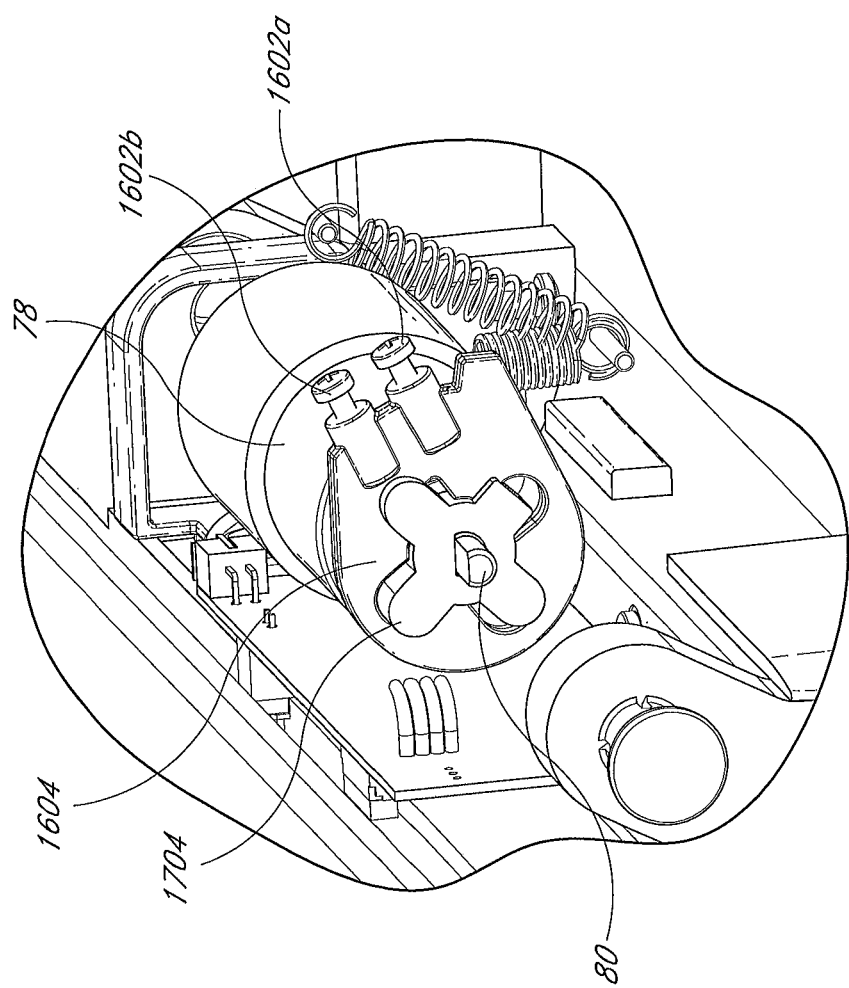
FIG. 17E illustrates an enlarged, side perspective view of the adaptor shown in FIGS. 16A-16C.
Figure 18B:
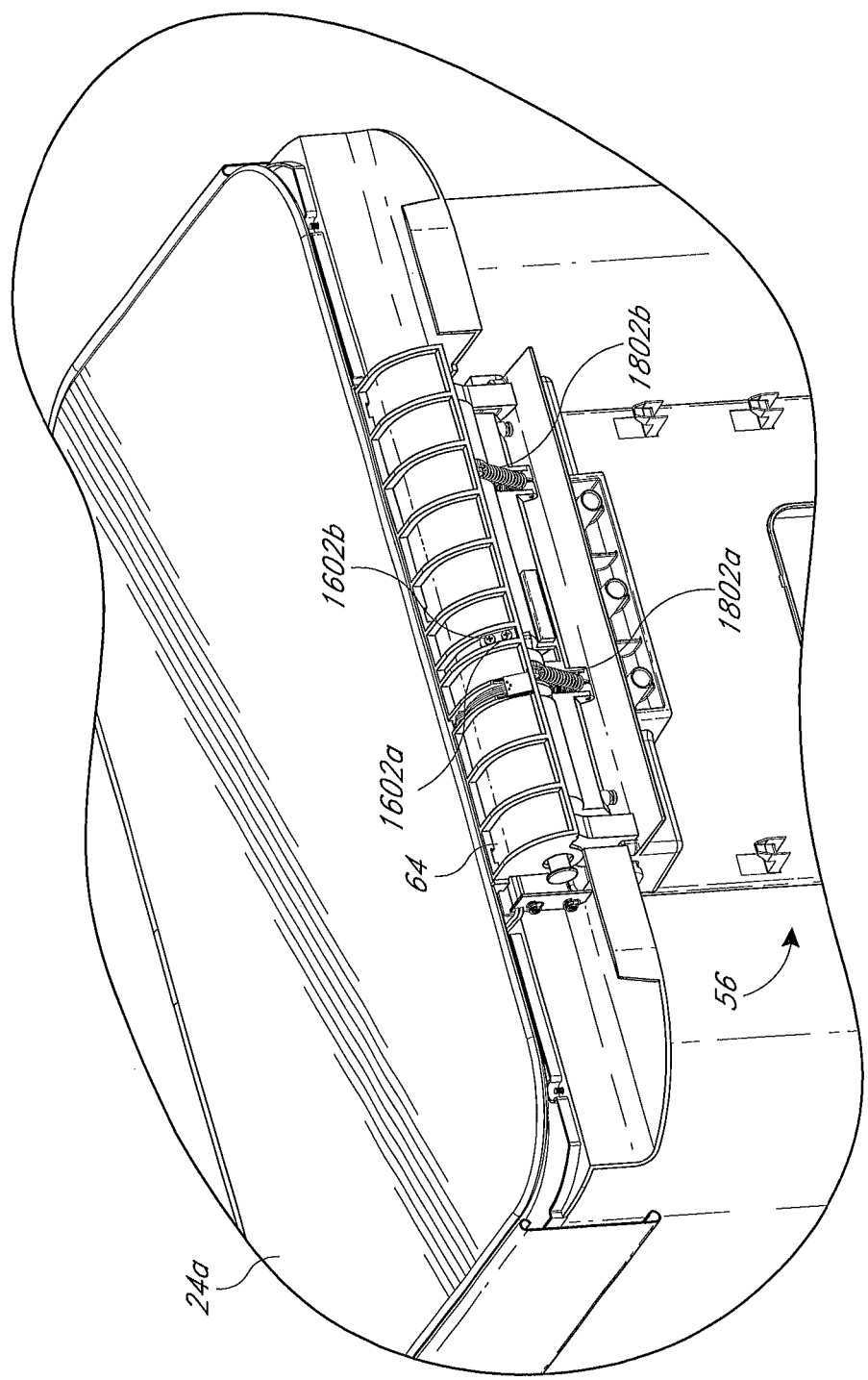
FIGS. 18B-18C illustrate a rear perspective view of the receptacle assembly shown in FIG. 1 with a rear cover removed to show springs.

As shown in FIG. 17E, the adaptor 1604 can include a flange 1704. Like the contact 1710, an inner portion of the flange 1704 can have a flat surface and a curved or rounded surface. The flange 1704 can abut, contact, and/or mate with the shaft 80 in a manner similar to the contact 1710. The flange 1704 may extend radially outward from the remaining portion of the adaptor 1604. Rotational force produced by the motor 78 (via the shaft 80) may encourage rotation of the flange 1704 about the longitudinal axis of the shaft 80, which causes the remaining portion of the adaptor 1604 to rotate. In some embodiments, the motor 78 may be required to exert greater force to drive the lid portion 24 from the closed position to the open position than to drive the lid portion 24 from the open position to the closed position. For example, as disclosed herein, the motor 78 can be positioned within the driving mechanism 58, which is covered by the rear portion 64 of the lid portion 24 as shown in FIG. 18A. Given the position of the motor 78 and the pivot axis of the lid portion 24, the moment of force exerted on the lid portion 24 in the closed position may be greater than the moment of force exerted on the lid portion 24 in the open position. The force of gravity may aid the driving mechanism 58 in the open-to-closed procedure, whereas the force of gravity may resist the driving mechanism 58 in the closed-to-open procedure. To counteract the greater moment of force and gravity force and to reduce the stress on the motor 78 and other driving structures, the driving mechanism can include one or more biasing members, such as springs 1802a and/or 1802b (e.g., tension springs), as shown in FIG. 18B.

Figure 18C:
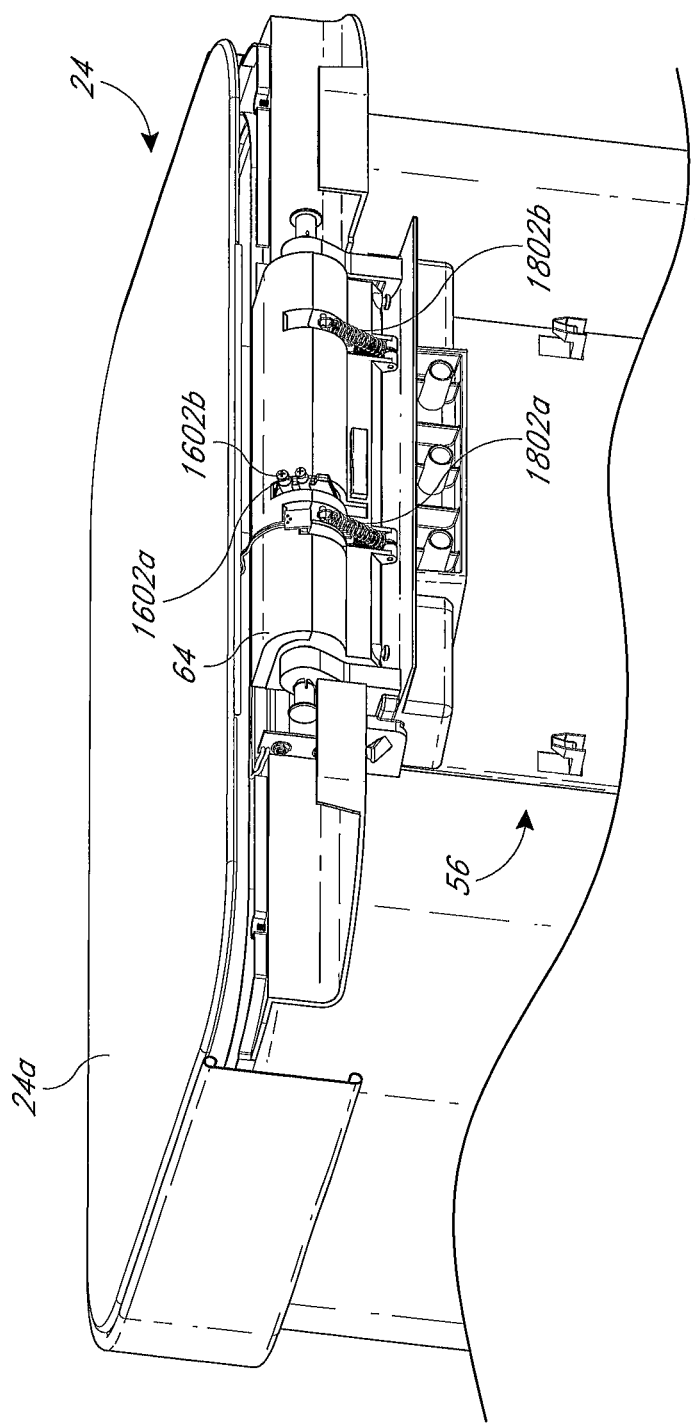

As shown in FIG. 18C, the springs 1802a and 1802b couple with the rear portion 64 of the lid portion 24. The spring 1802a can be inclined from a first level to a second level, in relation to a plane extending generally transverse to the longitudinal axis of the pivot pins 50, 52. Likewise, the spring 1802b can be inclined from a first level to a second level, in relation to a plane extending generally transverse to the longitudinal axis of the pivot pins 50, 52. The springs 1802a and 1802b can be stretched or elongated from a resting length of the springs 1802a, 1802b. Thus, the springs 1802a, 1802b can help counteract the greater moment of force or gravitational force by providing a biasing force to assist the motor 78 in driving the lid portion 24 to the open position.

Lid Position Sensors

Figure 10A:
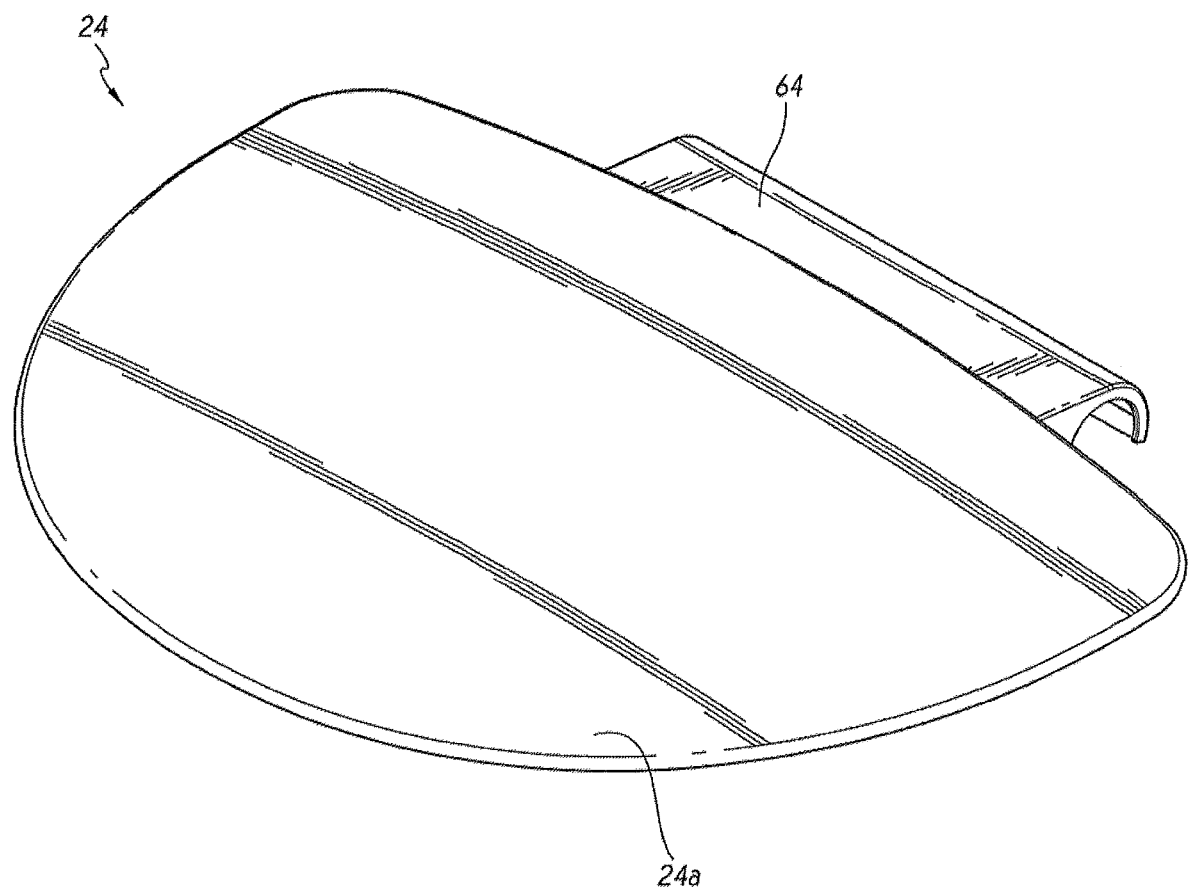
FIG. 10A illustrates a top perspective view of a lid portion of the receptacle assembly shown in FIG. 1.
Figure 10B:
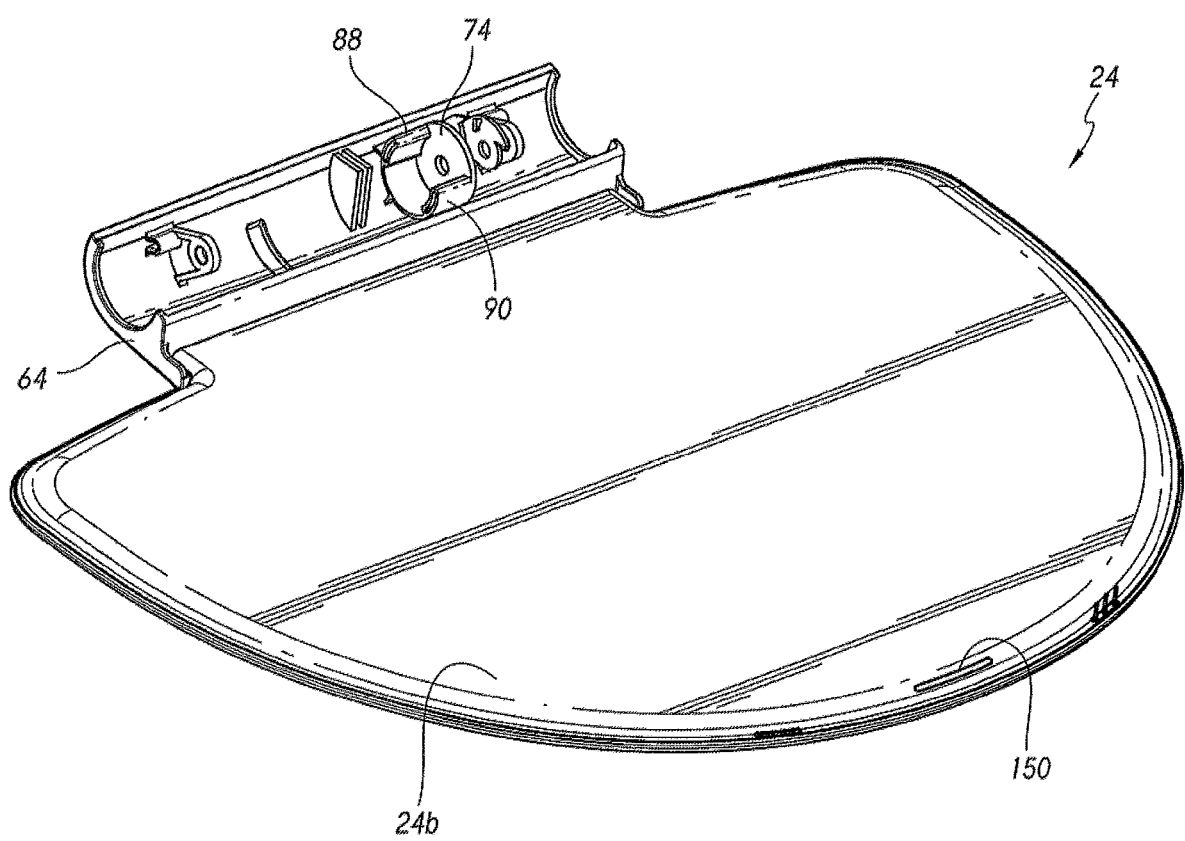
FIG. 10B illustrates a bottom, front perspective view of the lid portion shown in FIG. 10A.
Figure 10C:
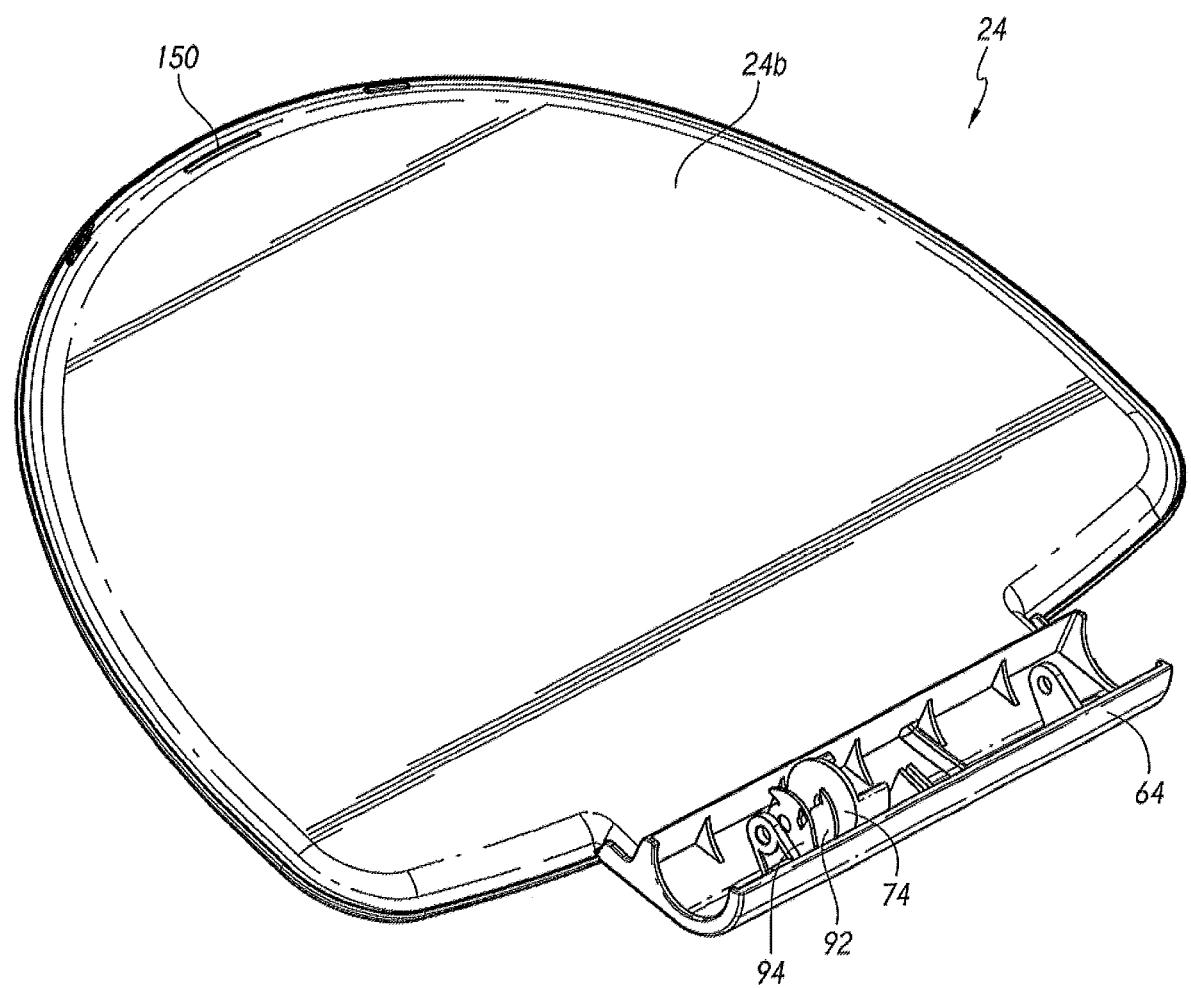
FIG. 10C illustrates a bottom, rear perspective view of the lid portion shown in FIG. 10A.

As shown in FIG. 10C, the lid portion 24 can include a position sensing system that comprises one or more lid position sensing elements, such as a first flagging member 92 and a second flagging member 94, and/or a variable resistor (e.g., a potentiometer). The driving mechanism 58 can include one or more position sensors, such as a first position sensor 96 and a second position sensor 98, to detect the position of the lid portion 24, e.g., by detecting the position of the flagging members 92, 94. The motor 78 and the position sensors 96, 98 can communicate with the controller 70 to facilitate control of the movement of the lid portion 24. As shown in FIGS. 11A and 11B, the driving mechanism 58 can include a first position sensor 96 (e.g., a closed position sensor) and a second position sensor 98 (e.g., an open position sensor). In some implementations, the position sensors 96, 98 can include paired optical proximity detectors, such as light emitters, that cooperate with an intermediate sensor 128, such as a light receiver. As illustrated, the position sensors 96, 98 can be located in a single housing, which can facilitate manufacturability and repair and can reduce the overall space occupied by the position sensors 96, 98.

When the lid portion 24 is in its home or fully closed position, the first flagging member 92 is located between the first position sensor 96 and the intermediate sensor 128 and the second flagging member 94 is not located between the second position sensor 98 and the intermediate sensor 128. In this configuration, the first flagging member 92 blocks an emission (e.g., a signal) between the first position sensor 96 and the intermediate sensor 128, which can be interpreted (e.g., by the controller implementing an algorithm) to discern the position of the lid portion 24.

As the lid portion 24 rotates into the fully open position, the first flagging member 92 rotates such that it is no longer between the first position sensor 96 and the intermediate sensor 128, and the second flagging member 94 rotates such that it is between the second position sensor 98 and the intermediate sensor 128. In this configuration, the second flagging member 94 blocks an emissions (e.g., a signal) between the second position sensor 98 and the intermediate sensor 128, which can be interpreted by the controller 70 to discern the position of the lid portion 24.

Any combination of flagging members and position sensors can be used to detect various positions of the lid portion 24. For example, additional positions (e.g., an about halfway opened position) can be detected with additional sensors and flagging members in a manner similar or different from that described above. Some embodiments have flagging members located in the backside enclosure 56 and position sensors on the lid portion 24.

In some embodiments, the output of the electronic dynamic position detector, such as a potentiometer 1606, can indicate a position of the lid portion 24 without requiring a separate mechanical and/or optical positioning system. Thus, in some embodiments, the first flagging member 92, the second flagging member 94, the first position sensor 96, and/or the intermediate sensor 128 are not used. For example, in some embodiments, the rotation of the shaft 80 can cause a rotation of the contact 1710, changing the resistance of the potentiometer 1606, such as is described above. In some embodiments, rotation of the shaft 80 can cause both a change in the resistance of the potentiometer 1606 and a change in a position of the lid portion 24 (e.g., since the contact 1710 abuts, contacts, and/or mates with the shaft 80 and since the lid portion 24 is rigidly coupled with the motor 78). A position of the lid portion 24 can be directly or indirectly correlated with the resistance of the potentiometer 1606 (or a voltage output by the potentiometer 1606).

Given this relationship, the controller 70 can be configured to store voltage values that represent different positions of the lid portion 24, including a completely closed position and a completely open position, and one or a plurality of various steps in between the completely closed position and a completely open position. As the motor 78 drives the lid portion 24, the controller 70 can periodically or generally continuously measure (e.g., every 0.1 ms, every 1 ms, etc.) the voltage output by the potentiometer 1606 and compare that voltage with the stored voltages. For example, the potentiometer 1606 may output a first voltage when the lid portion 24 is closed and may output a second voltage greater than the first voltage when the lid portion 24 is open (or vice-versa). When comparing the voltages, if the controller 70 determines that the measured voltage is less than or equal to the first voltage, then the controller 70 may determine that the lid portion 24 is completely closed and send a command to disable the motor 78. Likewise, if the controller 70 determines that the measured voltage is greater than or equal to the second voltage, then the controller 70 may determine that the lid portion 24 is completely open and send a command to disable the motor 78. In some embodiments, as the controller 70 senses, from the potentiometer 1606, that the lid is near the completely open or completely closed positions, the controller 70 can decrease the speed or slow down the motor 78 so as to avoid a forceful or loud closing or opening.

Thus, in some embodiments, the controller 70 can: (a) periodically or generally continuously measure the voltage output of an electronic component (such as the potentiometer 1606) and can compare the measured voltage with stored voltages; and/or (b) directly measure the movement of the lid portion (such as by measuring a degree of rotation or other movement of a mechanical component of the lid assembly itself, such as the shaft 80), without requiring the use of a separate movement-detecting system such as a flagging system or an optical measuring system). In some embodiments (such as in embodiments that use an electronic detector such as a potentiometer), the controller 70 can determine a position of the lid portion 24 on a generally continuous basis, not just at discrete positions (e.g., completely closed, completely open, or any position in between completely closed and completely open), at the time that the voltage output by the potentiometer 1606 is measured. Also, in some of such embodiments, the risk of decoupling or slipping or misreading of the lid-opening system from the lid-position-detecting position is very low, since the position of the lid is measured directly from a mechanical component that moves the lid itself. Some systems, on the other hand, may use flags or other markers that are separate from the mechanical components that open the lid (e.g., flagging members 92, 94) but that track the position of the lid portion 24, such as is described above. However, in some embodiments of these systems, the position of the lid portion 24 is only determined at discrete positions (e.g., positions associated with a flagging member). Thus, the position of the lid portion 24 may not be able to be determined if no flagging member is between a position sensor and the intermediate sensor 128. In some situations, making an accurate determination of the position of the lid portion 24 may be important because the trashcan assembly can use the position determination to determine when to shut off the motor 78 to prevent damage or malfunction (e.g., the motor 78 may be shut off when the lid portion 24 is in the completely open or completely closed position). In some situations, the motor 78 may be running to cause movement of the lid portion 24, but an obstruction or the user may be preventing movement of the lid portion 24. Because the motor 78 is running, the lid portion 24 is not moving, and no flagging member is between a position sensor and the intermediate sensor 128, the actual position of the lid portion 24 is unknown. A controller may determine that the lid portion 24 is at a certain position based on a time that the motor 78 has been running, the number of rotations of the motor 78, and/or the like when in fact the lid portion 24 is not at the determined position due to the obstruction or user. To address this issue, some systems may have to run a reset operation. In the reset operation, some embodiments of such systems can request a user to completely close the lid portion 24 so that the actual position of the lid portion 24 is known. Once the lid portion 24 is in the completely closed position, the trashcan assembly can resume lid open and close operations. By using a sensor system, such as the potentiometer 1606, that is more directly connected to the components that open the lid, such a trashcan assembly 20 can be used without running a reset operation in situations in which an obstruction or the user prevents movement of the lid portion 24. In some embodiments, given the relationship between the potentiometer 1606, the shaft 80, and the lid portion 24, the voltage output by the potentiometer 1606 only changes if the position of the lid portion 24 changes. Thus, the voltage output by the potentiometer 1606 can be used by the controller 70 to accurately determine a position of the lid portion 24 even if an obstruction or a user prevents the motor 78 from moving the lid portion 24 to an open or closed position.

The controller 70 can store voltages and perform the comparison for any type of potentiometer. For example, the potentiometer 1606 can be a linear potentiometer, a logarithmic potentiometer, and/or the like.

LED Indicator

As shown in FIGS. 10B and 10C, the lid portion 24 can include one or more indicators 150 (e.g., an LED indicator). For example, when the lid portion 24 is open, the indicator 150 can display a certain color of light, e.g., green light. As another example, the indicator 150 can display a certain color of light based on the amount of remaining power, so the user knows when to recharge the power source 66 (e.g., red light can indicate low power). In yet another example, the indicator 150 can provide a light source when the trashcan assembly 20 is being used in the dark.

The indicator 150 can indicate whether an object is detected in the sensing region 130 and/or the sensing region 132 by the sensor assembly 102 and/or provide notice that the lid portion 24 may close within a certain period of time. For example, when the lid portion 24 is open (e.g., because the receiver 114 detects a signal emitted by one or more of the transmitters 112*a-d* that has reflected off of an object), the trashcan assembly 20 enables the indicator 150 (e.g., causes the indicator 150 to display a certain color of light). If an object is no longer detected in at least one of the sensing regions 130, 132 (e.g., the receiver 114 does not detect a signal reflected off an object), the trashcan assembly 20 disables the indicator 150. As described herein, after an object is no longer detected, the lid portion 24 may remain open for a pre-determined period of time before being moved to the closed position. If, before the lid portion 24 is closed, the sensor assembly 102 again detects an object, then the indicator 150 can be re-enabled (and the lid portion 24 may remain open). Thus, disabling the indicator 150 may serve as notice that the sensor assembly 102 no longer detects an object and that the lid portion 24 may close if no object is detected before the pre-determined period of time expires. A user can therefore use the indicator 150 as a guide to determine whether the sensor assembly 102 detects the user and/or whether the user needs to change positions to keep the lid portion 24 open.

The indicator 150 can be positioned on a bottom portion of the lid portion 24 such that the indicator 150 is only visible when the lid portion 124 is in an open position. In some embodiments, the exterior of the trashcan assembly is simple and clean, without any buttons switches, and/or indicators. As shown in FIGS. 10B and 10C, the indicator 150 can be positioned at a periphery of the lid portion 24. In some embodiments, the lid portion 24 can include an upper lid 24*a* secured to a lower lid 24*b* (see FIGS. 10A-10C). The one or more indicators 150 can be powered by the power source 66 via cables extending between the upper and lower lids 24*a*, 24*b*.

Controlling Lid Position

As previously discussed, the trashcan assembly 20 can implement an algorithm that directs various actions, such as opening and closing of the lid portion 24, triggering the ready-mode and hyper-mode, or other actions. In general, the algorithm can include evaluating one or a plurality of received signals and, in response, determining whether to provide an action. In some embodiments, the algorithm determines whether to provide an action in response to receipt of a signal from at least two sensors, such opening the lid portion 24 in response to signals from as at least two transmitters (e.g., the transmitter 112*d* and at least one of transmitters 112*a-c*). In certain variants, the algorithm determines whether to open the lid portion 24 in response to an object being detected in a certain location or combination of locations, such as an object being detected in the sensing region 130 and in the sensing region 132. Some embodiments are configured to open the lid portion 24 in response to an object being detected in a certain sequence of locations, such as an object being detected in the sensing region 130 and an object being subsequently or concurrently detected in the sensing region 132. Certain implementations are configured to determine whether a detected object is fleeting or transitory, which may indicate that the detected object is not intended to trigger operation of the trashcan assembly 20 (e.g., a person walking by the trashcan assembly 20). For example, some embodiments can evaluate whether a detected object is detected for less than a certain period and/or is moving through at least one of the sensing regions (e.g., the region 132) at greater than or equal to a maximum speed. If the detected object is fleeting or transitory, the algorithm can determine that the lid portion 24 should not be opened in response to such detection.

Figure 14:
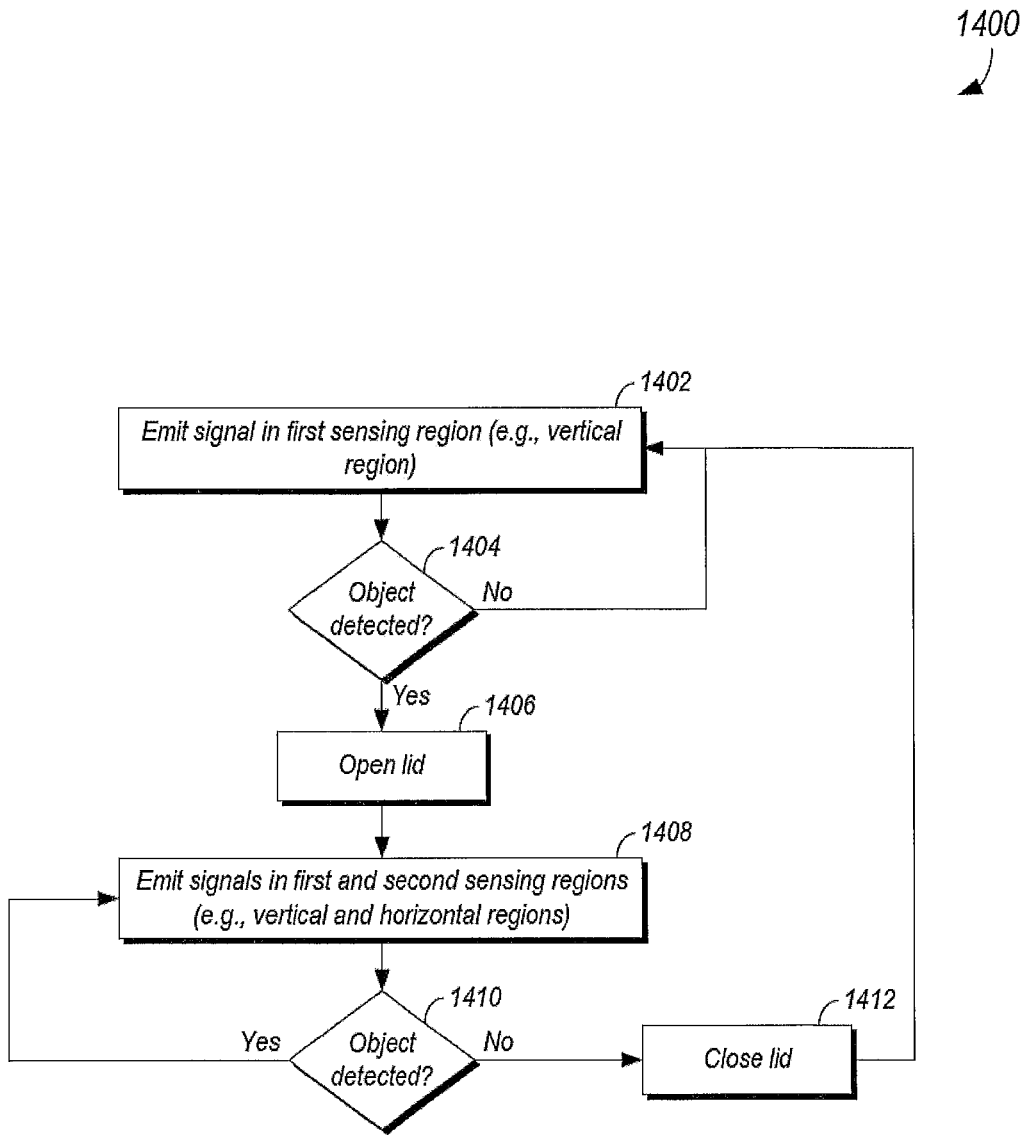
FIG. 14 schematically illustrates a method for controlling the position of the lid portion of the receptacle assembly of FIG. 1.

FIG. 14 illustrates an example algorithm process 1400 of controlling the position of the lid portion 24. The process 1400 may be performed by controller 70 of trashcan assembly 20, as described above (e.g., in connection with FIGS. 9A-9D). The method can be implemented, in part or entirely, by a software module of the controller 70 (e.g., by the lid position controller) or implemented elsewhere in the trashcan assembly 20, for example by one or more processors executing logic in controller 70. In some embodiments, controller 70 includes one or more processors in electronic communication with at least one computer-readable memory storing instructions to be executed by the at least one processor of controller 70, where the instructions cause the trashcan assembly 20 to implement the process 1400.

In some embodiments, the process 1400 starts at block 1402 where a signal is emitted using a first transmitter, such as the transmitter 112d (e.g., a generally vertical transmitter). In some embodiments, in block 1402, the trashcan assembly 20 is in the ready-mode state, as discussed above. In some embodiments, the transmitter 112d is configured to emit a signal generally upward from an upper surface 102a of the sensor assembly 102 (e.g., on top of the trashcan assembly 20, between about 0 and about 10 degrees from the top surface of the trashcan assembly 20, such as shown in FIGS. 9C and 9D). In some embodiments, the transmitters 112a-c are not emitting signals in block 1402. In other embodiments, the transmitters 112a-c are also emitting signals in block 1402.

As shown, the process 1400 can include block 1404 where a determination is made as to whether an object is detected, such as in the region 130b. For example, the receiver 114 can determine whether a reflected signal is detected in response to the signal emitted by the transmitter 112d (and provides such indication to the controller 70), which may indicate that an object is in the sensing region 130b. If no object is detected, the process 1400 reverts to block 1402. However, if an object is detected, the process 1400 continues to block 1406, in which the lid portion 24 is opened. For example, in response to an object being detected in the region 130b, the controller 70 can send a signal to a motor to open the lid portion 24.

In the block 1406, one or more sensors and one or more algorithms can be used to receive and process information about the background or ambient light of the environment in which the trashcan assembly 20 is being used. For example, it can be determined whether or not the trashcan assembly 20 is being used in a bright environment, such as ambient sunlight, before the lid portion 24 is opened. The controller 70 can be configured to determine whether or not the receiver 114 is receiving light signals substantially continuously. For example, if the receiver 114 generally receives signals over a time period of 800 microseconds and has more than about ten to twelve dropouts during that time period, it can be assumed that the trashcan assembly 20 is being exposed to bright ambient light, such as sunlight. As such, the controller 70 can be configured to avoid analyzing the output of the receiver 114. The trashcan assembly 20 can also include a light sensor, such as a photo diode, that measures the lux level of ambient light. The lux level can be transmitted to the controller 70 on a continuous basis. If a sudden change in the lux level occurs within a certain period of time (e.g., because a person turned on a light or the sun started shining on the trashcan assembly 20) at or nearly at the same time as an object is detected in block 1404 (e.g., within 1 ms, within 1 second, etc.), then it may be assumed that the trashcan assembly 20 is being exposed to bright ambient light. If it is determined, in the block 1406, that the trashcan assembly 20 is in a bright environment, the process 1400 can return to block 1402 and repeat. On the other hand, if it is determined in block 1406 that the trashcan assembly 20 is not reporting an aberration in the detection of ambient light, then the process 1400 can move on to block 1408.

In some embodiments, the process 1400 moves to block 1408, which can include producing first and second sensing regions 130, 132 (e.g., generally vertical and generally horizontal sensing regions). For example, transmitter 112d can continue to produce the sensing region 130 and the transmitters 112a-c can produce the second sensing region 132. In certain embodiments, block 1408 includes beginning to emit signals from the transmitters 112a-c. In some implementations, in block 1408, the trashcan assembly 20 can enter the hyper-mode, as discussed above. For example, the sensing extent of the first sensing region 130 can be increased, as discussed above.

As illustrated, the process 1400 can include block 1410 where a determination is made as to whether a further object-detection event has occurred. For example, the trashcan assembly 20 can determine whether an object has been detected in at least one of the sensing regions 130, 132. If a further object-detection event has occurred, the process 1400 can revert to block 1408, in which the first and second sensing regions 130, 132 are produced.

If no further object-detection event has occurred, the process 1400 can continue to block 1412. In some embodiments, the process 1400 includes a timer or delay before moving to block 1412. For example, the process 1400 can include determining that no further object-detection event has occurred for at least a predetermined amount of time, such as at least about: 1, 2, 3, or 4 seconds. This can enable a user to briefly leave the sensing regions 130, 132 without the process 1400 continuing to block 1412.

In some embodiments, block 1412 includes closing the lid portion 24 and/or reverting to the ready-mode. For example, the controller 70 can send a signal to a motor to close the lid portion 24. In certain implementations, block 1412 includes reducing the extent of the first sensing region 130 and/or reducing or eliminating the range of the second sensing region 132. In some embodiments, block 1412 includes reducing or ceasing operation of the transmitters 112a-c. As illustrated, the process 1400 can revert to block 1402.

Figure 15:
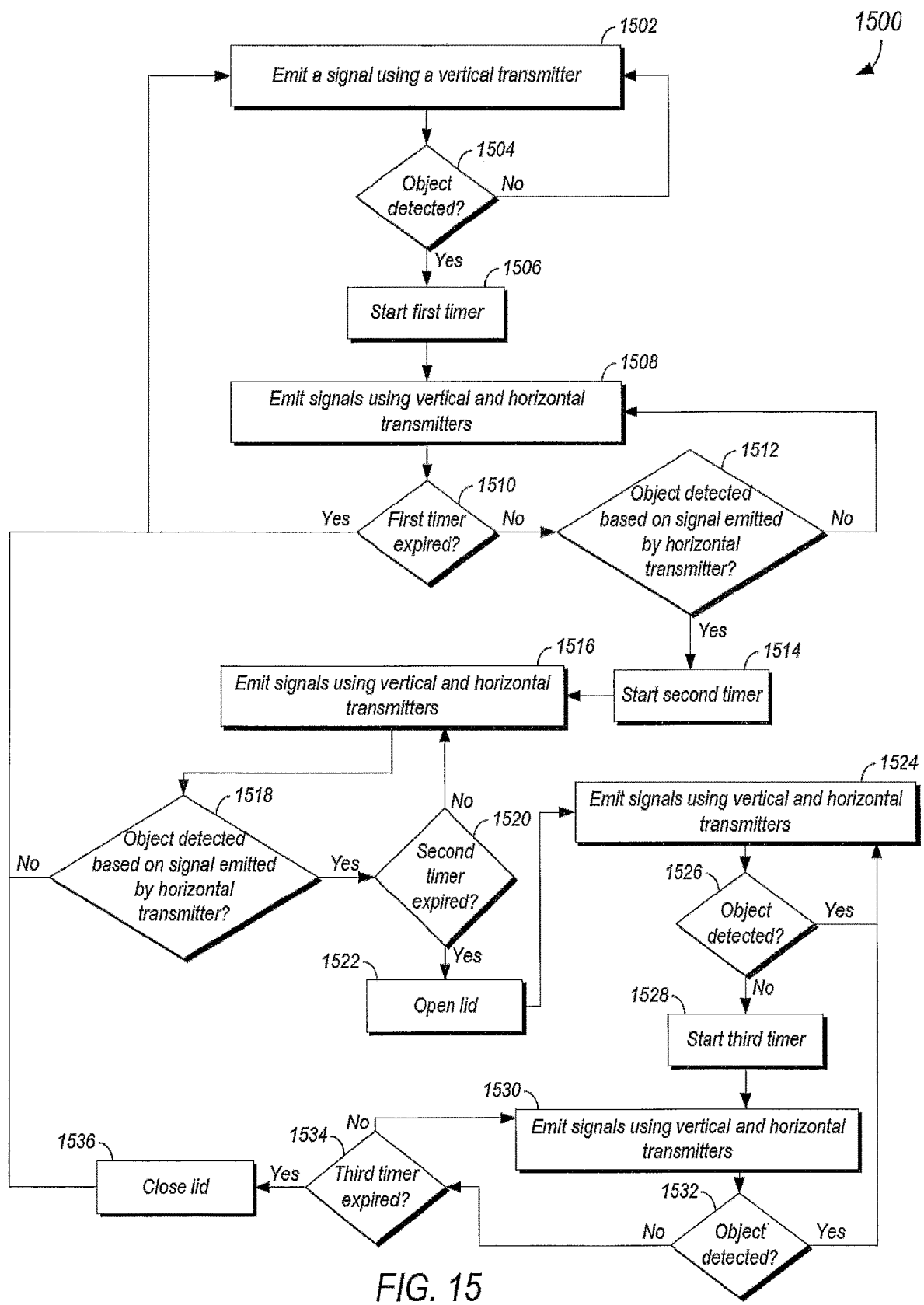
FIG. 15 schematically illustrates another method for controlling the position of the lid portion of the receptacle assembly of FIG. 1.

FIG. 15 illustrates an example algorithm process 1500 of controlling the position of the lid portion 24. The process 1500 may be performed by the controller 70 of trashcan assembly 20, as described above (e.g., in connection with FIGS. 9A-9D). The method can be implemented, in part or entirely, by a software module of the controller 70 (e.g., by the lid position controller) or implemented elsewhere in the trashcan assembly 20, for example by one or more processors executing logic in the controller 70. In some embodiments, the controller 70 includes one or more processors in electronic communication with at least one computer-readable memory storing instructions to be executed by the at least one processor of controller 70, where the instructions cause the trashcan assembly 20 to implement the process 1500.

In some embodiments, process 1500 starts at block 1502 where a signal is emitted using a first transmitter, such as a generally vertical transmitter. For example, the controller 70 can instruct the vertical transmitter to emit the signal. The vertical transmitter can be the transmitter 112d, which emits a signal generally upward from an upper surface 102a of the sensor assembly 102 (e.g., on top of the trashcan assembly 20, between about 0 and about 10 degrees from the top surface of the trashcan assembly 20, such as shown in FIGS. 9C and 9D). In some embodiments, in block 1502 the sensor assembly 102 is in the ready-mode and the transmitters 112a-c are not emitting signals.

As shown, the process 1500 can include block 1504 where a determination is made as to whether an object is detected. For example, the receiver 114 determines whether a reflected signal is detected in response to the signal emitted by the transmitter 112d (and provides such indication to the controller 70), which may indicate that an object is in the sensing region 130b.

If no object is detected, the process 1500 reverts to block 1502. However, if an object is detected, the process 1500 continues to block 1506. In certain embodiments, block 1506 includes activating the hyper-mode, which can include increasing the extent of the sensing range of the first transmitter, as is discussed above. In some embodiments, block 1506 includes stating a first timer. For example, the first timer may be a timer or counter implemented by the controller 70 or a mechanical timer and the first timer expires or fires after a first predetermined period of time (e.g., approximately 1 second, approximately 5 seconds, etc. or a time based on a time it takes the transmitters 112a-d to emit a predetermined number of signals). Detection of the object causes the sensor assembly 102 to transition into the hyper-mode. The first timer represents a time that the sensor assembly 102 waits in the hyper-mode for the detection of an object in the sensing region 132 before transitioning back into the ready-mode.

The process 1500 can include block 1508 where signals are emitted with the first transmitter and with a second transmitter, such as a generally vertical transmitter and a generally horizontal transmitter. For example, the controller 70 can instruct the horizontal transmitters to emit signals. The horizontal transmitters can be the transmitters 112a-c, which emit signals generally outward from a front surface 102b of the sensor assembly 102 (e.g., in front of the trashcan assembly 20, between about 80 degrees and about 90 degrees from the top surface of the trashcan assembly 20, such as shown in FIG. 9D). The vertical and horizontal transmitters can emit the signals sequentially such that no two transmitters emit a signal at the same time. At block 1508, each transmitter may emit a single signal. In some embodiments, the horizontal transmitters, and not the vertical transmitter, emit signals. For example, in some embodiments, the receiver 114 may be configured to detect whether an object is in the sensing region 132, which may make operation of the vertical transmitter unnecessary during certain periods.

As illustrated, in block 1510 a determination is made as to whether the first timer has expired. If the first timer has expired, the process 1500 reverts to block 1502 and the first timer is reset (e.g., to its value before being started). For example, if the first timer expires, this may indicate that no object was detected in the sensing region 132 (because, for example, a user inadvertently moved into the ready-mode sensing region 130b and/or because the user did not intend to open the lid portion 24). In various embodiments, when the process 1500 reverts to block 1502, the sensor assembly 102 can transitions back into the ready-mode.

If the first timer has not expired, the process 1500 continues to block 1512 where a determination is made as to whether an object is detected in response to the emission of a signal by a horizontal transmitter. For example, the controller 70 determines, using information provided by the receiver 114, whether an object is detected in the sensing region 132. If no object is detected, the process 1500 reverts to block 1508. For example, if no object is detected, then the transmitters 112a-c may continue to emit signals in an attempt to detect an object in the sensing region 132 before the first timer expires.

If an object is detected in block 1512, the process 1500 continues to block 1514 where a second timer is started. For example, the second timer may be a timer or counter implemented by the controller 70 or a mechanical timer and the second timer expires or fires after a second predetermined period of time (e.g., approximately 0.5 seconds, approximately 1 second, etc. or a time based on a time it takes the transmitters 112a-d to emit a predetermined number of signals). Once an object is initially detected in the sensing region 132, the controller 70 determines whether the object remains in the sensing region 132 for a period of time before causing the lid portion 24 to open. This can aid in determining whether the detected object in the sensing region 132 is fleeting. By waiting (to see that the object is detected for the second timer's period) before opening the lid portion 24, the process 1500 can reduce the chance that the lid portion 24 will open prematurely and/or unintentionally, such as could otherwise occur when a person merely walks by the trashcan assembly 20. In some implementations, the second timer represents the period of time that the object is to remain in the sensing region 132 before the controller 70 causes the lid portion 24 to open.

As illustrated, The process 1500 continues to block 1516 where signals are emitted using vertical and horizontal transmitters. As described above, the vertical and horizontal transmitters can emit the signals sequentially such that no two transmitters emit a signal at the same time. At block 1516, each transmitter may emit a single signal. In some embodiments, the horizontal transmitters and not the vertical transmitter are emitting signals. For example, the receiver 114 may be configured to detect whether an object has remained in the sensing region 132 for a period of time and use of the vertical transmitter may not be necessary.

The process 1500 continues to block 1518 where a determination is made as to whether an object is detected in response to the emission of a signal by a horizontal transmitter. For example, the controller 70 determines, using information provided by the receiver 114, whether an object is detected in the sensing region 132. If no object is detected, the process 1500 reverts to block 1502 and the first and second timers are reset (e.g., to their respective values before being started). For example, if an object is no longer detected in the sensing region 132, then the controller 70 may determine that the object detected in the sensing region 130b and/or the sensing region 132 was fleeting and/or inadvertent. As noted above, in response to the process 1500 reverting to block 1502, the sensor assembly 102 can transition back into the ready-mode.

If the object continues to be detected, then the process 1500 continues to block 1520 where a determination is made as to whether the second timer has expired. If the second timer has not expired, the process 1500 reverts to block 1516. For example, if the second timer has not expired, then the controller 70 continues to determine whether the object has remained in the sensing region 132 by causing the transmitters 112a-c to continue to emit signals for object detection.

If the second timer has expired, then the process 1500 continues to block 1522 where the lid portion 24 is opened. For example, if the second timer has expired, this indicates that the object remained in the sensing region 132 for the minimum period. Thus, the controller 70 determines that the detected object is not fleeting or inadvertent, and opens the lid portion 24.

In the block 1522, it can be determined whether or not the trashcan assembly 20 is detecting a light aberration, before the lid portion 24 is opened, such as in a manner as described above with respect to FIG. 14. If it is determined, in the block 1522, that the trashcan assembly 20 is detecting a light aberration, the process 1500 can return to block 1502 and repeat without opening the lid portion 24. On the other hand, if it is determined in block 1522 that the trashcan assembly 20 is not detecting a light aberration, the process 1500 can move on to block 1524 after opening the lid portion 24.

As illustrated, the process 1500 can continue to block 1524 where signals are emitted using vertical and horizontal transmitters. As described above, the vertical and horizontal transmitters can emit the signals sequentially such that no two transmitters emit a signal at the same time. At block 1524, each transmitter may emit a single signal. The transmitters 112a-d may emit signals to provide the controller 70 with information on whether to close the lid portion 24 or keep the lid portion 24 open. For example, the controller 70 can instruct that the lid portion 24 be closed if a period elapses without an object being detected in the sensing region 130 and/or the sensing region 132.

Once the signals are emitted using the vertical and/or horizontal transmitters, the process 1500 continues to block 1526 where a determination is made as to whether an object is detected. If an object is detected, the process 1500 reverts to block 1524. For example, detection of an object causes the controller 70 to determine that the lid portion 24 should remain open and that the transmitters 112a-d should continue to emit signals for object detection.

If no object is detected, then the process 1500 continues to block 1528 where a third timer is started. For example, the third timer may be a timer or counter implemented by the controller 70 or a mechanical timer and the third timer expires or fires after a third predetermined period of time e.g., approximately 1 second, approximately 5 seconds, etc. or a time based on a time it takes the transmitters 112a-d to emit a predetermined number of signals). In some cases, a person may temporarily leave the vicinity of the trashcan assembly 20, but may still wish that the lid portion 24 remain open. Thus, the third timer represents a time that the controller 70 waits when no object is detected before causing the lid portion 24 to close.

The process 1500 can continue to block 1530 where signals are emitted using vertical and horizontal transmitters. As described above, the vertical and horizontal transmitters can emit the signals sequentially such that no two transmitters emit a signal at the same time. At block 1530, each transmitter may emit a single signal. The transmitters 112a-d may emit signals to provide the controller 70 with information on whether an object has returned to the sensing region 130 or the sensing region 132 before the third timer expires.

Once the signals are emitted using the vertical and/or horizontal transmitters, the process 1500 continues to block 1532 where a determination is made as to whether an object is detected. If an object is detected, the process 1500 reverts to block 1524 and the third timer is reset (e.g., to its value before being started). For example, detection of an object causes the controller 70 to determine that an object has returned to the sensing region 130 or the sensing region 132, that the lid portion 24 should remain open, and that the transmitters 112a-d should continue to emit signals for object detection.

If no object is detected, the process 1500 continues to block 1534 where a determination is made as to whether the third timer has expired. If the third timer has not expired, the process 1500 reverts to block 1530. For example, if the third timer has not expired, then the controller 70 continues to determine whether the object has returned to the sensing region 130 or the sensing region 132 by causing the transmitters 112a-d to continue to emit signals for object detection.

If the third timer has expired, the process 1500 continues to block 1536 where the lid portion 24 is closed. For example, if the third timer expires, then the controller 70 determines that a sufficient amount of time has passed since the object was last detected and that the lid portion 24 can close. As shown, the process 1500 can revert to block 1502 and the first, second, and third timers can be reset (e.g., to their respective values before being started). In various implementations, the sensor assembly 102 can transition back into the ready-mode.

Dirty Lens Compensation

Dirt or other contaminants (e.g., dust, grease, liquid droplets, or otherwise) may be introduced onto the lens covering 104 by a user. For example, during the course of placing wet and messy refuse (e.g., coffee grounds) into the trashcan assembly 20, some of the refuse may spill onto the lens covering 104. The dirt or other contaminants can block signals from one or more of the transmitters 112a-d from reaching the sensing regions 130b, 132b. Instead, the dirt or other contaminants can reflect the signals to the receiver 114, which can lead to false positives (e.g., incorrect indications that an object is in one of the sensing regions 130, 132). The false positives can result in a delay in closing the lid portion 24 and/or in the lid portion 24 remaining in the open position. Some embodiments of the trashcan assembly 20 are configured to reduce or avoid such problems, such as by adjusting one or more parameters to account for the dirtiness of the lens covering 104.

In some embodiments, the trashcan assembly 20 can include a lens calibration-mode process that detects and/or makes adjustments to account for dirt or other contaminants on the lens covering 104. The process can be performed by an algorithm included in the controller 70. In some embodiments, the process is the same, or similar to, the process 1300 described above in connection with the environmental calibration and FIG. 13. The lens calibration-mode process can include any one, or any combination, of the features of the process 1300. For example, similar to the discussion above, the trashcan assembly 20 can detect the presence of a stationary contaminant (e.g., dirt) on the lens covering 104 and can make adjustments (e.g., to sensing thresholds) to compensate for the contaminant.

In some embodiments, the lens calibration-mode process begins with periodically conducting a scan, such as a scan of the lens cover 104. This scan can occur with or without user initiation or interaction. For example, in an automatic calibration mode, at a set time interval (e.g., once an hour, once a day, once a week, etc.), the controller 70 may send a command to begin the lens calibration-mode. The automatic periodic scan permits the trashcan assembly 20 to continuously and/or automatically monitor the ability of signals to pass through the lens covering 104 and to update sensing thresholds accordingly. In some embodiments, the controller 70 can include an algorithm configured to send a command initiating the lens calibration-mode based on user input. For example, the trashcan assembly 20 may include a button that a user may operate to manually activate the lens calibration-mode, such as during or after adding refuse into the trashcan assembly 20. In some embodiments, the controller 70 is configured to automatically send a command to start the lens calibration-mode in response to a user manually moving the lid (e.g., to open or close it). For example, if the lid is improperly remaining open due to dirt on the lens cover 104, a user may manually close the lid, which can automatically trigger the lens calibration-mode.

As mentioned above, in a normal (e.g., clean) state of the lens covering 104, the signals emitted from the transmitters 112a-d can pass through the lens cover 104, be reflected off an object in one of the sensing regions 130, 132, and be received by the receiver 114. However, when the lens covering 104 is dirty, the contaminants on the lens cover 104 can block the passage of some or all of the signals, such as those signals attempting to pass through a particular portion of the lens covering 104. Such blocked signals can be reflected off the contaminants and received by the receiver 114, thereby providing a false positive of an object being in one of the sensing regions 130, 132.

Various embodiments include determining whether an object-detection event is a false positive. For example, some embodiments make such a determination using a proximity measurement in one or more sensing regions of the trashcan assembly 20. The proximity measurement, which represents the distance between the trashcan assembly 20 and a detected object, can be determined in various ways. For example, the proximity measurement can be determined based at least in part on the time difference between the signal being emitted and received. In some embodiments, if the proximity measurement is less than a certain amount (e.g., less than 0.5 inch), the trashcan assembly 20 determines that the detected object is a false positive, such as because of a contaminant on the lens cover 104. In certain implementations, an object-detection event is determined to be a false positive if the object-detection event is consistently occurring (e.g., constantly occurring) in portion of at least one of the sensing regions 130, 132, as may be the case for a contaminant on the lens covering 104. In some embodiments, an object-detection event is determined to be a false positive if the controller 70 determines that the detected object is stationary or generally stationary in the one of the sensing regions 130, 132 for at least a certain period (e.g., at least about 1 minute), such as may be the case for a contaminant on the lens covering 104.

In some embodiments, the controller 70 takes a corrective action in response to an object-detection event being determined to be a false positive. For example, the controller 70 can filter-out and/or disregard the erroneous object-detection event. This can facilitate normal operation of the lid portion 24, such as allowing the lid portion 24 to close. In some variants, if the object-detection event is determined not to be a false positive (e.g., to be moving in one of the sensing regions 130, 132 or otherwise not indicative of a contaminant on the lens covering 104), the trashcan assembly 20 processes the object-detection event in the logic for movement of the lid portion 24 or otherwise, as is described above.

Voice Activation

In some embodiments, the trashcan assembly 20 can actuate one or more features of the trashcan assembly 20, such as opening and/or closing the lid portion 24, using an audio sensor, such as an audio sensor configured to sense one or more voice commands or other sounds (e.g., clapping, snapping, or otherwise) received from a user. In some embodiments, the audio sensor can be the only sensor utilized to actuate the trashcan assembly 20, or the audio sensor can be used with one or more other sensors, such as one or more movement or proximity detectors (e.g., as described anywhere in this specification). Regarding the audio sensor, the memory in the controller 70 can store data representing one or more keywords or sounds. A keyword or sound (also referred to herein as a wake word or a code word) may be a word that is associated with a particular action or state of the trashcan assembly 20. When the trashcan assembly 20 detects a particular keyword or sound, the trashcan assembly 20 can take a corresponding action (e.g., open the lid portion 24, close the lid portion 24, maintain the lid in an open position, etc.) and/or transition to a corresponding state (e.g., transition to a stay-open mode or transition to a stay-closed mode, which are described in greater detail below).

The backside enclosure 56, the sensor assembly 102, and/or any other portion of the trashcan assembly 20 can include a microphone. For example, the microphone can be disposed on a generally outer portion of the trashcan assembly 20 (e.g., the rear wall 28, the front wall 30, etc.). In some embodiments, at least a portion of the microphone is exposed to the trashcan exterior. In other embodiments, the microphone is not exposed to the trashcan exterior and a hard or soft grill can be coupled with the microphone to protect the microphone while still allowing sound to pass from the trashcan exterior to the microphone. The microphone may capture sound, such as an utterance spoken by or a sound made by a user. Once captured, the microphone can transform the sound into an electrical audio signal that represents the captured sound and transmit the electrical audio signal to the controller 70.

Using instructions and/or algorithms stored in the memory, one or more of the processors of the controller 70 can perform speech recognition on the received electrical audio signal to identify any words that may have been spoken. The processor can then compare the identified words with the one or more keywords (e.g., using the data representing one or more keywords stored in the memory) to determine if there are any matches. Thus, the processor can perform a comparison of the captured audio with known keywords to determine whether a user said any of the known keywords.

If an identified word does not match a keyword, the controller 70 takes no action. If an identified word matches a keyword, the controller 70 can then perform an action and/or transition to a state associated with the keyword. For example, if the processor determines that the user said a keyword or made a sound associated with the opening of the lid portion 24 (e.g., "OPEN LID" or "OPEN TRASHCAN," etc.), the controller 70 can cause the motor 78 to move the lid portion 24 to the open position. Likewise, if the processor determines that the user said a keyword or made a sound associated with the closing of the lid portion 24 (e.g., "CLOSE LID" or "CLOSE TRASHCAN," etc.), the controller 70 can cause the motor 78 to move the lid portion 24 to the closed position. As another example, if the processor determines that the user said a keyword or made a sound associated with a desire to keep the lid portion 24 open for an extended period (e.g., "STAY OPEN" or "TASK MODE," etc.), the controller 70 can cause the motor 78 to move the lid portion 24 to the open position (if the lid portion 24 is closed) or not cause the motor 78 to move the lid portion 24 to the closed position even if no object is detected by the components of the sensor assembly 102 for an extended period or indefinitely. In some embodiments, the extended period can be at least about 20 seconds or at least about 30 seconds or at least about one minute, etc.). Likewise, if the processor determines that the user said a keyword or made a sound associated with a desire to keep the lid portion 24 closed for an extended period (e.g., "STAY CLOSED" or "CLOSED MODE," etc.), such as to avoid unintentionally triggering the opening of the trashcan assembly 20 when someone is working around or otherwise near the trashcan assembly 20 for some other reason besides depositing trash, the controller 70 can cause the motor 78 to move the lid portion 24 to the closed position (if the lid portion 24 is open) or not cause the motor 78 to move the lid portion 24 to the open position even if an object is detected by the components of the sensor assembly 102 for an extended period. In some embodiments, the lid portion 24 may remain open or closed until a repeated or different keyword is uttered or sound is made (e.g., a keyword associated with the closing or opening of the lid portion 24), until a predetermined period of time has passed (e.g., at least about 1 minute, at least about 5 minutes, etc.), and/or the like. It is contemplated that any type of location detection or motion detection or sound detection, including any of those that are disclosed in this specification, or any combination of such modes of detection, can be used by the electronic controller of the trashcan assembly 20 to actuate any function described in this specification.

In some embodiments, the keywords recognized by the trashcan assembly 20 are preset. For example, the data representing the keywords can be stored in the memory during assembly and/or manufacture of the trashcan assembly 20.

In some embodiments, the keywords recognized by the trashcan assembly 20 are user-defined. For example, the trashcan assembly 20 can include a button, switch, or other such user input component that, when enabled, causes the trashcan assembly 20 to enter a training mode. In the training mode, a display or screen of the trashcan assembly 20 can identify an action or state of the trashcan assembly 20 and prompt a user to say a keyword that will then be associated with the action or state. The microphone can capture the keyword uttered by the user and transmit the representative electrical audio signal to the controller 70. The controller 70 can perform speech recognition on the electrical audio signal to generate data representing the uttered keyword and the generated data can be stored in memory for later use. The trashcan assembly 20 can repeat this process for any number of actions or states that can be associated with a keyword. In addition, the trashcan assembly 20 can repeat this process for multiple users. Different users may say the same word in different ways (e.g., with different accents, intonations, inflections, pitch, rate, rhythm, etc.) and so it may be useful to store varied pronunciations of a single keyword to improve the accuracy of the speech recognition and thus the actions performed by the trashcan assembly 20. The memory can store one or more pronunciations for a single keyword and any number of these pronunciations can be compared with the identified words during the speech recognition process.

In some embodiments, the trashcan assembly 20 can include wireless communication components that allow the trashcan assembly 20 to receive keyword information wirelessly from a user device. The wireless communication components can include an antenna, a transceiver coupled with the antenna, and related circuitry. The antenna can be disposed on a generally outer portion of the trashcan assembly 20 (e.g., the rear wall 28, the front wall 30, the sensor assembly 102, the backside enclosure 56, etc.). In some embodiments, at least a portion of the antenna is exposed to the trashcan exterior. The antenna may be positioned in a manner that avoids signal interference when the lid portion 24 changes positions. The antenna can transmit signals received from the transceiver and receive signals transmitted by the user device. The antenna forwards signals received from the user device to the transceiver.

The transceiver can be located anywhere within the interior of the trashcan assembly. For example, the transceiver can be a chip included within the controller 70. The transceiver can package data for transmission over the antenna and unpackage data received by the antenna. The transceiver may be able to communicate over a variety of networks, such as a cellular network, a network using the IEEE 802.11 protocol (e.g., Wi-Fi), a network using the Bluetooth® protocol, and/or the like. The transceiver can forward unpackaged data to the controller 70 for processing and/or storage.

A user device can be any electronic device. For example, a user device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, home automation devices (e.g., "smart thermostats" or "smart meters"), set-top boxes, gaming consoles, entertainment systems, televisions with network access and program execution capabilities (e.g., "smart TVs"), and various other electronic devices and appliances. The user device can be equipped with software or an "app" that is configured to enable the user device and/or the trashcan assembly 20 to perform any of the functions, tasks and/or steps described and/or illustrated herein.

For example, using the app, a user can establish a connection between the user device and the trashcan assembly 20 (e.g., via communications that pass through the wireless communication components). The app can then be used to train the trashcan assembly 20. The app can generate a user interface for display on the screen of the user device that identifies an action or state of the trashcan assembly 20 and that prompts a user to say a keyword that will then be associated with the action or state. In some embodiments, a microphone of the user device captures the keyword uttered by the user and the user device performs speech recognition to generate data representing the uttered keyword. The generated data is then transmitted to the controller 70, via the antenna, the transceiver, and/or the related circuitry, for storage in the memory. The generated data can also be stored locally on the user device (e.g., by storing the generated data locally, the user device can be used to program multiple trashcan assemblies 20 without having the user repeat the training process). In some embodiments, a microphone of the user device captures the keyword uttered by the user and the representative electrical audio signal is transmitted to the controller 70 via the antenna, the transceiver, and/or the related circuitry. The representative electrical audio signal can also be stored locally on the user device to, for example, allow the user to program multiple trashcan assemblies 20 without having to repeat the training process. The controller 70 then performs speech recognition to generate data representing the uttered keyword and stores the generated data in the memory. The app can repeat this process for any number of actions or states that can be associated with a keyword. In addition, the app can repeat this process for multiple users. As described above, different users may say the same word in different ways (e.g., with different accents, intonations, inflections, pitch, rate, rhythm, etc.) and so it may be useful to store varied pronunciations of a single keyword to improve the accuracy of the speech recognition and thus the actions performed by the trashcan assembly 20. The memory can store one or more pronunciations for a single keyword and any number of these pronunciations can be compared with the identified words during the speech recognition process.

In some embodiments, the wireless communication components can also be used to obtain keyword data from an informational source (e.g., the Internet, a home system, etc.). The keyword data can be stored in the memory for later use.

Figure 19:
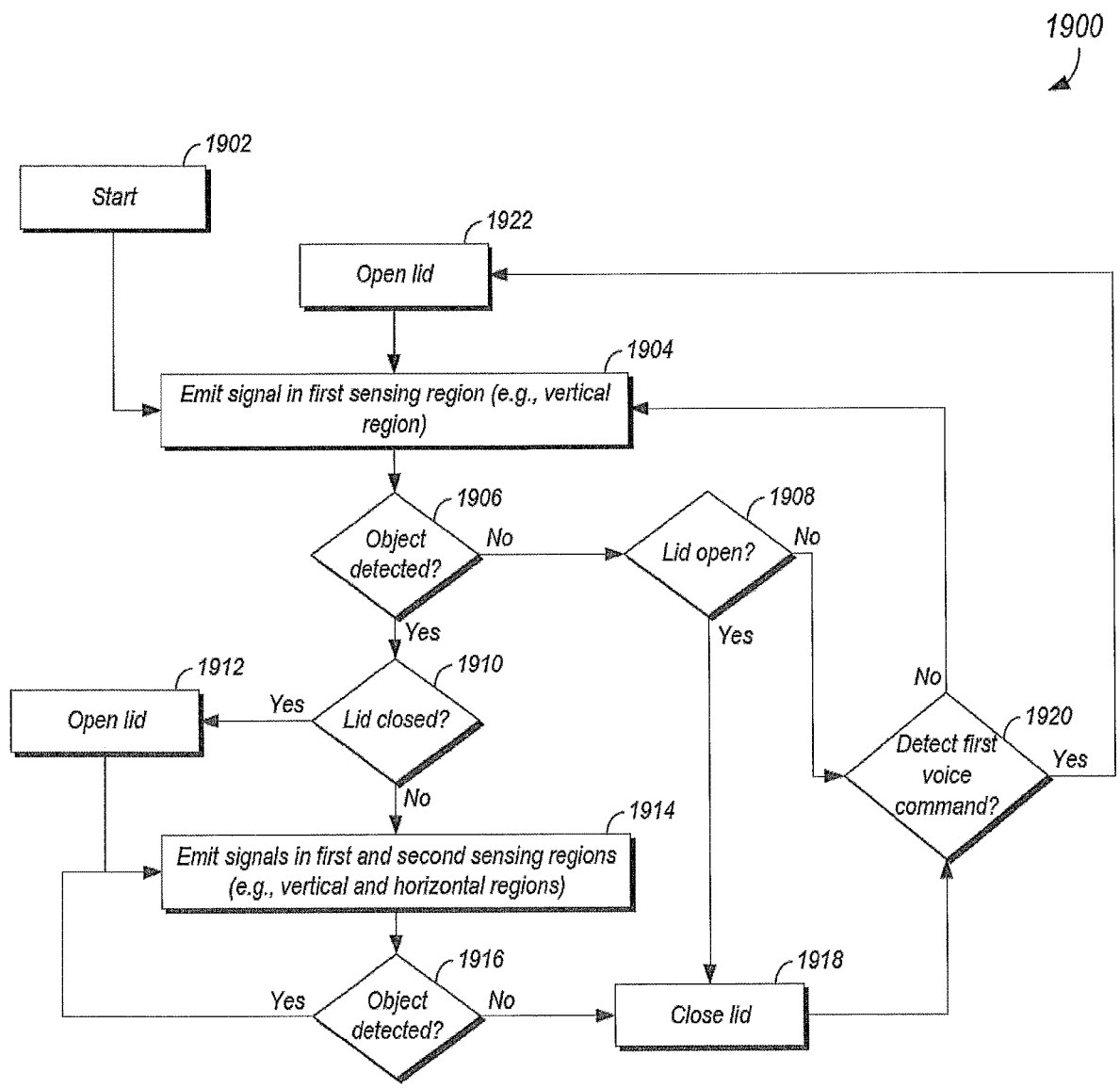
FIG. 19 schematically illustrates another method for controlling the position of the lid portion of the receptacle assembly of FIG. 1.

In certain embodiments, the voice recognition capability and the object detection capability of the trashcan assembly 20 can work in conjunction to determine when to actuate one or more functions of the trashcan assembly 20, such as when to close and/or open the lid portion 24. For example, FIG. 19 illustrates an example algorithm process 1900 of controlling the position of the lid portion 24. The process 1900 may be performed by controller 70 of trashcan assembly 20, as described above. The method can be implemented, in part or entirely, by a software module of the controller 70 (e.g., by the lid position controller) or implemented elsewhere in the trashcan assembly 20, for example by one or more processors executing logic in controller 70. In some embodiments, controller 70 includes one or more processors in electronic communication with at least one computer-readable memory storing instructions to be executed by the at least one processor of controller 70, where the instructions cause the trashcan assembly 20 to implement the process 1900. The process 1900 starts at block 1902.

As illustrated, the process 1900 moves to block 1904 where a signal is emitted using a first transmitter, such as the transmitter 112d (e.g., a generally vertical transmitter). In some embodiments, in block 1904, the trashcan assembly 20 is in the ready-mode state, as discussed above. In some embodiments, the transmitter 112d is configured to emit a signal generally upward from an upper surface 102a of the sensor assembly 102 (e.g., on top of the trashcan assembly 20, between about 0 and about 10 degrees from the top surface of the trashcan assembly 20, such as shown in FIGS. 9C and 9D). In some embodiments, the transmitters 112a-c are not emitting signals in block 1904.

As shown, the process 1900 can include block 1906 where a determination is made as to whether an object is detected, such as in the region 130b. For example, the receiver 114 can determine whether a reflected signal is detected in response to the signal emitted by the transmitter 112d (and provides such indication to the controller 70), which may indicate that an object is in the sensing region 130b. If no object is detected, the process 1900 moves to block 1908. However, if an object is detected, the process 1900 continues to block 1910.

At block 1908, a determination is made as to whether the lid portion 24 is open. For example, even though no object is detected, the lid portion 24 may still be open if the user uttered a keyword associated with the opening of the lid portion 24. If the lid is closed, the process 1900 moves to block 1920. Otherwise, the process 1900 moves to block 1918 to close the lid portion 24 and then proceeds to block 1920.

As illustrated, a determination is made as to whether the lid portion 24 is closed at block 1910. For example, as described above, the lid portion 24 may be open even before an object is detected in both the sensing regions 130 and 132 if the user uttered a keyword that caused the lid portion 24 to open. If the lid portion 24 is closed, the process 1900 moves to block 1912 to open the lid portion 24 and then proceeds to block 1914. For example, in response to an object being detected in the region 130b, the controller 70 can send a signal to a motor to open the lid portion 24. However, if the lid portion 24 is already open, the process 1900 proceeds directly to block 1914.

In the block 1912, it can be determined whether or not the trashcan assembly 20 is being used in a bright environment, such as ambient sunlight, before the lid portion 24 is opened in a manner as described above with respect to FIG. 14. If it is determined, in the block 1912, that the trashcan assembly 20 is in a bright environment, the process 1900 can return to block 1904 and repeat without opening the lid portion 24. On the other hand, if it is determined in block 1912 that the trashcan assembly 20 is not in a bright environment, the process 1900 can move on to block 1914 after opening the lid portion 24.

In some embodiments, the process 1900 moves to block 1914, which can include producing first and second sensing regions 130, 132 (e.g., generally vertical and generally horizontal sensing regions). For example, transmitter 112d can continue to produce the sensing region 130 and the transmitters 112a-c can produce the second sensing region 132. In certain embodiments, block 1914 includes beginning to emit signals from the transmitters 112a-c. In some implementations, in block 1914, the trashcan assembly 20 can enter the hyper-mode, as discussed above. For example, the sensing extent of the first sensing region 130 can be increased, as discussed above.

As illustrated, the process 1900 can include block 1916 where a determination is made as to whether a further object-detection event has occurred. For example, the trashcan assembly 20 can determine whether an object has been detected in at least one of the sensing regions 130, 132. If a further object-detection event has occurred, the process 1900 can revert to block 1914, in which the first and second sensing regions 130, 132 are produced.

If no further object-detection event has occurred, the process 1900 can continue to block 1918. In some embodiments, the process 1900 includes a timer or delay before moving to block 1918. For example, the process 1900 can include determining that no further object-detection event has occurred for at least a predetermined amount of time, such as at least about: 1, 2, 3, or 4 seconds. This can enable a user to briefly leave the sensing regions 130, 132 without the process 1900 continuing to block 1918.

As described above, block 1918 includes closing the lid portion 24 and/or reverting to the ready-mode. For example, the controller 70 can send a signal to a motor to close the lid portion 24. In certain implementations, block 1918 includes reducing the extent of the first sensing region 130 and/or reducing or eliminating the range of the second sensing region 132. In some embodiments, block 1918 includes reducing or ceasing operation of the transmitters 112a-c.

In some embodiments, the process 1900 moves to block 1920 where a determination is made as to whether a first voice command is detected. For example, the first voice command can be a keyword or wake word that is associated with the opening of the lid portion 24. The controller 70 can perform speech recognition on an utterance made by a user to determine whether the utterance corresponds to the first voice command. If the first voice command is detected, the process 1900 moves to block 1922 to open the lid portion 24 as verbally instructed by the user. However if the first voice command is not detected, the process 1900 reverts to block 1904. Thus, voice recognition can be used to open the lid portion 24 even when no object is detected within the sensing region 130 and/or the sensing region 132.

In the block 1922, it can be determined whether or not the trashcan assembly 20 is being used in a bright environment, such as ambient sunlight, before the lid portion 24 is opened in a manner as described above with respect to FIG. 14. If it is determined, in the block 1922, that the trashcan assembly 20 is in a bright environment, the process 1900 can return to block 1904 and repeat without opening the lid portion 24. On the other hand, if it is determined in block 1922 that the trashcan assembly 20 is not in a bright environment, the process 1900 can move to block 1904 after opening the lid portion 24.

While the process 1900 is described herein with respect to a keyword associated with the opening of the lid portion 24, this is not meant to be limiting. Any keyword associated with any action or state can be used in conjunction with the object detection capabilities of the sensor assembly 102 in a similar manner to open and/or close the lid portion 24. In the decision block 256, it can be determined whether or not the trash can 20 is being used in a bright environment, such as ambient sunlight. For example, the micro controller 110 can be configured to determine whether or not the light receiver(s) 94 are receiving light signals substantially continuously. For example, if the light receiver(s) 94 receive signals over a time period of 800 microseconds and have more than about ten to twelve dropouts during that time period, it can be assumed that the trash can 20 is being exposed to bright ambient light such as sunlight. As such, the micro controller 110 can be configured to avoid analyzing the output of the light receiver(s) 94. If it is determined, in the decision block 256, that the trash can 20 is in a bright environment, the control routine 250 can return to operation block 252 and repeat. On the other hand, if it is determined in decision block 256 that the trash can 20 is not in a bright environment, the control routine 250 can move on to operation block 258.

While the disclosure provided herein is directed to trashcan assemblies, this is not meant to be limiting. For example, the features, structures, methods, techniques, and other aspects described herein can be implemented in a hamper, crate, box, basket, drum, can, bottle, jar, barrel, or any other container or receptacle that may include a movable lid.

Terminology and Summary

Although the trashcan assemblies have been disclosed in the context of certain embodiments and examples, it will be understood by those skilled in the art that the present disclosure extends beyond the specifically disclosed embodiments to other alternative embodiments and/or uses of the trashcans and obvious modifications and equivalents thereof. In addition, while several variations of the trashcans have been shown and described in detail, other modifications, which are within the scope of the present disclosure, will be readily apparent to those of skill in the art. For example, a gear assembly and/or alternate torque transmission components can be included. For instance, in some embodiments, the trashcan assembly 20 includes a gear assembly. Some embodiment of the gear assembly include a gear reduction (e.g., greater than or equal to about 1:5, 1:10, 1:50, values in between, or any other gear reduction that would provide the desired characteristics), which can modify the rotational speed applied to the shaft 80, clutch member 84, and/or other components. Some embodiments are discussed above interacting with an object. The object can be a person's body or a portion thereof, something a person is wearing, holding, or manipulating, an article of the environment (e.g., furniture), or otherwise.

For expository purposes, the term "lateral" as used herein is defined as a plane generally parallel to the plane or surface of the floor of the area in which the device being described is used or the method being described is performed, regardless of its orientation. The term "floor" floor can be interchanged with the term "ground." The term "vertical" refers to a direction perpendicular to the lateral as just defined. Terms such as "above," "below," "bottom," "top," "side," "higher," "lower," "upper," "upward," "over," and "under," are defined with respect to the horizontal plane.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally perpendicular" can refer to something that departs from exactly perpendicular by less than or equal to 20 degrees.

Although certain embodiments and examples have been described herein, it will be understood by those skilled in the art that many aspects of the receptacles shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Any of the methods and tasks described herein may be performed and fully automated by a computer system. The computer system may, in some cases, include multiple distinct computers or computing devices. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms executed by the controller 70 and described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor device such that the processor device can read information from, and write information to, the storage medium. In the alternative, the storage medium can be integral to the processor device. The processor device and the storage medium can reside in an ASIC. The ASIC can reside in a trashcan assembly. In the alternative, the processor device and the storage medium can reside as discrete components in a trashcan assembly.

Some embodiments have been described in connection with the accompanying drawings. The figures are drawn to scale, but such scale should not be interpreted as limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The following is claimed:

1. A trashcan assembly comprising:
   a body portion;
   a lid portion pivotably coupled with the body portion;
   a microphone; and
   a controller comprising one or more hardware processors configured to:
      cause a prompt to be communicated to a user to indicate that the user can provide a sound to be associated with a first action;
      process an electrical audio signal received from the microphone that corresponds to the sound provided by the user;
      perform a recognition algorithm on the electrical audio signal to generate data representing the sound; and
      transmit an instruction to a power-operated drive mechanism in response to a determination that the data representing the sound corresponds to a second sound received by the microphone, wherein the instruction causes the power-operated drive mechanism to perform the first action on the lid portion.

2. The trashcan assembly of claim 1, wherein the controller is further configured to store the data representing the sound in memory.

3. The trashcan assembly of claim 1, wherein the controller is further configured to:
   determine that an obtained audio signal corresponds to the sound; and
   transmit the instruction to the power-operated drive mechanism in response to the determination that the audio signal corresponds to the sound.

4. The trashcan assembly of claim 1, further comprising at least one of a button or switch.

5. The trashcan assembly of claim 4, wherein the controller is further configured to cause the prompt to be communicated requesting that the user provide the sound in response to the button or switch being enabled.

6. The trashcan assembly of claim 1, wherein the first action comprises a movement of the lid portion from a first position to a second position.

7. The trashcan assembly of claim 6, wherein the first position is a closed position, and wherein the second position is an open position.

8. The trashcan assembly of claim 6, wherein the first position is an open position, and wherein the second position is a closed position.

9. The trashcan assembly of claim 6, further comprising a sensor assembly coupled to the body portion, the sensor assembly comprising the controller, a first transmitter, and a second transmitter, wherein an angle is formed between a transmission axis of the first transmitter and a transmission axis of the second transmitter.

10. The trashcan assembly of claim 9, wherein the controller is further configured to:
    instruct the first transmitter to emit a first signal;
    determine that no object is detected in a first region based on an indication received from the receiver; and
    if the first position is a closed position, transmit a second instruction to the power-operated drive mechanism to move the lid portion from the second position to the first position.

11. The trashcan assembly of claim 9, wherein the first position is a closed position and the second position is an open position, and wherein the controller is further configured to:
    instruct the first transmitter to emit a first signal;
    determine that no object is detected in a first region based on an indication received from the receiver;
    determine that a threshold period of time has not expired; and
    not cause the power-operated drive mechanism to move the lid portion to the first position in response to the determination that the threshold period of time has not expired.

12. The trashcan assembly of claim 9, wherein the controller is further configured to:
    instruct the first transmitter to emit a first signal;
    determine that an object is detected in a first region based on an indication received from the receiver; and
    if the first position is an open position, transmit a second instruction to the power-operated drive mechanism to move the lid portion from the second position to the first position.

13. The trashcan assembly of claim 9, wherein the first position is an open position and the second position is a closed position, and wherein the controller is further configured to:
    instruct the first transmitter to emit a first signal;
    determine that an object is detected in a first region based on an indication received from the receiver;
    determine that a threshold period of time has not expired; and
    not cause the power-operated drive mechanism to move the lid portion to the first position in response to the determination that the threshold period of time has not expired.

14. The trashcan assembly of claim 9, further comprising a light sensor coupled to the body portion, wherein the light sensor detects a first lux level of ambient light at a first time before the trashcan assembly detects an object and a second lux level of ambient light at a second time after the trashcan assembly detects the object, wherein the second lux level is greater than the first lux level.

15. The trashcan assembly of claim 14, wherein the first position is an open position and the second position is a closed position, and wherein the controller is further configured to not transmit a second instruction to the power-operated drive mechanism that causes the power-operated drive mechanism to move the lid portion from the second position to the first position in response to a determination that the second lux level is greater than the first lux level by a threshold value.

16. The trashcan assembly of claim 1, wherein the controller is further configured to:
    cause a second prompt to be communicated to a second user to indicate that the second user can provide a second sound to be associated with the first action;
    process a second electrical audio signal received from the microphone that corresponds to a second sound provided by a second user; and
    perform the recognition algorithm on the second electrical audio signal to generate second data representing the second sound.

17. The trashcan assembly of claim 16, wherein the sound comprises a first pronunciation of a keyword, and wherein the second sound comprises a second pronunciation of the keyword.

18. The trashcan assembly of claim 17, wherein the controller is further configured to perform the first action on the lid portion in response to a determination that the first pronunciation of the keyword is uttered or the second pronunciation of the keyword is uttered.

19. A trashcan assembly comprising:
    a body portion;
    a lid portion pivotably coupled with the body portion; and
    a controller comprising one or more hardware processors and memory, the controller configured to:
       process a first obtained audio signal that corresponds to a first state and a sound;
       store data derived from the first obtained audio signal in the memory; and
       in response to a determination that a second obtained audio signal corresponds to the stored data, transmit an instruction to a power-operated drive mechanism, wherein the instruction causes the power-operated drive mechanism to move the lid portion into the first state.

20. The trashcan assembly of claim 19, wherein the first state comprises the lid portion in a closed position.

21. The trashcan assembly of claim 19, wherein the first state comprises the lid portion in an open position.

22. The trashcan assembly of claim 19, further comprising a user input component.

23. The trashcan assembly of claim 22, wherein the audio signal is obtained in response to a user enabling the user input component and producing the sound.

24. The trashcan assembly of claim 19, wherein the controller is further configured to:
process a third obtained audio signal that corresponds to the first state and a second sound; and
store second data derived from the third obtained audio signal in the memory.

25. The trashcan assembly of claim 24, wherein the sound comprises a first pronunciation of a keyword, and wherein the second sound comprises a second pronunciation of the keyword.

26. The trashcan assembly of claim 25, wherein the controller is further configured to move the lid portion into the first state in response to a determination that a fourth obtained audio signal corresponds to the stored data or the second stored data.

27. The trashcan assembly of claim 19, wherein the controller is further configured to:
process a third obtained audio signal that corresponds to a second state and a second sound; and
store second data derived from the third obtained audio signal in the memory.

28. The trashcan assembly of claim 27, wherein the controller is further configured to move the lid portion into the second state in response to a determination that a fourth obtained audio signal corresponds to the second stored data.

29. The trashcan assembly of claim 19, further comprising an app configured to operate on a mobile device, the app being configured to capture the first obtained audio signal through a microphone on the mobile device and transmit the first obtained audio signal wirelessly to the controller.

30. A method for controlling a position of a lid portion of a trashcan assembly, the method comprising:
receiving a training audio signal corresponding to a first action and a sound;
storing data derived from the training audio signal in memory; and
in response to a determination that the sound is produced after the data is stored in the memory, enabling a power-operated drive mechanism to perform the first action on the lid portion.

31. The method of claim 30, wherein receiving a training audio signal corresponding to a first action and a sound further comprises receiving the training audio signal in response to a user enabling a user input component of the trashcan assembly and producing the sound.

32. The method of claim 30, further comprising:
receiving a second training audio signal that corresponds to the first action and a second sound; and
storing second data derived from the second training audio signal in the memory.

33. The method of claim 32, wherein the sound comprises a first pronunciation of a keyword, and wherein the second sound comprises a second pronunciation of the keyword.

34. The method of claim 33, further comprising performing the first action on the lid portion in response to a determination that the sound or the second sound is produced.

35. The method of claim 30, further comprising:
receiving a second training audio signal that corresponds to a second action and a second sound; and
storing second data derived from the second training audio signal in the memory.

36. The method of claim 35, further comprising performing the second action on the lid portion in response to a determination that the second sound is produced.

37. The method of claim 30, wherein the training audio signal is generated by a user with a mobile electronic device and communicated from the mobile electronic device to the trashcan assembly.

\* \* \* \* \*